United States Patent
Donoho et al.

(10) Patent No.: US 6,604,130 B2
(45) Date of Patent: *Aug. 5, 2003

(54) RELEVANCE CLAUSE FOR COMPUTED RELEVANCE MESSAGING

(75) Inventors: David Leigh Donoho, Berkeley, CA (US); David Salim Hindawi, Berkeley, CA (US); Lisa Ellen Lippincott, Berkeley, CA (US)

(73) Assignee: BigFix, Inc., Emeryville, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/024,895

(22) Filed: Dec. 18, 2001

(65) Prior Publication Data

US 2002/0091779 A1 Jul. 11, 2002

Related U.S. Application Data

(60) Continuation of application No. 09/315,732, filed on May 20, 1999, now Pat. No. 6,356,936, which is a division of application No. 09/272,937, filed on Mar. 19, 1999, now Pat. No. 6,256,664.
(60) Provisional application No. 60/098,798, filed on Sep. 1, 1998.

(51) Int. Cl.[7] .............................................. G06F 15/16
(52) U.S. Cl. ....................................... 709/204; 709/206
(58) Field of Search ............................... 709/206, 225, 709/204, 207, 227, 205; 707/3, 10; 370/260, 270; 345/329, 330, 331

(56) References Cited

U.S. PATENT DOCUMENTS

| | | | | |
|---|---|---|---|---|
| 6,256,664 B1 | * | 7/2001 | Donoho et al. | 709/204 |
| 6,263,362 B1 | * | 7/2001 | Donoho et al. | 709/206 |
| 6,356,936 B1 | * | 3/2002 | Donoho et al. | 709/206 |

* cited by examiner

*Primary Examiner*—Mark R. Powell
*Assistant Examiner*—Jason D. Cardone
(74) *Attorney, Agent, or Firm*—Michael A. Glenn; Glenn Patent Group; Kirk D. Wong

(57) ABSTRACT

The invention disclosed herein enables a collection of computers and associated communications infrastructure to offer a new communications process which allows information providers to broadcast information to a population of information consumers. The information may be targeted to those consumers who have a precisely formulated need for the information. This targeting may be based on information which is inaccessible to other communications protocols. The targeting also includes a time element. Information can be brought to the attention of the consumer precisely when it has become applicable, which may occur immediately upon receipt of the message, but may also occur long after the message arrives. The communications process may operate without intruding on consumers who do not exhibit the precisely-specified need for the information, and it may operate without compromising the security or privacy of the consumers who participate.

6 Claims, 25 Drawing Sheets

DATE: SAT MAR 21 1998 17:54:06 - 0800
FROM: JOE ADVISOR   <ja@advisories.com>
MIME-Version 1.0
ORGANIZATION: Universe Communications, Inc.

| SUBJECT: You need to upgrade Advice Reader |

| RELEVANT-WHEN: version of file "Advice.exe"  < 5.0 |

CONTENT-TYPE: text/html; charset us=ascii

```
<HTML><BODY>
Click here to <A HREF = "http://advisories.com/a"
download </A> the latest version of Advice Reader.
</BODY></HTML>
```

— SUBJECT LINE  /—82

— RELEVANCE CLAUSE  /—80

— MESSAGE BODY  /—81

FIG. 8

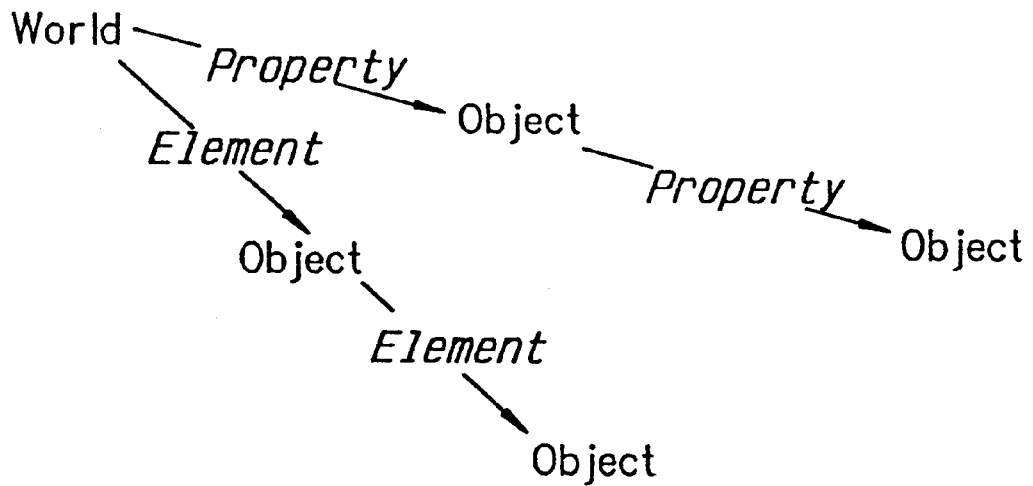
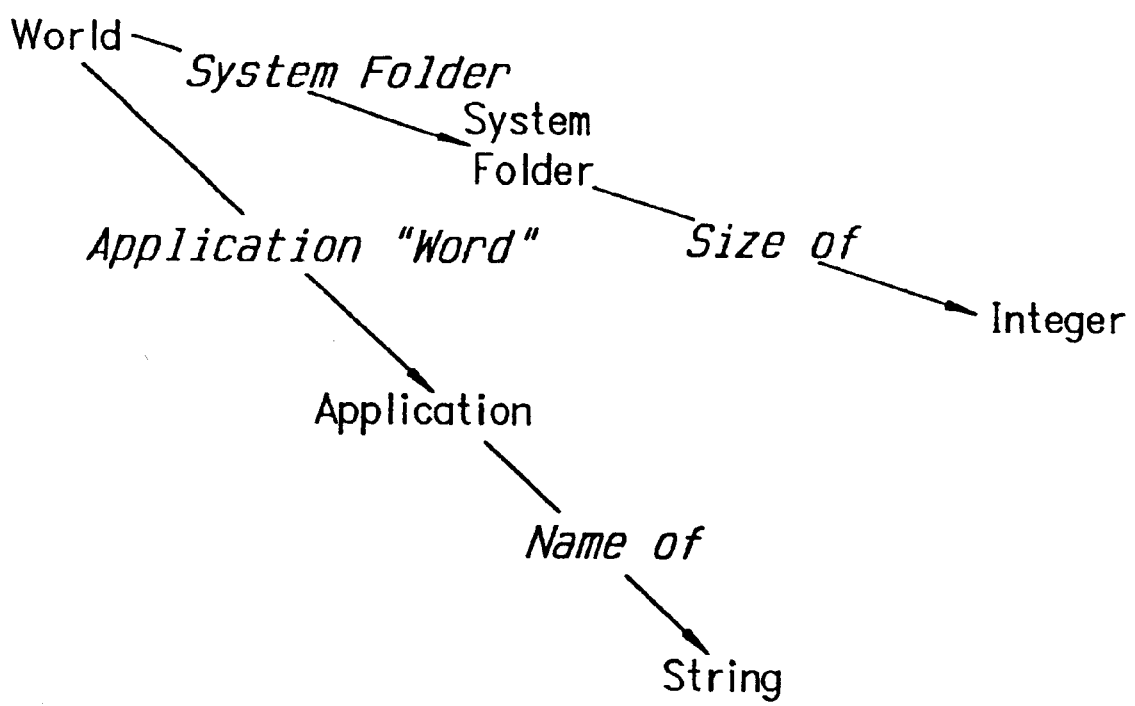
FIG. 13

Inspector Library

Macintosh "Version" Inspector

```
(version, "major revision", maj-rev-meth)
(version, "major revision", min-rev-meth)
(version, "stage", stage-meth)
(version, "country", country-meth)
(version, "string 1", string 1-meth)
(version, "string 2", string 2-meth)
```

Phrase Definitions
Data type associations
Method associations

```
METHOD maj-rev-meth;
METHOD min-rev-meth;
METHOD stage-meth;
METHOD country-meth;
METHOD string 1-meth;
METHOD string 2-meth;
```
} Method Definitions

*FIG. 15*

RELEVANCE CLAUSE FOR COMPUTED RELEVANCE MESSAGING

This application is a continuation of application Ser. No. 09/315,732, now, U.S. Pat. No. 6,356,936, filed May 20, 1999; which is a divisional of application Ser. No. 09/272,937, now, U.S. Pat. No. 6,256,664, filed Mar. 19, 1999; which claims benefit of provisional application Ser. No. 60/098,798 filed on Sep. 1, 1998.

BACKGROUND OF THE INVENTION
1. Technical Field

The invention relates to a new process of communication using computers and associated communications infrastructure. More particularly, the invention relates to a method and apparatus for computed relevance messaging.

2. Description of the Prior Art

The aim of a communications process is to relay information between pairs of actors who, for purposes of the discussion herein, consist of an information provider and an information consumer. The following briefly discusses the concerns of each party.

Concerns of Information Provider

The information provider knows of pieces of information and of corresponding situations in which certain consumers would find those pieces of information interesting, useful, or valuable. For example, such pieces of information may concern problems consumers who have particular attributes might be interested in solving or that concern opportunities of interest to consumers having such particular attributes. The provider wishes to distribute the information to those consumers in those specific situations.

In principle, an information provider might know of thousands or millions of conditions about which it can offer information. The audience for such conditions might involve thousands or millions of consumers.

A particularly interesting situation is where a typical piece of information should be directed only to consumers having a very special combination of circumstances. A typical piece of information would in principle be of interest to only a small fraction of the consumer base, but where this small fraction nevertheless amounts to large number of consumers.

A challenging but very important case occurs when verifying when the conditions for applicability of a certain piece of information requires knowing a great deal of detailed information about the consumer, his concerns and affiliations, or his property. This information might be considered very sensitive by consumers, who would not want to participate in a process that required disclosure of the information to the provider. Therefore, it might seem impossible to target the information to consumers because only the consumers have access to the information required to make the determination that the information applies to them, and they are unwilling to expend the effort to make a determination themselves, or to give others access to the sensitive information required to make the determination on their behalf.

Concerns of Information Consumer

The consumer is an individual or organization that knows of information providers who have information of potential benefit to them. The consumer may in fact know of tens or hundreds of such providers. Typically, at any given moment, only a small fraction of the information being offered by the information provider is of potential interest to the consumer. The consumer does not want to review all the information available from the information provider. He would prefer to see the subset consisting of information, which is relevant to the consumer.

Typically, the information which the provider is offering changes with time and the conditions experienced by the consumer are changing with time. The consumer would prefer not to have to track changes continually in his own status and the status of the information provider's offerings. He would also prefer not to have to remember that pieces of information published some time before could have suddenly become applicable.

The consumer would prefer that a procedure be available for automatically detecting the existence of applicable information as it became applicable, either because the consumer's situation had changed, because the information provider's offerings had changed, or because the conditions for applicability of the information involved time considerations which had become applicable. The consumer would prefer not to reveal to the provider information about his identity or the details of his interests, preferences, and possessions. Rather, the consumer would prefer to receive information in a form where he may carefully study it before using it.

The consumer would also prefer to have a method to inform himself about known problems with an information provider or with a certain piece of information before using the information. Typically, the consumer would prefer that if the decision to use a piece of information is made, the application of the information is painless and essentially automatic. The consumer would prefer to be insulated from the prospect of damage caused by incorrect information.

It would therefore be advantageous to provide a communications technique that addressed each of the above concerns with regard to both the information provider and the information consumer.

SUMMARY OF THE INVENTION

The invention disclosed herein enables a collection of computers and associated communications infrastructure to offer a new communications process. This process allows information providers to broadcast information to a population of information consumers. The information may be targeted to those consumers who have a precisely formulated need for the information. This targeting may be based on information which is inaccessible to other communications protocols, for example because under other protocols the targeting requires each potential recipient to reveal sensitive information, or because under other protocols the targeting requires each potential recipient to reveal information obtainable only after extensive calculations using data available only upon intimate knowledge of the consumer computer, its contents, and local environment.

The targeting also includes a time element. Information can be brought to the attention of the consumer precisely when it has become applicable, which may occur immediately upon receipt of the message, but may also occur long after the message arrives. Again, this is a feature inaccessible under other communication protocols, where the time of distribution of information and the time of consumer notification are closely linked.

The communications process may operate without intruding on consumers who do not exhibit the precisely-specified need for the information, and it may operate without compromising the security or privacy of the consumers who participate. For example, in one implementation, the information provider does not learn the identity or attributes of the individuals who receive this information.

This process enables efficient solutions to a variety of problems in modern life, including the automated technical support of modern computers. In the technical support application, the disclosed invention allows a provider to reach precisely those specific computers in a large consumer population which exhibit a specific combination of hardware, software, system settings, data, and local environment, and to offer the users of those computers appropriate remedies to correct problems known to affect computers in such situations.

The presently preferred embodiment of the invention is specially tuned to address the concerns of consumers and providers in a technical support application. Many other interesting applications areas and embodiments of the invention are also described herein.

This particular embodiment of the invention is described as follows:

Actors, referred to herein as advice providers, author advisories, which are specially structured digital documents which may contain:

(1) Humanly-interpretable content, such as text and multimedia;
(2) Computer-interpretable content, such as executable programs and data; and
(3) Expressions in a special computer language called the relevance language.

The relevance language describes precise conditions under which a given advisory may be relevant to a consumer, by referring to properties of the environment of the consumer computer interpreting the message, such as system configuration, file system contents, attached peripherals, or remotely accessible data. The humanly-interpretable content in an advisory may describe the condition that triggered the relevance determination and propose an action in response to the condition, which could range from installing software to changing system settings to purchasing information or software. The computer-interpretable content may include software which performs a certain computation or effects a certain change in the system environment.

Advisories are communicated by a process of publication/subscription over a wide-area network such as the Internet. Advisories are placed by their authors at well-known locations, referred to herein as advice sites. Applications referred to as advice readers running on the computers of advice consumers periodically obtain advisories from advice servers which operate at advice sites.

Advice readers process the messages so obtained and automatically interpret the relevance clauses. They determine whether a given message is relevant in the environment defined by the consumer's computer and associated devices. The user is then notified of those messages which are relevant, and the user may read the relevant advisories and invoke the recommended actions.

Relevance evaluation is conducted by parsing relevance language clauses into constituent method dispatches. These clauses invoke specific inspectors which can return specific properties of the computer, its configuration, its file system, or other component of interest. In effect, the list of properties of the environment which may be referred to in the relevance language and verified by the advice reader is determined by the contents of the inspector library installed at run-time.

The existence of standard inspector libraries provides the advice provider with a rich vocabulary for describing the state of the consumer computer and its environment. In one implementation, the collection of inspector libraries can be dynamically expanded by advice providers.

Advice readers operate continually in an automatic mode, gathering advice from many advice providers distributed across public networks such as the Internet, and diagnosing relevance as it occurs.

Advice readers following an advice gathering protocol, referred to herein as Anonymous Exhaustive Update Protocol, may operate in a manner which fully respects the privacy of the computer's owner. information resulting from the relevance determination, i.e. information obtained from the consumer computer, does not leak out to the server. Information on the consumer computer stays on the consumer computer unless the consumer approves its distribution.

Many variations on this specific embodiment are described in detail, including variations which have very different applications, very different message formats, very different gathering protocols, very different security and privacy attributes, very different methods of describing the consumers to whom a message may be relevant, and very different trust relationships between consumer and provider (e.g. master-slave relationships). The disclosed invention is shown to be capable of effective embodiment in all these settings.

BRIEF DESCRIPTION OF THE DRAWINGS

FIG. 8 is a data structure showing an advisory according to the invention;

FIG. 13 is a flow diagram showing an object hierarchy according to the invention;

FIG. 15 is a data structure showing the contents of an inspector library according to the invention;

DETAILED DESCRIPTION OF THE INVENTION

The invention implements a process of communication which systematically solves the problem of linking an information provider to information consumer. The invention provides a system which depends on the use of computational devices connected by communications networks. In actual practice, these devices could range from traditional large-scale computers to personal computers to handheld personal information managers to embedded computational devices in the ambient environment, including consumer appliances such as remote controls and smart TVs, or other common computationally-dense environments, such as transportation vehicles. The communications mechanisms could include a modem or other wired media, or wireless communications, using the Internet or other protocols, and could include the physical distribution of media. Whatever the specific instance, for purposes of the discussion herein, the computational device shall be referred to as a computer and the communications infrastructure shall be referred to as a network. Typical examples of such infrastructure include intranets (private computer networks), and the Internet, the large public computer network that hosts the World Wide Web and related services.

Figure 1:
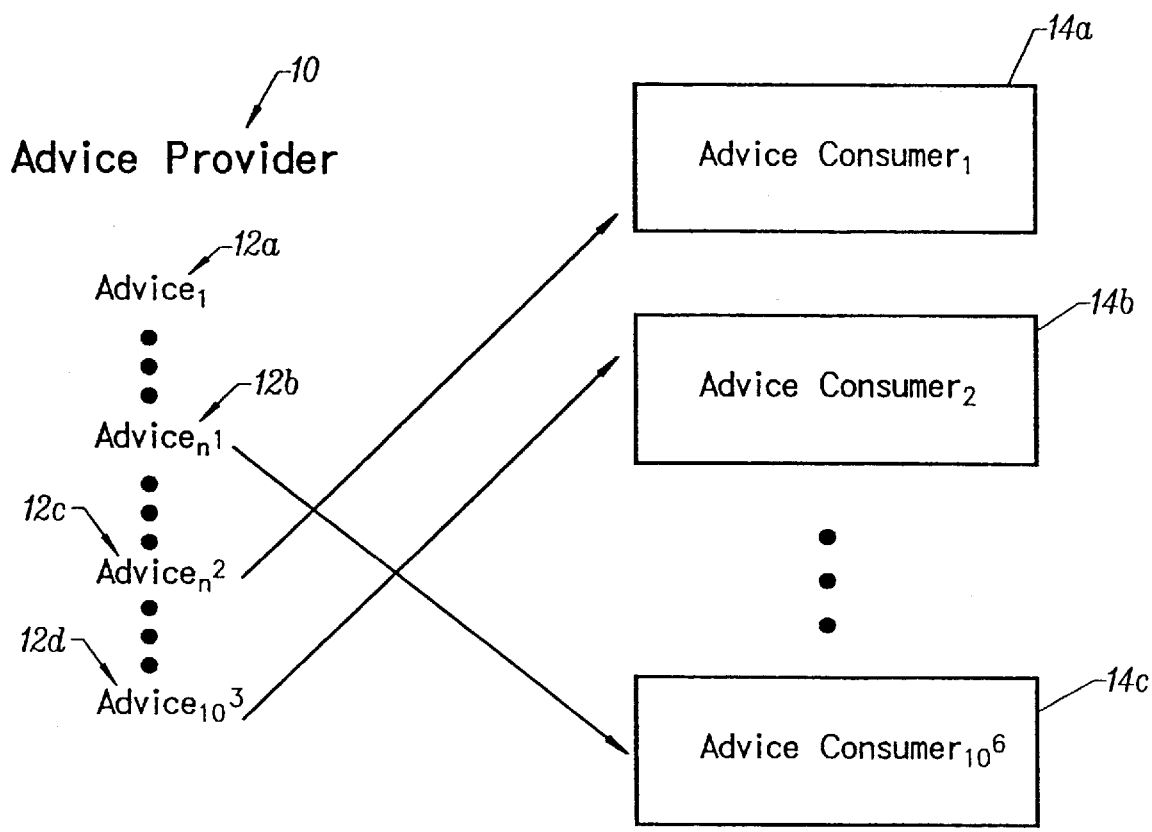
FIG. 1 is a block diagram showing the process of matching advisories to consumers according to the invention.

The invention architecture is best understood if a specific terminology is adopted, which evokes a focused instance of the above described communications problem. The specific units of information to be shared henceforth are referred to as pieces of advice (see FIG. 1). The special digital documents conveying advice are referred to as advisories. An advice provider 10 is an organization or individual which offers information in the form of advisories 12a–12d. The provider is represented by a server computer in a communicating network of computers. An advice consumer 14a–14c is an organization or individual which receives information in the form of advisories. The consumer is represented by a computer referred to as the consumer computer in a communicating network of computers.

It is helpful to think in concrete terms, and to suppose that the advice provider is in fact a large organization running a large-scale server computer; that the advice consumer is in fact an individual represented by a single personal computer, smart TV, personal information manager, or other personal computational device; and to suppose that the network of computers may communicate according to a protocol similar to the TCP/IP protocol now in use by the Internet. In actual practice, many variations can be expected. For example, an advice provider may constitute an individual represented by a personal computer, an advice consumer may be a corporation represented by a large-scale computing engine, and the communications process underlying the invention may be realized with other protocols operating over other physical means of communication.

Using this terminology, it is now possible to describe a key purpose of the invention. The invention allows one to relay advisories from advice providers to advice consumers. The communications protocol allows narrowly-focused targeting by automatically matching advisories with consumers for whom those advisories are relevant.

Figure 2:
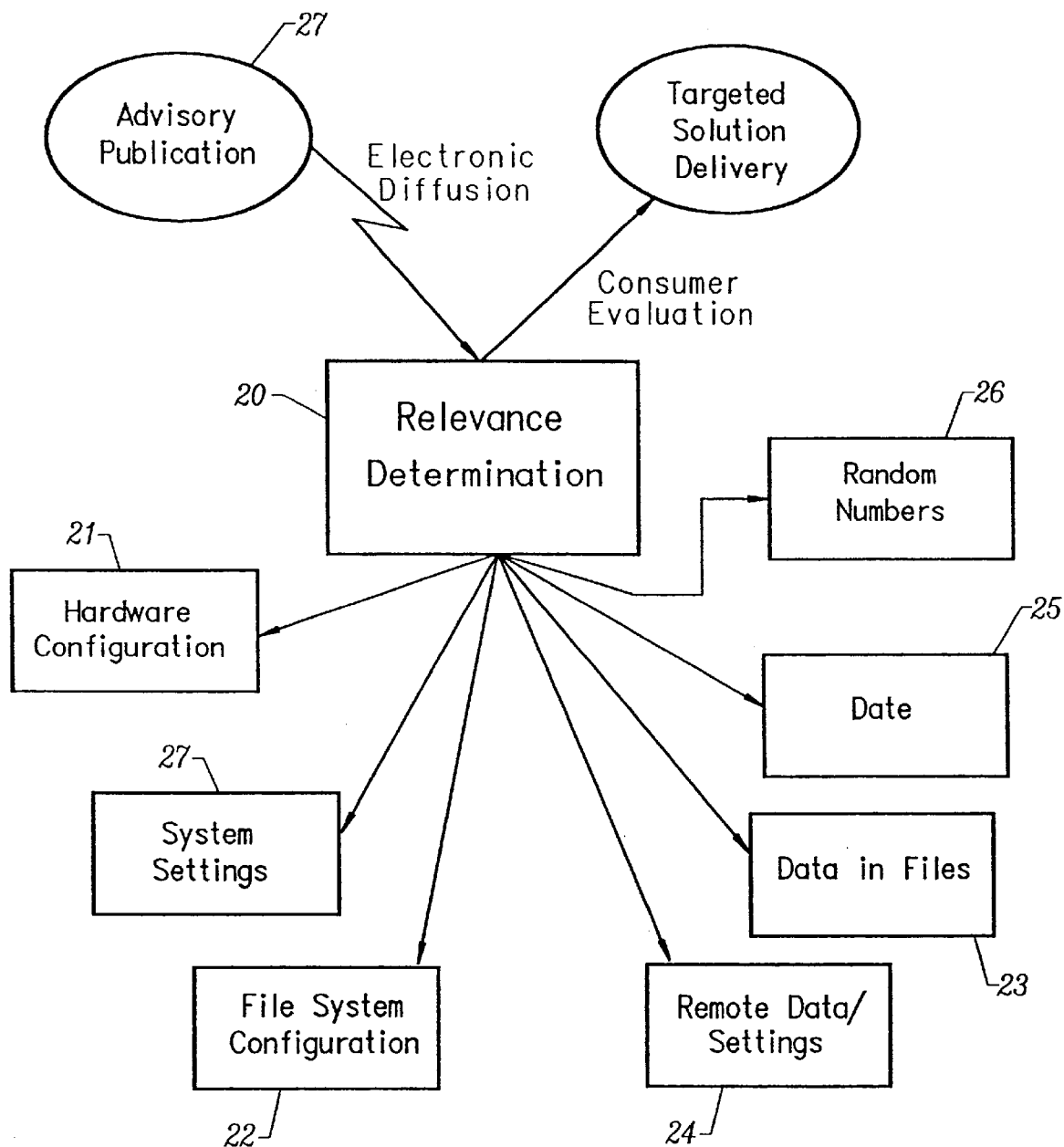
FIG. 2 is a block diagram showing an advisor viewpoint according to the invention.

Relevance determination (see FIG. 2) is carried out by an applications program, referred to as the advice reader 20 which runs on the consumer computer and may automatically evaluate relevance based on a potentially complex combination of conditions, including:

1. Hardware Attributes. These are, for example, the type of computer on which the evaluation is performed, the type of hardware configuration 21, the capacity and uses of the hardware, the type of peripherals attached, and the attributes of peripherals.

1. Configuration attributes. These are, for example, values of settings for variables defined in the system configuration 22, the types of software applications installed, the version numbers and other attributes of the software, and other details of the software installation 27.

1. Database attributes. These are, for example, attributes of files 23 and databases on the computer where evaluation is performed, which may include existence, name, size, date of creation and modification, version, and contents.

3. Environmental attributes. These are, for example, attributes which can be determined after querying attached peripherals to learn the state of the environment in which the computer is located. Attributes may include results of thermal, acoustic, optical, geographic positioning, and other measuring devices.

3. Computed attributes. These are, for example, attributes which can be determined after appropriate computations based on knowledge of hardware, configuration, and database and environmental attributes, by applying specific mathematico-logical formulas, or specific computational algorithms.

Remote attributes 24. These are, for example, hardware, configuration, database, environmental, and computed attributes that are available by communicating with other computers having an affinity for the consumer or his computer.

3. Timeliness 25. These are, for example, attributes based on the current time, or a time which has elapsed since a key event, such as relevance evaluation or advice gathering.

3. Personal attributes. These are, for example, attributes about the human user(s) of the computer which can either be inferred by analysis of the hardware, the system configuration, the database attributes, the environmental attributes, the remote attributes, or else can be obtained by soliciting the information directly from the user(s) or their agents.

1. Randomization 26. These are, for example, attributes resulting from the application of random and pseudo-random number generators.

Advice Attributes 27. These are, for example, attributes describing the configuration of the invention and the existence of certain advisories or types of advisories in the pool of advice.

In this way, whatever information is actually on the consumer computer or reachable from the consumer computer may in principle be used to determine relevance. The information accessible in this way can be quite general, ranging from personal data to professional work product to the state of specific hardware devices. As a result, an extremely broad range of assertions can be made the subject of relevance determination.

Figure 3:
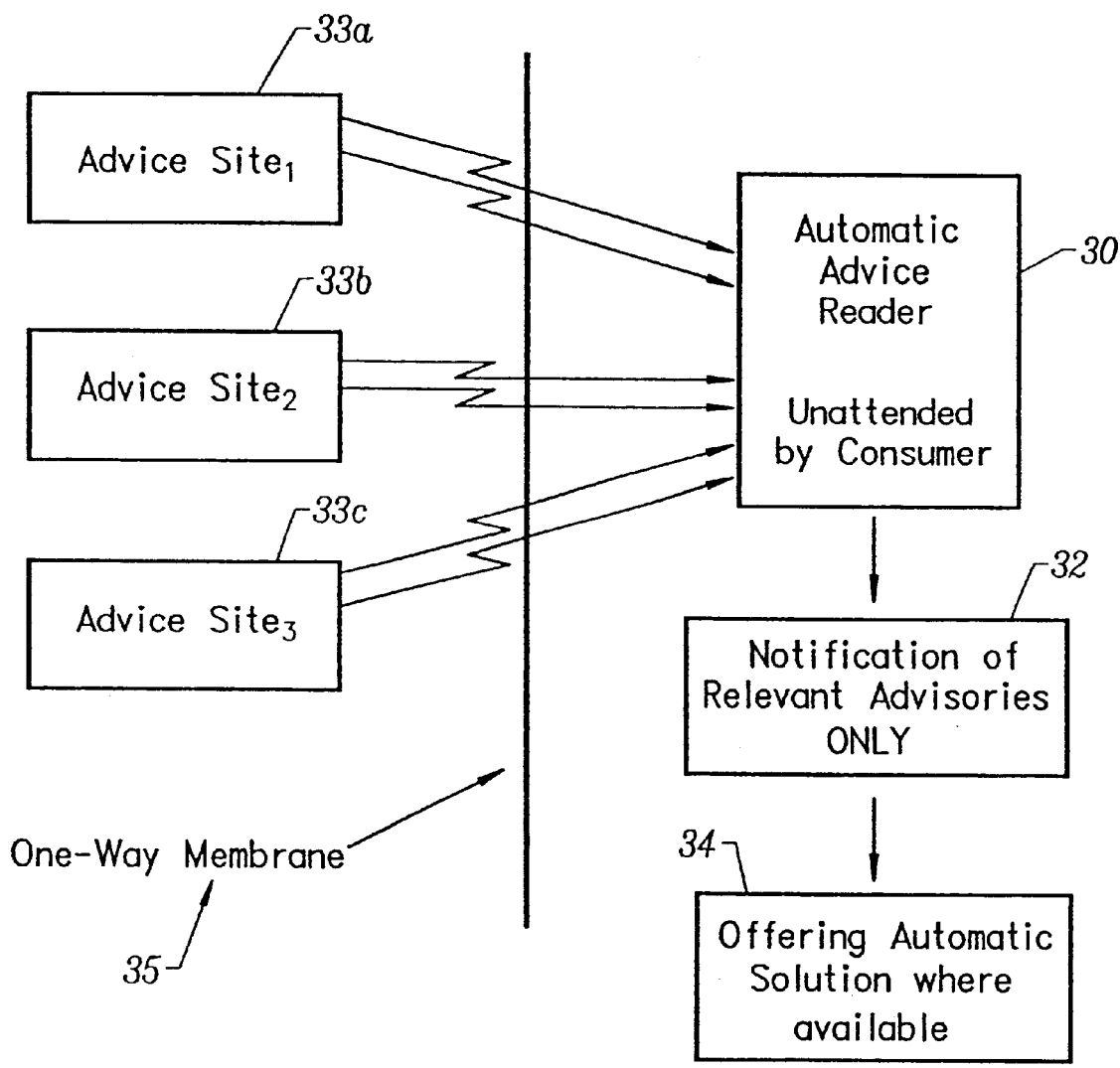
FIG. 3 is a block diagram showing a consumer viewpoint according to the invention.

The advice reader 30 (see FIG. 3) may operate automatically to determine relevance. It may present to the consumer a display of relevant advisories 32 only from several advice sites 33a–33c, so that the consumer is not burdened with the task of reading irrelevant advisories. In this way advisories may provide an automatic diagnosis 34 to any problem which a relevance clause may describe.

Advisories are digital documents which may contain an explanatory component, describing in terms the consumer can easily understand the reason that the advisory is relevant and the purpose and effects of the action which is being recommended to the consumer. These digital documents may also contain, as another component, executable computer programs, or links to executable computer programs. In this way advisories may provide an automatic solution to any problem which the relevance message may have diagnosed, and which may be activated at the consumer's discretion.

In short, the invention posits a situation where proactive advice providers identify situations of interest to consumers and provide advice about dealing with such situations.

Computer Technical Support Application.

Figure 4:
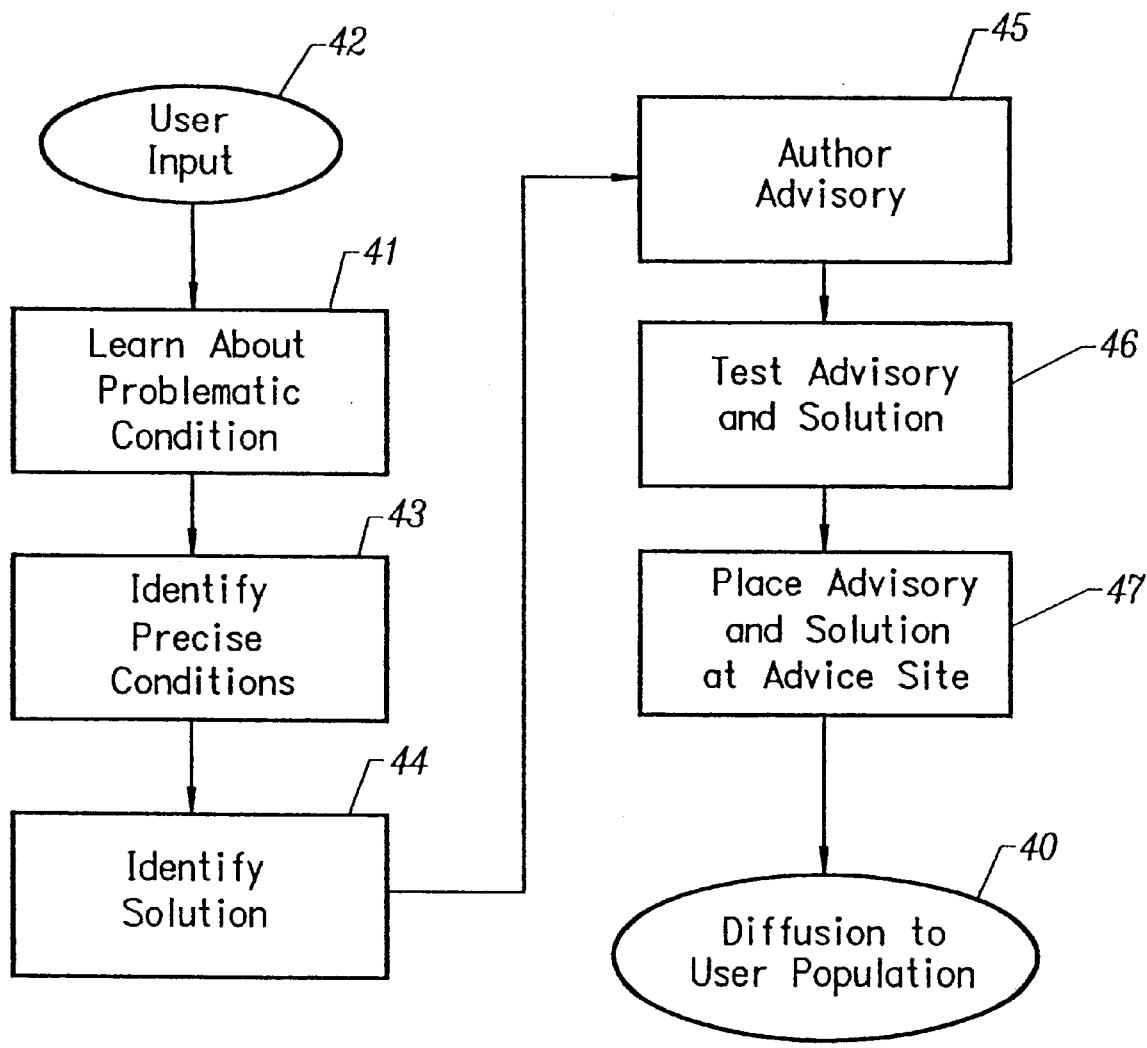
FIG. 4 is a flow diagram showing a technical support application according to the invention.

To make the above generalities more concrete, a particular application area is described where this communications process may be of considerable utility (see FIG. 4).

In the technical support application, the advice provider offers a computer-related product or service, such as hardware, software, Internet service, or data processing service. The advice provider has a potentially large, potentially widely distributed customer base 40. In part from user input 42, the advice provider knows of problematic situations 41 which may affect certain computers belonging to the customers. The advice provider identifies these problematic situations 43, which may include the use of out-of-date versions of software, improper system settings, conflicting combinations of software applications, inadequate physical resources, corrupted files, other similar phenomena. The advice provider may know, for each problematic situation, a precise combination of hardware, system configuration, database configuration, timeliness, and other attributes which may signal the situation. The advice provider may know a precise solution 44 to each problematic situation, which may include:

A suggestion to the user to modify usage patterns;
A suggestion to the user to read a document;
A proposal to upgrade to a new software version;
A proposal to modify system settings;
A proposal to run a certain script to effect a solution; or
A proposal to download and execute special applications to correct the situation.

The advice provider authors an advisory 45, which is then preferably tested 46, and made available to relevant users at an advice site 47. In this way, the advice provider can use invention to reach the consumer population efficiently. The provider packages the information about the specific situation as a formal advisory concerning the situation. This digital document may include:

A precise formal-language specification of conditions under which the situation occurs;
Explanatory information intended for consumers who are in the given situation, describing to those consumers the situation they are in, the implications of the situation, and the providers proposed actions to correct the situation; or
Digital content providing automatic solution or response.

Figure 5:
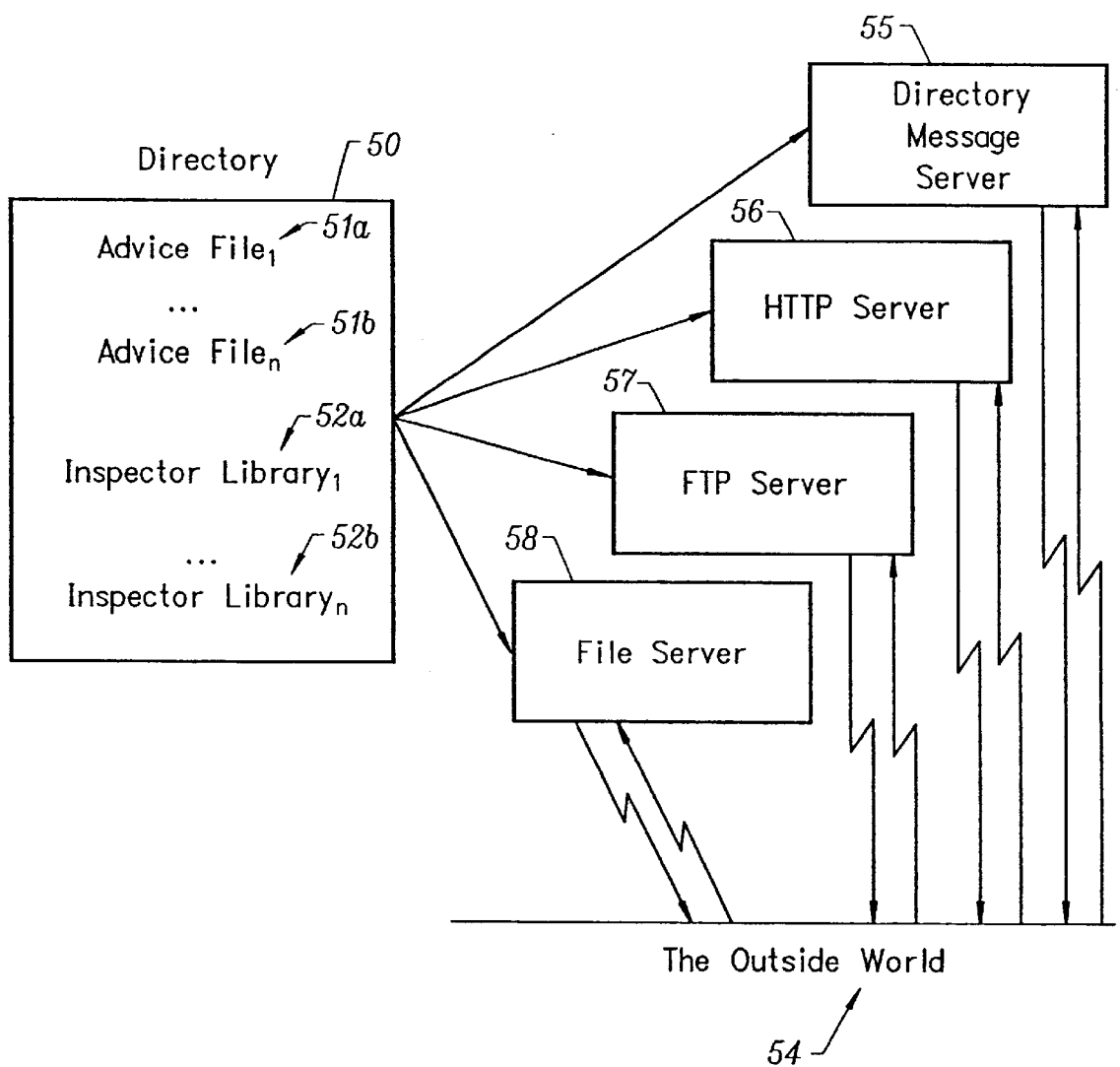
FIG. 5 is a block diagram showing an advice site according to the invention.

The advice provider publishes the advisory 40 over the Internet or an Intranet, through an advice server running at the provider's advice site. For example (see FIG. 5), the advice site may comprise a directory of advice files 51a–51b and inspector files 52a–52b (discussed below). These advisories may be communicated to the outside world 54 via such media as a directory message server 55, an HTTP server 56, and FTP server 57, or a file server 58.

The advice consumer is a user of the products and services of the advice provider who knows of the advice provider's advice site and generally trusts the provider's organization and the advice that it authors. The advice consumer has available on his computer the advice reader application. The advice consumer instructs his advice reader to subscribe to the advice site offered by the advice provider.

The advice reader 20 (see FIG. 6), at scheduled intervals or under user manual control via a user interface 65, gathers advisories to which the user subscribes. Subscription to advisories are entered with a subscription manager 67 based, at least in part, on information in various user site definition files 68. Advisories are gathered from the advice provider's advice sites 33a–33b using a gatherer 60. The reader then parses the advisories using an unwrapper 61 and adds these advisories to any already existing body of advisories. Advisories may be provided to the reader via any of several sources, including alternate input streams 62. The advice reader determines the relevance of any of the existing or new advisories with a relevance evaluation module 63. This determination is made either continuously, at scheduled intervals, or under user manual control. The advice reader includes a user interface 65 that receives relevant advisories and a display and management system 66 that displays relevant advisories for inspection by the consumer the relevant advisories. In some embodiments of the invention, an advisory may also be subject to digital verification using a verification module 64 (discussed in greater detail below).

A typical relevant advisory is reported to a consumer as follows:

Your computer has a certain combination of hardware and software and settings. Computers with this combination have frequently been reporting a particular problem. Our company has a solution. It will change your computer settings. If you accept to use this solution, your problem will go away. This solution has been rigorously tested before release, and represents our best known way of dealing with this problem.

Figure 7:
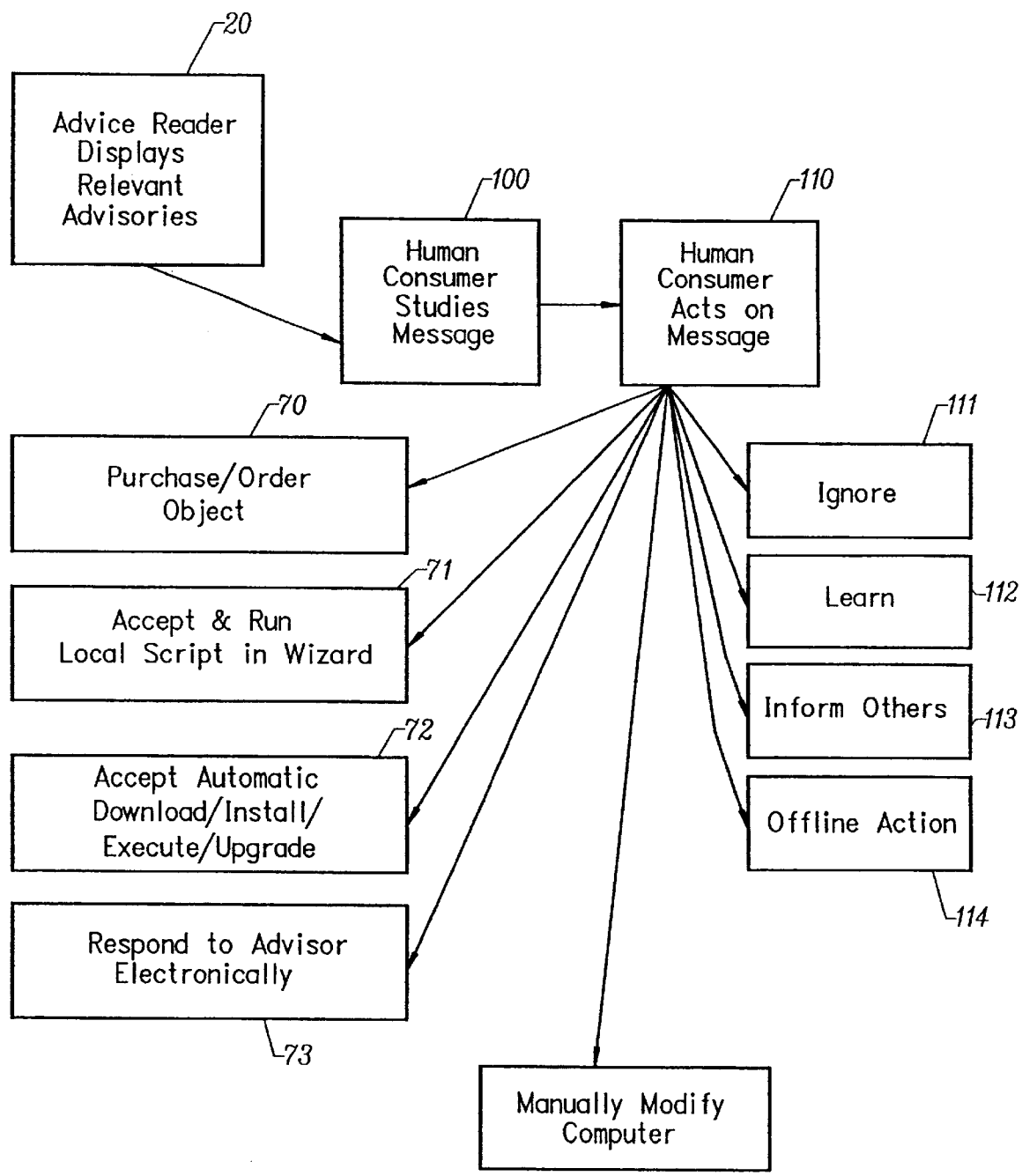
FIG. 7 is a block diagram showing consumer response to relevance notification according to the invention.

The advice consumer reviews such relevant advisories 100 (see FIG. 7), and acts on the advisories 110, for example by ignoring the advisory 111. Otherwise, the user potentially deliberates, which deliberation may include informing himself further about the advisory or its author 112, informing others of the advisory 113, or taking some other offline action 114 and then, depending on the outcome of the deliberation, he approves or denies approval. If the consumer gives approval, an automatic solution may result, which may involve a variety of activities, including software downloading 72, installation, and execution 71, an automatic electronic response 73, or the purchase or order of a digital object 70.

This particular application area shows how invention can be used to diagnose and fix problems on a computer automatically. There are many other applications areas of the invention, which may involve making commercial transactions rather than fixing computer problems, or offering new forms of private communications.

Responsiveness to Concerns

The invention is fully responsive to the concerns discussed above.

Provider Concerns

Large Scale Communications.

In common with other computer-mediated communications systems, such as the world-wide web, the invention is able to reach a large number of consumers and convey to them a large body of informational messages, at low cost.

Automatic Operation.

The matching of information to consumers is done without the need for case-by-case intervention of skilled human operatives.

Exclusive Targeting.

The invention enables information to flow precisely to the appropriate consumers. The provider can guarantee this by carefully specifying the conditions under which a piece of advice is relevant.

Targeting with Intimate Knowledge.

Information targeting in the invention is precisely focused on the attributes of the consumer because it has access to intimate knowledge of the inner details of the consumer computers state, without necessarily disclosing this knowledge to the provider. This degree of targeting is not possible under other protocols because other protocols require disclosure of this information to the provider to determine if a piece of information is relevant.

Consumer Concerns

The invention satisfies the main consumer concerns mentioned earlier.

Automatic Unattended Operation.

The invention is an automated messaging system which operates successfully with infrequent consumer involvement. The advice reader can periodically gather new advice from advice sites that it subscribes to. This process may be fully automatic (manual intervention is also available). The databases of advice resident on the consumer computer may be continually evaluated for relevance by automated unattended operation of the advice reader.

Provision of Narrowly Targeted Information.

In a typical mode of operation, the consumer only sees information relevant to his precise attributes, including attributes derivable from the contents of his computer, associated peripherals and affiliated computers.

Timely Provision of Information.

In a typical mode of operation, a piece of advice may enter the consumer computer and remain resident for an extended period of time before becoming relevant. information is displayed when it has become applicable, not before it does.

Opportunity for Deliberation.

Typically, the advice reader does not automatically apply a recommended solution operator. Rather, the advice reader gives the consumer the chance to study the diagnosis and recommendation, and to evaluate the credibility of the provider, before proceeding. There are three special aspects to the deliberation process available in invention:

Disclosure of Potential Risks. By exploiting known user interface methods, such as HTML display with hypertext links, the invention enables advice providers to inform consumers fully about potential risks associated with following a certain recommended course of action.

Discovery of Consumer Complaints. Via devices to be discussed below (such as the Better Advice Bureau) consumers may use the advisory mechanism to inform themselves about the existence of known and foreseeable privacy and security risks associated with specific advisories and/or advice providers before accepting proposed solutions.

Correction of Known Defects. The invention allows advice providers to retract their own faulty advice. An instance of this is the UrgentAdviceNet mechanism (discussed below) for rapidly distributing advisories to the invention population.

Automated Solution.

Typically the advice provider authors an advisory in such a way that the advice reader offers it to the user to apply a recommended solution operator automatically after the user has given approval. Thus, the invention offers an automated solution to the user's condition under user guidance.

In short, the invention provides a mechanism to match consumers with highly specific relevant advisories efficiently in a communications structure which is responsive to consumer concerns.

Security and Privacy Technique: One-way Membrane

The disclosed invention offers a comprehensive process for computed-relevance messaging. This is a broad idea, with many possible applications. In certain settings, this type of messaging must be implemented in a fashion which pays special attention to security and privacy concerns, i.e. a one-way membrane 35 (see FIG. 3). For a concrete instance, consider the technical support application (discussed above), where:

Communication must take place over public networks such as the Internet;

The advice provider is a large business or other concern; and

Advice consumers make up a widely distributed group of lay users.

In this setting, consumers have special concerns about any process which functions as if it had intimate knowledge of the consumer's computer and its contents. These concerns are legitimate because the Internet is widely known as an insecure communications medium. Hence, systems which interact with the Internet, and which appear to function as if they had intimate knowledge about a user, might appear to enable privacy intrusions.

The invention addresses this problem by proposing a method of interaction between the consumer computer and the Internet which protects the consumer's privacy. This mechanism need not be used in other settings. For example, in certain private computer networks, commonly referred to as intranets, the invention has a variety of applications. In such settings, security and privacy are considered guaranteed by physical control of the computer and communications infrastructure involved, and possibly by contracts creating obligations on the participants in the process.

The invention employs a special protocol for subscription and gathering in the security and privacy critical setting. For purposes of the discussion herein, this setting is referred to as the Anonymous Exhaustive Update Protocol (AEUP). The intention of this interaction protocol is to create a one-way membrane, where information can enter the consumer computer in the form of advisories, but information about the consumer does not leave the consumer computer unless it is the consumer who initiates the transfer.

The AEUP protocol is described as the default protocol of the invention. The reasons that this protocol offers consumers privacy is discussed below. This document also describes many applications where security and privacy are not critical to acceptance by the consumer. Thus, it is possible to provide a certain degree of security and privacy protection without using this protocol. See below for a discussion of alternative protocols, such as the Anonymous Selective Update Protocol (ASUP).

A comprehensive discussion of privacy and security concerns is given below. The invention addresses:

Consumer Privacy Concerns. The invention fully respects consumer privacy concerns. In an implementation offering AEUP, consumers may benefit from narrowly-targeted advice without ever needing to reveal their identity, nor any of the attributes that were checked in determining relevance, nor the fact of relevance itself.

Consumer Initiative. In a typical mode of operation, no advice is received by the advice reader unless the consumer initiated the subscription. This protects the consumer from unwanted communications.

Privacy of Automatic Operations. Under AEUP, the operation of gathering advice from sites, the operation of evaluating relevance, and the operation of displaying relevant advice to the consumer need not result in the disclosure of consumer data to the advice provider.

Frustration of Intrusions. Certain embodiments of the invention contain mechanisms, described below, to prevent compromises of privacy even in case of certain illegal eavesdropping activities Consumer Security Concerns. The invention fully respects consumer security concerns. In an implementation offering AEUP, consumers may benefit from narrowly-targeted advice without exposing themselves to security threats from malicious sources.

Consumer Initiates Subscriptions. In a typical mode of operation, no advice is received by the advice reader unless the consumer initiated the subscription. The process of subscription to an advice site connotes limited trust by the consumer for the provider. Hence, in typical operation, advice is only received from trusted sites.

Harmlessness of Automatic Operations. Typically, the process of gathering and evaluating advisories has no noticeable effects on the computer system. Any recommended solution is applied only upon prior notification of the user and subsequent approval. Consumers who use invention to merely peruse relevant messages, but do not follow the recommended actions, face no significant risk.

2. Disclosure of Potential Risks. By exploiting known user interface methods, such as HTML display with hypertext links, the invention enable advice providers to inform consumers fully about potential risks associated with following a certain recommended course of action.

2. Discovery of Consumer Complaints. Via devices that are discussed below (such as the Better Advice Bureau), consumers may use the advisory mechanism disclosed herein to inform themselves about the existence of known and foreseeable privacy and security risks associated with specific advisories and/or advice providers before accepting proposed solutions.

Correction of Known Defects. The invention allows advice providers to retract their own faulty advice. It allows other people to criticize an advice providers faulty advice.

2. Automated Solution. The advice provides typically authors an advisory in such a way that the advice reader offers to apply a recommended solution operator automatically to the user system after the user has given approval.

Thus, the invention provides a mechanism for efficiently matching consumer with highly specific relevant advisories in a communications structure which is responsive to consumer concerns.

Layers of Invention

The present document describes computed relevance messaging from many viewpoints, i.e. from one extreme of a general communications process to the other extreme of a set of specific protocols that have been implemented by Universe Communications, Inc. of Berkeley, Calif. It is worthwhile to classify the several layers of the invention as described herein:

Relevance Guided Messaging. The general communications process used by the invention has five elements (see FIG. 8):

A Relevance Clause 80. An assertion about the state of a consumer computer, its contents, or environment which can be automatically evaluated by comparing the assertion with the consumer computer's actual state. Typically, the relevance clause is preceded by a subject line 82 which gives a general description of the advisory's subject matter.

An Associated message 81. A message or messages associated with the clause whose suitability for the consumer is determined at least partially by the evaluation of the clause.

Figure 6:
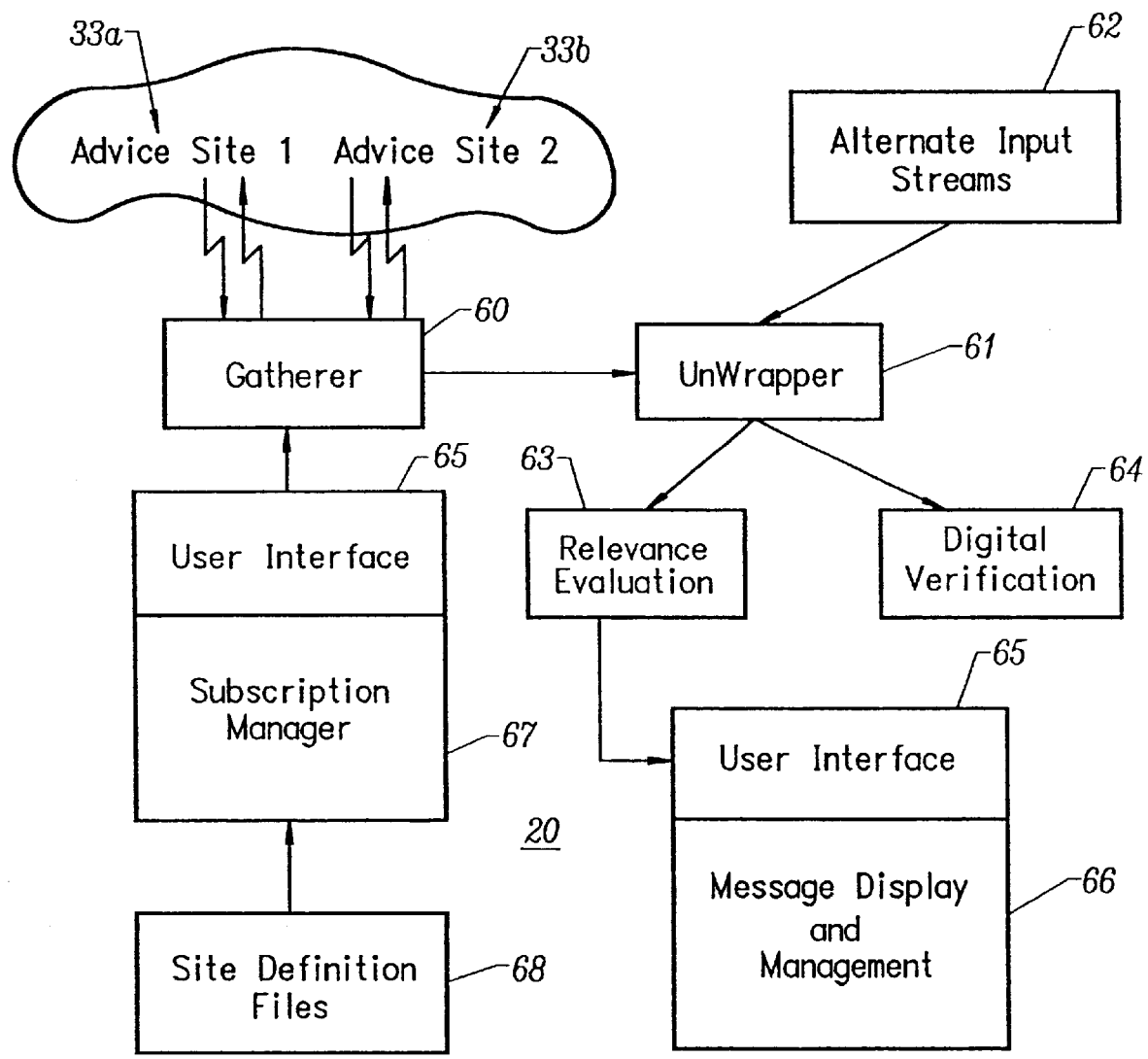
FIG. 6 is a block diagram showing an advice reader according to the invention.

A Gatherer 60 (see FIG. 6). An application that sees to it that relevance clauses flow into the consumer computer from various locations, perhaps by regular synchronization.

A Watcher 63 (see FIG. 6). An application that has the ability to evaluate relevance clauses, i.e. assertions about consumer computer's own environment, by comparing them with the actual state of the environment, and by inspecting properties of the consumer computer and its environment and checking if these point towards or away from relevance.

A Notifier 65, 66 (see FIG. 6). An application that has the ability to display messages to a user under at least partial guidance of an evaluated relevance clause.

A key difference of the invention from other targeted information providers is that the invention provides a detailed tool for tapping into very highly defined targets, which other protocols for targeting information cannot match because they do not routinely have access to the state of the consumer's environment.

The details of relevance guarded messaging are less important than this five-part model. For example, in one implementation, the five-part model is run on a computer network in a secure network such as a corporate intranet. In another implementation, the five-part model is run on a public computer network such as the Internet. Certain concerns that affect the public setting (e.g. security and privacy) might be completely irrelevant in the private setting, where those concerns are addressed by the physical control of the network. In either setting, the basic five-part model of relevance guarded messaging makes a valuable contribution to connecting providers with consumers.

It is important to note that this five-part model may have embodiments in which these five parts are not immediately evident. Potential implementations which make it clear that there can be many superficially different ways of achieving this basic structure are described below. For example, the relevance clause and the associated message may be packaged together in the same file and communicated simultaneously. In a different embodiment, the relevance guarded message can be communicated in two stages, where the first stage sends a relevance clause, and the second part is sent only if the first part leads to a relevant result and if the consumer computer asks the provider for the second part. Conceptually, the same useful effect can be obtained using either of these two messaging protocols. Both methods are embodiments of the same invention.

Relevance Guarding with Security and Privacy.

Owing to the tremendous importance of public networks, such as the Internet, an implementation of the five-part model which also addresses fundamental privacy and security concerns is of great significance. The mechanism by which the basic five-part model is extended (e.g. through AEUP, ASUP, or substantially equivalent protocols) to become a secure and private system over public networks is an important embodiment of the disclosed invention. It is potentially helpful for the broad consumer acceptance of computed relevance messaging.

Preferred Embodiment of the Invention.

The presently preferred embodiment of the invention consists of a large collection of different interacting components, carefully designed to meet the goals underlying this system. The many subsystems illustrate the potential of the invention in the technical support application. Those skilled in the art will appreciate that there are many other applications to which the invention may be put.

Variant Implementations.

The specific implementation was arrived at after a long series of different application areas were examined and carefully studied. This document describes in considerable detail a large number of variant implementations modify the basic operation of the central implementation for other market areas or other demands. For example, in certain settings, the use of low communications bandwidth is important and privacy is unimportant. A variation for that setting is discussed below.

Invention Components

The following discussion describes the key components in what is currently regarded as the best mode of implementing the disclosed invention. In this implementation it is assumed that communications are via standard Internet techniques, and that the advice provider and advice consumer are both relying upon standard network connected computers.

Advice Provider Components

The following is a listing of component names, followed in various subsections by a brief discussion of each component:
advice site
advisories
site signature
site description file
inspector library files
supplementary files While these general components may be implemented in many ways, it easiest to describe their form and function in the currently understood best mode, based on the use of Internet communications protocols. Those skilled in the art will appreciate that this is not the only possible implementation.

Advice Site

This is a standard place on the Internet (see FIG. 5), e.g. a URL-addressable directory on a server computer, combined with server software that responds to certain TCP/IP requests for information.

The site directory may contain a plurality of files, including advisories, digests of advisories, and inspector libraries.

The software associated with the server may perform the functions of an HTTP server, an FTP server, or a file server, thereby providing access to the files stored in the directory using well-known communications protocols. The software associated with the server may also perform the functions of a specialized server, implementing invention-specific communications protocols.

These protocols may include:
The ability to serve a directory message describing the contents of the site directory, including filenames, sizes, and dates;
The ability to serve an abstract message which describes in abbreviated form the contents of the files in the directory;
The ability to engage in security handshaking;
The ability to perform challenges to advice readers to validate their authenticity; and The ability to meter traffic through the site, and compute summaries of traffic levels.

The function of advice site server software is to process certain requests made by an advice reader running on a consumer computer. The advice reader may request information about the directory of the site, may ask for abstracts of advisories, and may ask for contents of individual advisories. The transaction between advice server and advice reader is described further below.

Advisories

The advisories in an advice site are digital files. Advisories typically have some of the following components:

A relevance precondition written in a formal relevance language, which is used to describe attributes of a computer and/or its contents and/or its environment. For more information on the relevance language, see below.

A humanly-intelligible component which may summarize the purpose of the message, may describe the author, may explain the precondition in human language, and may explain the solution in human language.

A computer-intelligible component which potentially offers either software tools to solve the problem or Internet access to software tools solving the problem. In the currently understood best method for this implementation, an advisory is a specially formatted ASCII file built using the MIME Internet standards track specification documented in RFC 1521 et seq. (see N. Borenstein, N. Freed, *MIME (Multipurpose Internet Mail Extensions) Part One: Mechanisms for Specifying and Describing the Format of Internet Message Bodies,* Internet Standards Track RFC 1521(1993)). This format is currently used for transport of Internet mail; it contains headers documenting the sender of the message and its subject, and mechanisms for including digital signatures. A MIME file is easily transported over the Internet and is easily broken into its constituent components using parsing algorithms well-known in the Internet community. The advisory file format is described further below (see, also *A Guide to Writing Advisories for AdviceNet,* Universe Communications, Inc., Berkeley, Calif. (1998)).

Authoring Advisories.

Site Signature

Associated with an advice site may be a certain digital signature mechanism, for example one of the standard signature mechanisms using public-key/private-key pairs. The signature mechanism may be used to sign advisories in a fashion that allows advice readers to verify that the advisory was in fact authored by the advice provider.

Site Description Files

The site description file (SDF) is a specially structured ASCII text file authored by the advice provider. It describes the provider's advice site and serves as the basis for a consumer to initiate a subscription. This file specifies the site location (URL), the site name, and site security characteristics, such as whether the site avows only advice which has been digitally signed. It also provides various parameters of the subscription process intended for use by the advice reader (for example, the recommended frequency of synchronization, and the type of subscription relationship (free/fee)). It may contain humanly interpretable text indicating the purpose of the site.

The SDF may also contain the public key associated with advice authored by the site. This public key is needed to verify signatures on advice authored by the site.

The SDF may also be signed by a trusted authority, to establish the authenticity of this site description file. For example, it may be signed by advisories.com or the Better Advice Bureau: see below.

The SDF may also contain a ratings block, provided by a trusted ratings service, to establish trust in the respect for privacy and security and the usefulness of advice at this site. See, for example, below.

Inspector Libraries

Inspector libraries are libraries of special purpose executable code, which may be accessed by advice readers for the purpose of extending the capabilities of the relevance language. In effect, inspector libraries provide a mechanism for advice site specific extensions to the relevance language.

Supplementary Files

The contents of the advice site discussed so far play important roles in the ordinary conduct of the invention. In one typical implementation, additional files may be present in the advice site directory. In such an implementation, data and applications files which do not play a role in the conduct of the invention per se may be included in the advice site directory. These files are distributed as are other files at the advice site. This implementation allows the distribution of installers, uninstallers, shell scripts, JAVA, and Visual Basic programs, i.e. in general, packages of data, applications, and other resources, that may play a supporting role in evaluating and following advice issued at the site. For example, such additional files may play a role as databases searched by the advice provider's own inspector libraries or as applications used in implementing the advice providers recommended solutions.

Advice Consumer Components

The following is a listing of component names from the advice consumer perspective, followed in various subsections by a brief discussion of each component:

advice reader
subscription database
advice database
user profile
inspectors
solution wizards
advice reader The advice reader is an application running on the consumer computer. It is responsible for liaison with the advice site and for managing interactions with the user. The advice reader maintains a directory of files on the consumer computer. Inside that directory are contained various files described below which are used/managed in the course of advice reader operation.

The advice reader has a number of jobs, which are listed below without elaboration:

Manage subscriptions
Synchronize with advice site
Gather advisory files
Unwrap advisory messages
Manage advice Database
Manage relevance Evaluation
Evaluate relevance of Individual advisories
Invoke inspectors
Display relevant advisories to User The process is described in detail below.

Subscription Database

The advice reader maintains a database of subscription information which allows for the scheduling and conduct of site synchronization by the gatherer component. The subscription database contains information about the address of the advice site; information and recommendations provided by the advice sites site description file, such as recommended frequency of synchronization; information needed to verify digital signatures associated with the advice site; and information associated with the users experience with the advice site.

Advice Database

The advice reader maintains a database of advice that has been received from various advice sites. These may be indexed according to the site from which they were received according to the systems that the advice concerns, or according to other principles which would be helpful to the consumer or to the author.

The advice reader may organize advice into pools of advice which share a common basis for treatment. Examples of this principle include a pool of advice specially targeted to the concerns of one user of a multi-user consumer computer, a pool of advice scheduled for manual relevance evaluation only, and a pool of advice scheduled for nightly evaluation at a certain time.

User Profile

The advice reader maintains a special file or files containing data which have been obtained from interviews with the user, deduced from his actions, or deduced from the properties of the computer or its environment. Such data may describe the computer or its environment, and may also describe preferences, interests, requirements, capabilities, and possessions and plans of the user, including things unrelated to computer operations.

The file or files may be encrypted. The file or files may be organized by advice site so that they describe interests, preferences, and so forth to be accessed by relevance queries associated with a specific site only.

Inspectors

Inspector libraries contain executable code which may be invoked by the advice reader as part of the relevance evaluation process. Inspectors can examine properties of the consumer computer, storage devices, peripherals, environment, or remote affiliated computers. These are further described below.

Solution Wizards

Solution wizards support the process of automated solution. They are applications which can perform stereotyped functions that are frequently of use for solving problems on computers. These are described further below.

Transaction Overview

The following discussion describes the basic model for an Internet-based transaction using the invention.

Subscription Model

In the invention, the initiative to begin an interaction typically comes from the consumer. The consumer becomes aware of the existence of an advice provider and associated advice site(s), for example, as part of installing a new hardware or software product on his computer, or as a result of advertising, or sharing experiences with other consumers. The consumer, after potentially informing himself about the kind of advice being offered at that site and its reliability, makes a decision to subscribe. The consumer, interacting with a piece of the advice reader called the subscription manager 67 (see FIG. 6), configures the advice reader to subscribe to the given advice site, by supplying it with either the corresponding site description file 68, or with a pointer to such a file, or with a pointer to the site itself which contains an instance of such a file. The consumer, after studying the terms of interaction recommended in the SDF, configures the parameters associated with the subscription, which control how frequently advice from the site is gathered.

Advice Gathering Using AEUP

Periodically, under the terms of the subscription, or manually under user control, the advice reader initiates a site synchronization. A component of the advice reader, referred to as the gatherer, has the duty to synchronize the consumer site image with the current image of the advice site. These states can be different if the advice site has retracted advice or authored new advice since the most recent synchronization. The gatherer makes sure that there is a one-to-one correspondence between advisories at the advice site and advisories in the consumer machine. The gatherer opens a connection to the directory message server at the advice site. After an optional security handshake to verify the authenticity of the advice reader and server, the gatherer queries the server for a directory message. The gatherer inspects the response and checks whether the site directory has changed since the previous synchronization. If not, there is no need to obtain any files from the advice site, and the session may end. If the directory has changed, or if this is the first synchronization ever, the gatherer initiates FTP and/or HTTP and/or file server access to the new files. The gatherer also deletes any advisories on the consumer computer which no longer correspond to advisories on the server, and this terminates the synchronization of the consumer site image with the true site image.

The protocol just described is the AEUP protocol that is described above. The gatherer is allowed, by the advice server, to gather all the files at the advice site anonymously or, at any rate, all files which have not previously been gathered. The intention is that the advice stored on the consumer machine consists at any given moment of all the advisories offered at the advice site at the time of the last synchronization, other than those that the user has specifically deleted. Hence, there is no selective gathering. Rather, gathering is exhaustive, i.e. every piece of advice is gathered. The implications of this protocol and alternative protocols are discussed below.

Unpacking Advisories

As described below, an advisory file is a potentially complex hierarchical structure, which may contain one or more than one message. The advice reader unpacks all the components of this structure. Components of the structure may be signed using a digital signature method, i.e. at unpacking time those signatures are verified. After unpacking, the advisories are entered in a pool of all advice, old and new, to be evaluated. In one typical implementation, the invention may suppress entry into the system of unsigned advisories or of advisories whose signatures cannot be verified.

Relevance Evaluation

Figure 9:
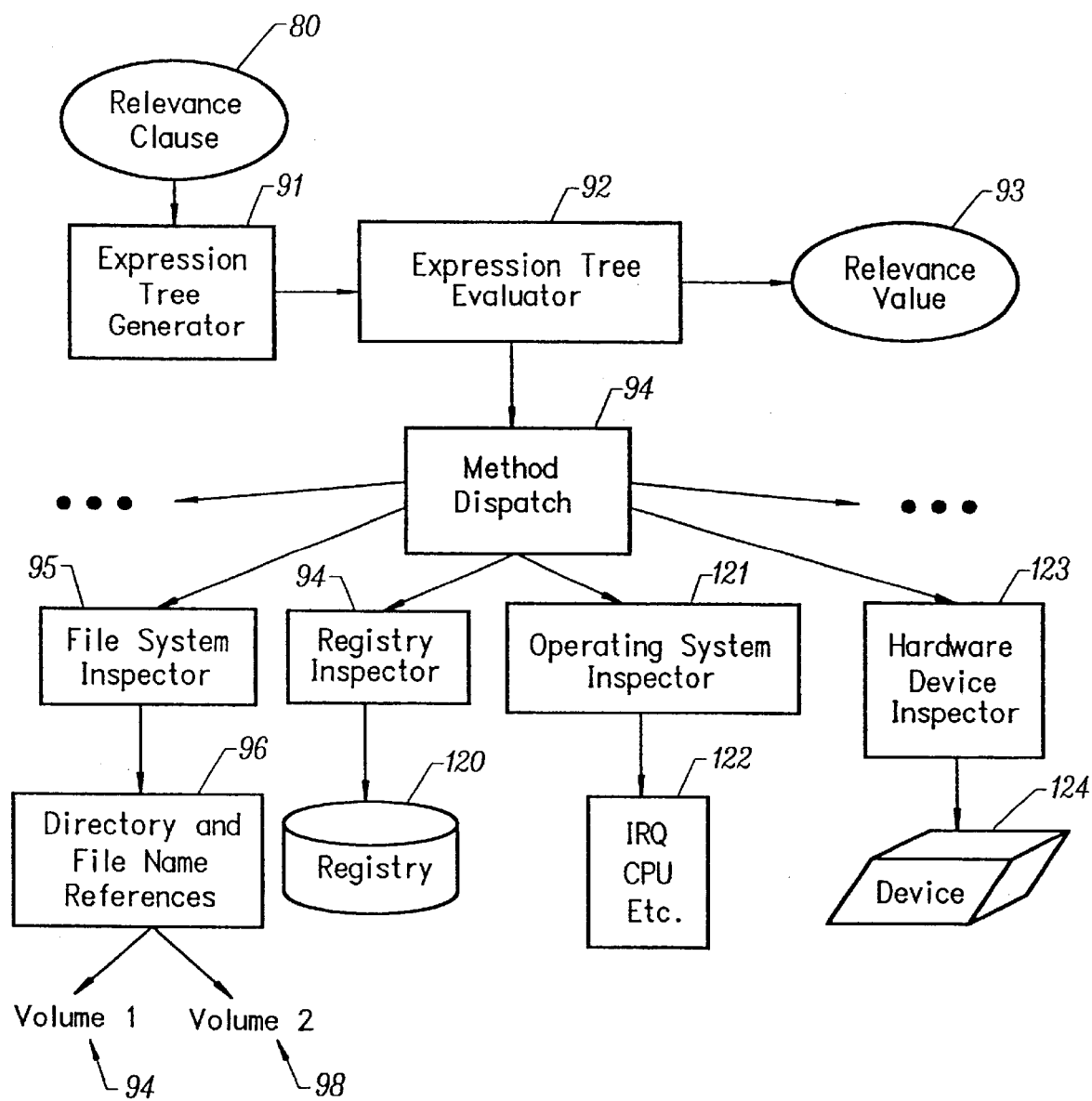
FIG. 9 is a block diagram showing the process of relevance evaluation according to the invention.
Figure 10:
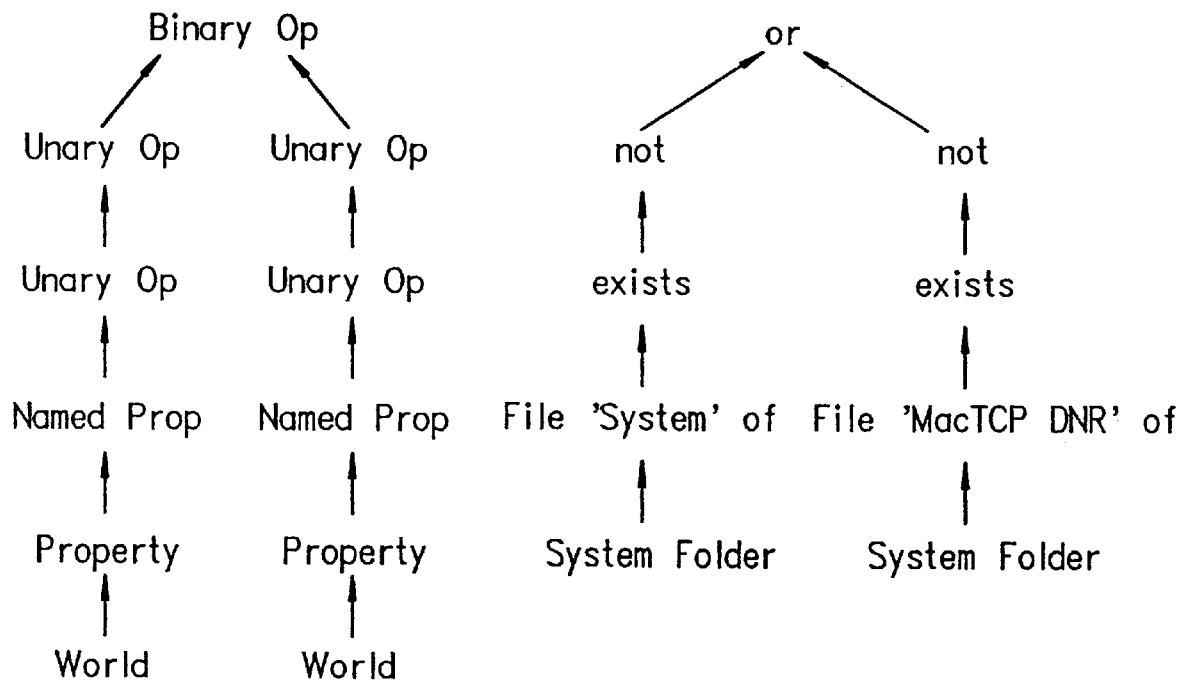
FIG. 10 is a flow diagram showing expression tree generation according to the invention.

As a matter separate from gathering, the pool of all advice to be evaluated may be processed, either continuously, or according to a consumer-defined schedule, or an immediate user request, or some specified trigger event (see FIG. 9). The advice reader parses the individual message and identifies the clauses determining relevance. These clauses are expressions in the formal relevance language which is described below. The advice reader parses the clauses using an expression tree generator 91 into a tree of elementary subexpressions (see FIG. 10) and then evaluates each subexpression of the tree using an expression tree evaluator. If evaluation proceeds successfully and results in a value of True, the message is deemed relevant 93. A dispatch method 94 is then used to consume the advisory which may include a file system inspector that identifies appropriate directory and file name references 96 in various user volumes 97, 98; a registry inspector 99 that inspects an operating system registry 120; an operating system inspector 121 that inspects various system elements 122; or a hardware device inspector 123 that inspects various system devices 124.

Inspectors

Figure 11:
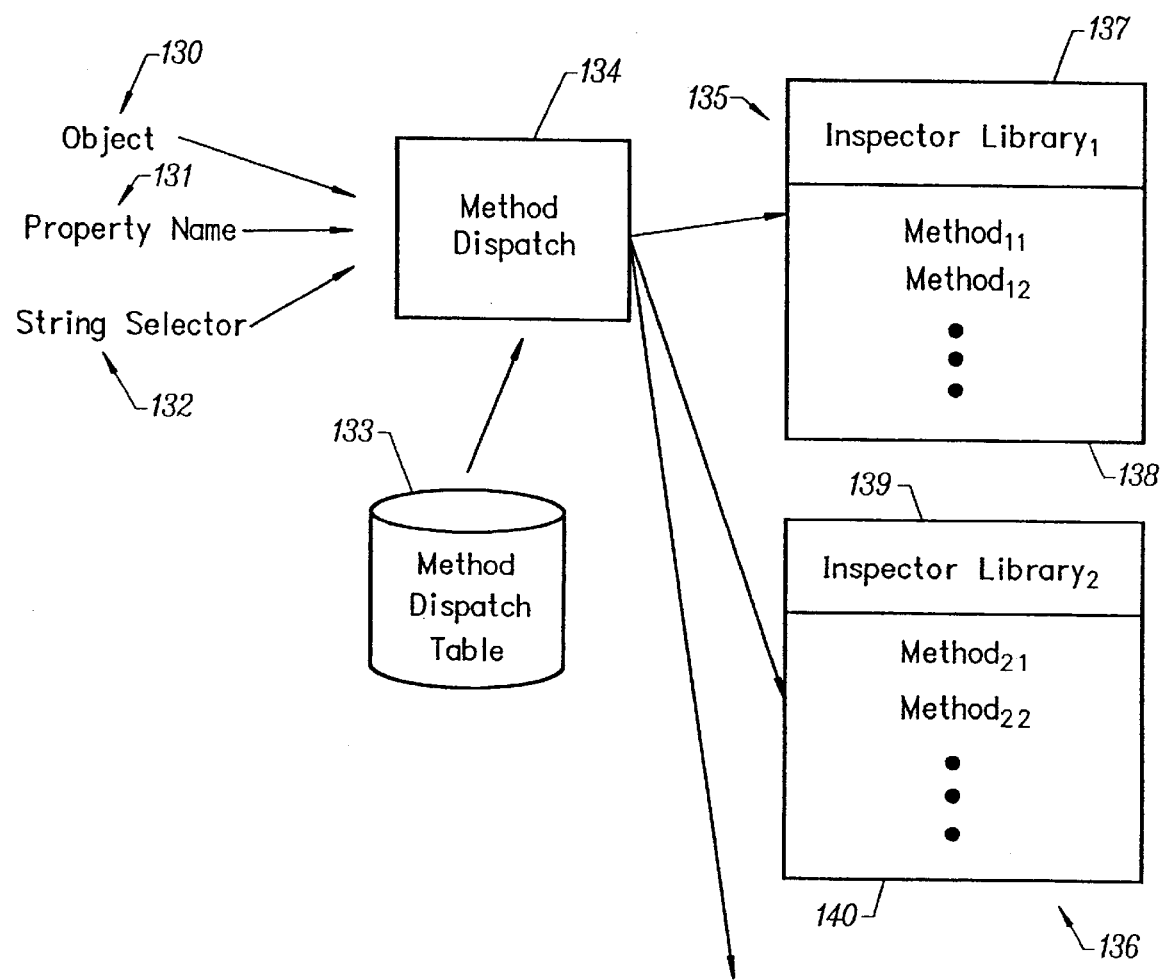
FIG. 11 is a block diagram showing named property method dispatch according to the invention.

Evaluation of subexpressions is performed by methods called inspectors (see FIG. 11) which may perform mathematico-logical calculations, execute computational algorithms, return the results of system calls, access the contents of storage devices, and query devices or remote computers. These methods are called inspectors because a frequent purpose is to inspect the properties of the consumer computer, its configuration, or contents of its storage devices. Inspectors may come built in to the reader, and may also be plugged in via DLL or similar mechanisms. Thus, an object 130, property name 131, and/or string selector 132 is dispatched to a reader using a method dispatch module 134 in accordance with dispatch information contained within a method dispatch table 133. Various inspectors 135, 136 are provided at a user location, each of which includes an inspector library 137, 139 and associated methods 138, 140. Inspectors are described in greater detail below.

User Interface

After relevance has been decided for an item in the advice pool, a relevant item may be entered into a list of items to be displayed. This list may be displayed to the consumer according to typical user-interface models. The user-interface may inform the user about the author of the advisory, about the date the advisory was acquired, about the date the advisory became relevant, about the subject of the advisory, and about other attributes of the advisory message. The user interface may offer the user to display the explanatory content of individual advisories. Depending on the advisory, the explanatory content may contain simple text explanations, or may contain more elaborate multimedia explanations. Depending on the advisory, the explanation may identify the situation which caused the advisory to be relevant, the implications of relevance, the recommended action or actions to take at this point, the anticipated effects of taking those actions or of not taking them, or the experiences of other users or other organizations with the proposed actions. The user studies this explanatory content, perhaps performing additional research (for example studying the trustworthiness of the provider, or the opinions of other users).

Recommended Response

As part of the display of a relevant advisory, the user is typically offered the possibility of an action in response to the situation. Possible outcomes include:

consumer ignores information/proposal. The consumer reviews the advisory, decides he does not wish to pursue it, ignores the content, and deletes the advisory.

consumer is notified. The consumer reviews the advisory, or some other document it refers to, and learns something important or interesting.

consumer is entertained. The consumer reviews the advisory, or some other document it refers to, or some multimedia content it contains, or some multimedia content it refers to, and is exposed to a stimulating presentation.

consumer forwards information to another. This may include friends, family, colleagues, or associates. Forwarding may involve off line transport or electronic transport, such as e-mail.

consumer initiates correspondence with provider or other. This may include contact by mail, phone, fax, or e-mail. This may also include participation in an information exchange, including for technical support, training, or market survey purposes, as well as participation in a sale or other commercial interaction.

consumer initiates on-line participation in a timely event.

consumer purchases object by e-commerce. This may include a purchase entered by clicking on a button in the advice reader window which entry to e-commerce mode.

consumer fills out a form. This may include a form rendered by a Web browser, or a text file form intended to be returned by e-mail, or a form intended to be filled out and faxed or mailed back.

consumer initiates off line action in real world. This may include any off line action ranging from actions associated with the computer modifying the state of hardware devices, gathering information in the environment surrounding the computer, or reading some instructions in a manual before beginning an online process. This action may also include purely personal items.

consumer modifies system setting or data field on computer. This may involve the consumer executing a series of manual operations on the computer to change settings of some system component or software application or to modify an entry in a database.

consumer initiates an Install/Uninstall/Execute solution. This may involve the consumer clicking on a button in the advice reader, followed by automatic execution of a sequence of download/install/uninstall/execute steps, or it may require the consumer to access physical media such as floppy disk or CD-ROM to perform an install under direct supervision. It may involve automatic execution, or execution under user control, following instructions indicated for the user by the advisory.

consumer invokes Script file for solution. The advisory may offer a series of instructions in a high-level system-affecting language, such as AppleScript, DOS Shell, UNIX Shell, Visual Basic, which the consumer is expected to store as a file and then pass to a standard interpreter (e.g. AppleScript Editor, DOS Command Line Interpreter, UNIX Shell Command Line Interpreter, or Visual basic Interpreter). This action may alternatively involve the consumer executing a series of manual operations on the computer that involve typing in commands one by one in a certain window of a certain application.

Many concrete outcomes can be grouped among the outcomes in this list.

Advisory File Format

The advisory file format provides a mechanism to encode one single advisory or several advisories for transport across computer networks and other digital transport media, and to offer one or several variants of same basic explanatory material. The following discussion describes the components of an advisory in general terms and describes the currently understood best method for implementing advisories using MIME.

Components of a Basic Advisory

The most elementary advisory may have these logical components (see FIG. 8):

Wrapper. Components designed to package the information for transport and subsequent decoding.

From Line. Component identifying the advice author.

Subject Line. Component identifying briefly the concern of the advisory.

Relevance Clause. Component in the formal relevance language precisely specifying the conditions under which the advisory could be relevant.

Message Body. Component providing explanatory material potentially explaining to the user what condition has been found relevant, why the user is concerned, and what action is recommended.

Action Button. Component providing the user the ability to invoke an automatic execution of the recommended action.

Clause Variations

Elaboration on the basic scheme may also be valuable:

The advisory may contain an expires-when clause. This is an expression in the formal relevance language which causes the message to expire if it evaluates to True.

The advisory may contain an evaluate-when clause. This is an expression in the formal relevance language which causes the message to be evaluated for relevance if it evaluates to True.

The advisory may contain an requires-inspector-library clause. This may give the name of an inspector library and a URL where it can be found. This indicates that a certain inspector library must be installed for relevance to be evaluated correctly.

The advisory may contain a refers-to clause, giving keyword labeling of systems referenced by the condition associated with the advisory.

The advisory may contain a solution-affects clause, giving keyword labeling of possible effects of the recommended response.

Other variations may be recognized as useful in the future. Such variations are not excluded from the scope of the invention.

Display Variations

The message body may occur in at least three forms:

Text. The explanatory material may be an unconstrained ASCII text document. This has no embedded variations in presentation style (e.g. no changes in font and/or no hypertext references to outside documents).

HTML. The explanatory material making up the message body may be an HTML document. This is familiar from Web browsers. HTML documents may contain variations in the presentation of text, may contain tables and visual formatting features, may contain references to external documents, and may contain references to external graphics files.

Text/HTML. The explanatory material making up the message body may be given in both text and HTML forms. The advice reader has the option of using whichever form is more appropriate to the user.

Further variations in message content, including audio and video content, are not excluded from the scope of the invention.

Digital Integrity and Authenticity

The message body may have digital authentication features appended to the message to insure its integrity and authenticity.

A digital digest may be appended to the message to ensure message integrity. At the time that the message is compiled by the author, a specialized functional of the message body may be computed and appended to the message. The recipient of the message can verify the integrity of the message by computing the same functional and verifying that it produces the same result as that appended to the message. Known examples of digital digests include CRC, MD5, and SHA.

Digital digests are familiar in the computer programming community under the name hashing. The idea is that certain mathematical operations based on modular arithmetic are applied to a numerical representation of a body of text, producing a numerical output ranging in magnitude from a small number to a number requiring some dozens of digits to represent, depending upon the details of the digest mechanism. These arithmetic operations typically produce an output which depends on the original body of text in a discontinuous way which is not easily invertible. That is, slightly different messages tend to have very different digests. Also, it may be difficult to find any two messages with the same digest, and if one of the two messages is previously specified, it is particularly difficult to find another message which happens to have the same digest.

The practical implication is that a transmission or recording error which causes the advisory document to be modified in some way from the authors original intent does not typically result in a modified document that generates the appropriate digital digest. In this way, modified documents can be identified and suppressed from consideration.

A digital signature may be appended to the message to ensure message authenticity (see C. Pfleeger, *Security in Computing,* Second Edition, Prentice-Hall (1996); and *PGP 4.0 Users Manual,* PGP Pretty Good Privacy, Inc. (1997)). This is a refinement of the digital digest idea, rendering the digest secure against malicious tampering.

Digital signatures generally work as follows: At the time that the message is compiled by the author, a digital digest of the message is calculated. The digest is then encrypted using an encryption scheme that is well known and widely associated with the advice site. The encrypted digest is considered the advice site's signature on the message, and is appended to the message itself, labeled as a signature.

The advice reader, in seeking to verify the signature of the site, attempts to decrypt the signature using the well-known decryption algorithm associated with the advice site. A successful decryption produces a digital digest which agrees with the value that the advice reader calculates directly from the message. An unsuccessful decryption produces a result that does not agree with the digital digest of the received message.

It is commonly accepted (see C. Pfleeger, *Security in Computing,* Second Edition, Prentice-Hall (1996); and *PGP 4.0 Users Manual,* PGP Pretty Good Privacy, Inc. (1997)) that this approach, when used in conjunction with certain well-know encryption systems, produces a secure digital document. That is, it is accepted that a malicious agent cannot easily modify a given valid advisory to produce an impostor advisory which produce a successful decryption.

Indeed, to deceive this system successfully, it is necessary for the impostor to generate the digital digest of the modified document correctly and then apply the encryption algorithm associated with the advice site. While the impostor may be assumed to have learned the workings of the digital digest mechanism, it is assumed that he is not able to encrypt documents as if he were the advice site.

The fundamental assumption of modern cryptography systems as applied to public communication is that certain encryption/decryption algorithms can have widely known decryption algorithms and keep the encryption algorithms secret. Until this fundamental assumption is disproved, the digital signature mechanism is widely considered an effective authentication mechanism.

MIME

In the currently understood best method for structuring advice for Internet transport, an advisory document is packaged as a single ASCII text file which is a valid instance of MIME file (see N. Borenstein, N. Freed, *MIME (Multipurpose Internet Mail Extensions) Part One: Mechanisms for Specifying and Describing the Format of Internet Message Bodies,* Internet Standards Track RFC 1521 (1993)). Actually, only a special subset of the full MIME format is used. Special extensions to MIME are added to accommodate the invention.

MIME is an Internet standards track format extending the classical e-mail Internet standard commonly referred to as RFC 822. The MIME format is widely used for Internet transport of electronic mail. It has four features of particular usefulness in connection with advisories:

Header Lines. MIME specifies that a message body may be preceded by an extensive message header consisting of a variety of header lines, where individual lines begin with a well known phrase and contain addressing, dating, and related commentary. Some of these lines can be easily adapted to serve the purposes of the invention. For example, the From Line and Subject Line components of an advisory can be implemented by the From: and Subject: header lines that are already part of the MIME standard.

Extensibility. MIME provides a method for creating new message lines in messages. This includes a method for embedding the new message lines in messages and a method for registering the new line with the MIME authorities. Key invention constructs relevant-when and expires-when may therefore easily be added to the MIME language in that fashion.

Alternation. MIME provides a method, i.e. Multipart-Alternate, for offering two different versions of the same message, with the destination picking the appropriate display method. Therefore, the invention construct of transmitting one or more ways to display the same information may easily be implemented using the MIME standard and its Multipart-Alternate feature.

Digesting Mechanism. MIME provides a well-understood mechanism, i.e. Multipart/mixed, for packing several complete MIME messages into a single file for Internet transport. MIME posits a recursive digest structure, in which a message can have several related components, and each component can itself be a MIME file inserted verbatim. Using this feature, a MIME file can be used to digest many component advisories, organized in a tree structure reminiscent of the branching structure of a modern personal computer file system.

Thus, MIME becomes a tool, not for packaging e-mail, but instead for packaging a new kind of document, i.e. the advisory. To avoid confusion, it should be appreciated that an advisory is unlike e-mail because an advisory does not have an intended recipient or list of recipients. Rather, it is a broadcast message. An advisory typically has relevance and related clauses, and an advisory typically has active content. E-mail does not have relevance and related clauses, and does not typically have active content. The advisory is part of a new form of communications which can be implemented within the MIME standard. The advisory application of MIME addresses a different problem than e-mail by omitting certain MIME clauses which were used for e-mail, and by adding new specialized clauses which are used in the relevance determination and advice management process. In a certain sense, the relationship of advisories to e-mail is comparable to the relationship between USENET and e-mail. Both advisories and USENET news systems use MIME as a packaging mechanism. However, both offer means of communications which are distinct from e-mail.

Although MIME is a convenient method of realizing the form of an advisory, there is no necessary connection of the invention to MIME. There are many other common formats in the Internet world, such as XML, which may be used for representing advisories. In this disclosure, only the currently understood best method for implementing the advice file is discussed.

EXAMPLE

The following is an example of an advisory file:

Date: Sat Mar 21 1998 17:06:12+0800

From: Jeremiah Adviser <jeremiah@advisories.com>

MIME-Version 1.0

Organization: Universe Communications, Inc.

Subject: A better version of the advice reader is now available relevant-When: version of application "advice.exe"<version "5.0"

Content-Type: text/html; charset=us-ascii
<HTML><BODY>
A better version of the advice reader is available.
Click to <A HREF="http://www.advisories.com/win98/advice50.exe">
Download </A>the latest version of advice reader.
</BODY></HTML>

Here the reader can see the various components of an advisory embodied as MIME components:

Wrapper. MIME-Version and Content-Type header lines.
From Line. From: Jeremiah Adviser . . .
Subject Line. Subject: A better version of . . .
Message Body. An HTML fragment, beginning <HTML>and ending </HTML>.
Action Button. Not present in this advisory. The active component of the message (downloading) is handled by the HTML HREF link. The user sees the word Download and typically understands that a mouse click on that word causes the indicated action.

Ratings Blocks

In an additional variation, it is possible for an advisory to contain ratings blocks containing information rating the advisory according to criteria such as privacy, security, and usefulness. There exist standard formats for such ratings blocks (see Khare, Rohit, *Digital Signature Label Architecture,* The World Wide Web Journal, Vol. 2, Number 3, pp. 49–64 Oreilly (Summer 1997), http://www.w3.org/DSIG) and these are easily appended to messages with MIME structure. See also below.

Relevance Language

Advisories have a format resembling the format of e-mail messages, with many of the same components in the message/digest headers. One key extension offered by advisories is the institution of a new clause in the message, i.e. the relevance clause. The relevance clause is preceded by the keyword phrase relevant-When:. An expression from the relevance language follows the keyword. The following discussion describes the currently understood best method for describing the state of a consumer computer.

Descriptive Language

The purpose of a relevance clause is to examine the state of an individual computer and determine whether it meets various conditions which combine to imply the relevance of a certain advisory.

In the currently understood best method for implementing the invention, the language itself, i.e. in the allowable phrases of the language and the underlying semantics of the phrases, provides an intellectual model of the components of the consumer computer, its peripherals, storage devices, files, and related concepts. This is distinct from the usual model of computer languages, in which the language itself provides a rather meager picture of the problem it is used to address.

In common with traditional languages, the relevance language contains a few elementary data types, such as Boolean, integer, and string. Also in common with traditional languages, it is permissible to write arithmetico-logical expressions such as:

$$(2346+(-1234)/(1+2))>0$$

Figure 12:
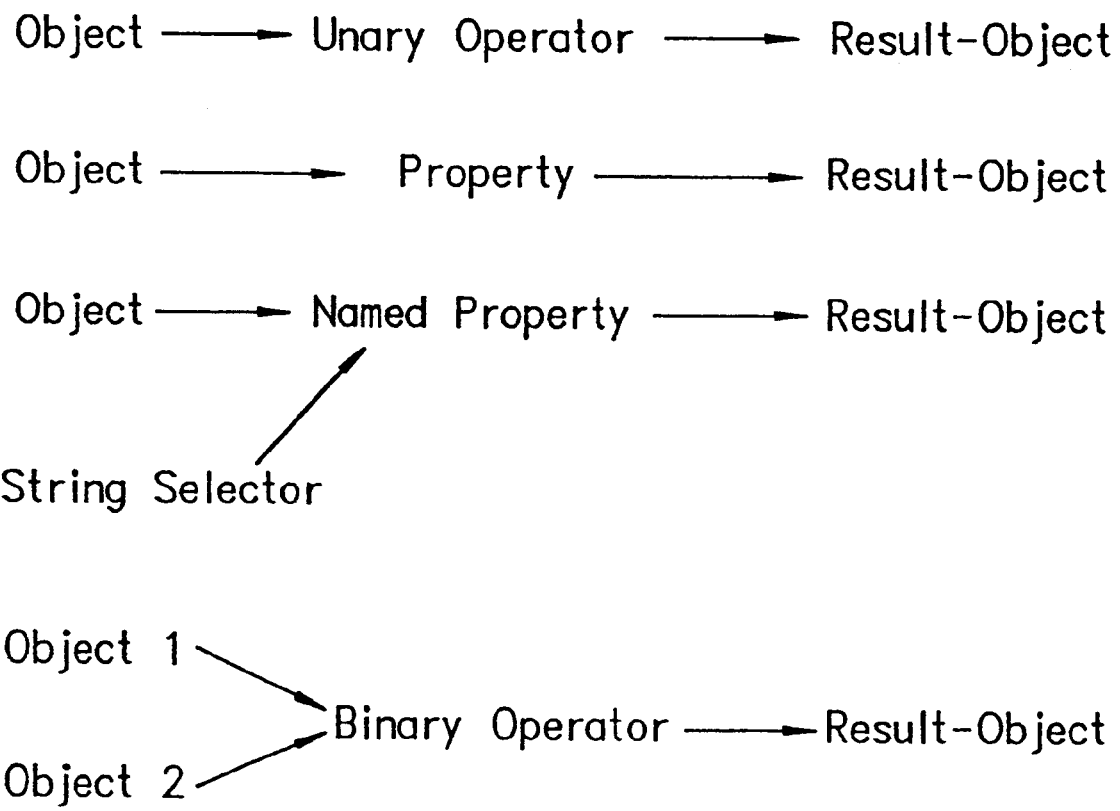
FIG. 12 is a flow diagram showing an object evaluation model according to the invention.

The meaning of a typical subexpression, e.g. 1+2, is apply method + to the pair of objects resulting from evaluating the two subexpressions 1 and 2. The pair of objects in question are objects of type Integer having values of 1 and 2, respectively. In the currently understood best method, the relevance language has a full range of arithmetic, string, and logical operations available, which are expressed as built in methods set to operate on the built in concrete data types (see FIG. 12).

Unlike traditional languages, the relevance language contains an abstract data type, World, which may be thought of as the overall environment of the personal computer on which the relevance clause is evaluated. This object has properties. These properties yield objects of various types, and these objects may have further properties (see FIG. 13).

World is a data type that, depending on the specific implementation and on the specific system configuration, may have many properties.

In the technical support application discussed above, these properties may include the system folder property, the CPU property, and the monitor property. Properties of an object are obtained by applying assessor methods to the object. The assessor method for the system folder of data type World returns an object of type system folder. The assessor method for the CPU property of data type World returns an object of type CPU. These derived objects, in turn, have properties of their own. For example, an object of type CPU may have a collection of properties such as speed, manufacturer, model, MMX, and cache. A method corresponds to each of these properties which, when applied to the object of type CPU, returns a result. For sake of discussion, it can be assumed that speed results in an integer, manufacturer results in a string naming the manufacturer, model results also in a string, naming the model type, and MMX and cache return the more specialized object types MMX, and cache.

Figure 14:
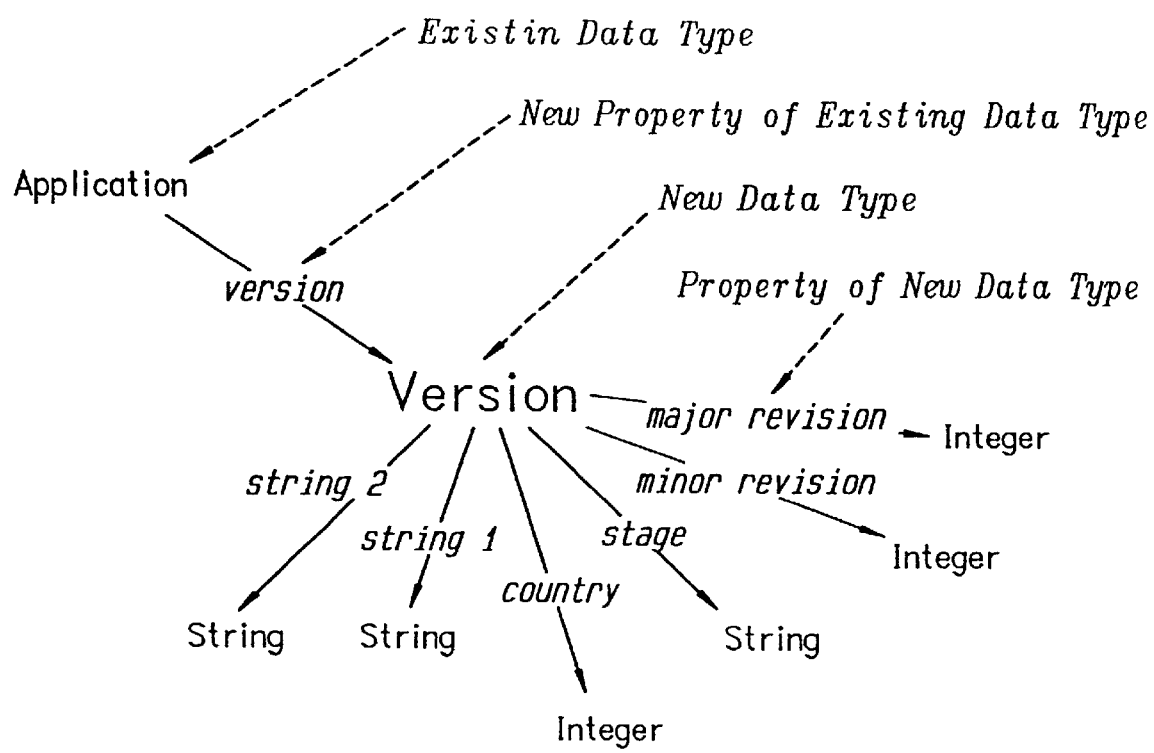
FIG. 14 is a flow diagram showing a new component of an object hierarchy according to the invention.

The relevance language implicitly postulates that the set of inspectable properties of the consumer computer is identical to the set of properties of data type World and the set of properties derivable from World by repeated applications of asking for properties of an object derived from World (see FIG. 14). ObjectWorld gives an idea of the richness of the object world derivable in this way in the technical support application.

Example Relevance Clauses

The following are examples of relevance clauses as used in a technical support application:

Existence of a Certain Application on the Consumer Computer relevant-When: exists application "Photoshop"

The intent of this fragment is that application is a property of World which takes an extra string parameter and returns an object of type application. exists is a property of any object, which returns the Boolean True if the object exists. If the application named Photoshop cannot be found by the method implementing the application property, then the result is a non-existent object, for which exists returns the Boolean False.

Comparison of Version Numbers relevant-When: version of Control Panel "MacTCP" is version "2.02"

The intent of this fragment is that Control Panel is a property of the World which takes an extra string parameter and returns an object of type Control Panel. If the Control Panel named MacTCP cannot be found by the method implementing the Control Panel property, then the result is a non-existent object, for which version is not an allowed property, and evaluation fails. If the Control Panel named MacTCP is found, then version, being an allowable property of Control Panels, leads to invocation of a method which returns an object of type version containing the version number of that Control Panel, recorded in a particular format. This result is compared with the result of subexpression version "2.02". This time version refers to a property of World, which takes an extra string parameter and returns an object of type version. If evaluation succeeds, the result of this comparison is Boolean: either True or False.

Compare Modification Dates relevant-When: modification time of Photoshop PlugIn "Picture Enhancer" is greater than time "Jan. 10, 1997 12:34:56+0800"

The intent of this fragment is that Photoshop Plugin is a property of the World which takes an extra string parameter and returns an object of type Photoshop PlugIn. If the Photoshop PlugIn named PictureEnhancer cannot be found by the method implementing the Photoshop Plugin property, then the result is a non-existent object, for which modification time is not an allowed property, and evaluation fails. If the Photoshop Plugin named PictureEnhancer is found, then modification time, being an allowable property of a Photoshop Plugin, leads to invocation of a method which returns an object of type time. This result is compared with the result of subexpression time "Jan. 10, 1997". Here, time refers to a property of World which takes an extra string parameter and returns an object of type time. If evaluation succeeds, the result of this whole expression is Boolean: either True or False.

Automatic Parsing and Evaluation

A key purpose of the relevance language is to enable an advice provider to publish advisories which can be accessed by the advice reader, running on a consumer computer, and be automatically read to determine, without intervention from the consumer, whether the advisory is relevant to the consumer.

In the currently understood best-method, the relevance language is implemented as a context free grammar which can be automatically parsed into a tree of subexpressions. The tree of subexpressions can be understood as an abstract structure whose nodes are methods and whose branches are subexpressions.

This tree is represented using a standard notation in computer science:

(node(expr-1)(expr-2) . . . (expr-n))

where node gives the name of the method to be applied, and (expr-k) stands for the k-th subexpression to be furnished to the method. For example, the expression:

(2346+(−1234)/(1+2))>0 can be parsed into the expression tree:

```
(>      (+  (Integer 2346)
            (/  (Integer −1234)
                (+    (Integer 1) (Integer 2))
            )
        )
        (Integer 0)
)
```

The expression:
    exists application "Photoshop"
can be parsed into:
    (exists   (application "Photoshop"))
The expression version of Control Panel "MacTCP" is version "2.02"
parses into:
(is  (version (Control-Panel "MacTCP"))
    (version (string "2.02"))
)
Finally, the expression:
    modification time of Photoshop Plugin "Picture Enhancer" is greater than time "10 January 1997"
parses into (is-greater-than  (modification-time (Photoshop-Plugin "Picture Enhancer"))
                       (time (string "10 January 1997"))
)

In short, the goal of parsing is to identify a sequence of method invocations to be applied. Procedures for parsing context-free grammars into expression trees are well-understood (see A. Aho, J. Ullman, *Principles of Compiler Design,* Addison-Wesley (1977)). A lexer breaks the input into a series of tokens. In the currently understood best method, these tokens may take of the following forms:

[String] A string of printable ASCII characters enclosed in quotation marks (").
[Integer] A string of decimal digits.
[Minus] The character −.
[SumOp] The characters +−.
[PrdOp] The characters */ and the string mod.
[RelOp] The character sequences =>>=<=!= and the relational phrases and or is not.
[Phrase] A sequence of one or more unquoted words, a word being an alphanumeric string beginning alphabetically and not containing embedded blanks. Phrases break at reserved phrases.

Parsing proceeds mechanically according to a precedence table giving the productions of a grammar. In the currently understood best method, the productions in the grammar are as follows:

```
<Goal>          := <Expr>
<Expr>          := <Expr> or <AndClause>|<AndClause>
<AndClause>     := <AndClause> and <Relation>|<Relation>
<Relation>      := <SumClause>[Re|Op]<SumClause> |
<SumClause>
<SumClause>     := <SumClause>[SumOp]<Product>
                | <SumClause>[Minus]<Product>
                | <Product>
<Product>       := <Product> [PrdOp]<Unary>
                | <Unary>
<Unary>         := [Minus]<Unary>
                | [UnyOp]<Unary>
                | <Cast>
<Cast>          := <Cast>as[Phrase]
                | <Reference>
<Reference>    := [Phrase] of <Reference>
                | [Phrase][string] <Restrict> of <Reference>
                | [Phrase][integer] <Restrict> of <Reference>
                | [Phrase][string] of <Reference>
                | [Phrase][integer] of <Reference>
                | [Phrase]<Restrict> of <Reference>
                | [Phrase][string]
                | [Phrase][integer]
                | [Phrase]<Restrict>
                | [Phrase]
                | exists <Reference>
                | number of <Reference>
                | [string]
                | [integer]
                | it
                | (<Expr>)
<Restrict>      := whose (<Expr>)
```

In this display, word stands for a reserved word in the language, [Phrase] stands for a phrase as defined in the discussion of lexical analysis on the previous page.

A grammar can be used to generate a parser by any of several means (see A. Aho, J. Ullman, *Principles of Compiler Design,* Addison-Wesley (1977)).

These may include automatic parser generators, such as YACC, which create a table driven finite state automaton that recognizes the grammar. The table is created directly from the production forms above, and also by hand generation of recursive descent parsers based on mimicking the productions of the grammar in modules whose naming and internal structure mimic the structure of the productions of the grammar.

All such approaches have the same basic result. New tokens are input, one-at-a-time, and compared with the current state and also with a table giving allowable type and mandated action on receiving that token, if any. The mandated action can be interpreted as specifying the individual steps in the systematic building up of an expression tree. A typical action is that associated with the production:

<Relation>:=<SumClause>[RelOp]<SumClause> which could be written, in a standard notation, as:

$$=($2$1$2)

This is interpreted as follows: $$ refers to the result of the production, $1, $2, $3 refer to the component subexpression trees, and the parentheses are notational devices that are used to delimit expression trees. This action calls for the association of the recognized <Relation>with an expression tree. This results from joining expression trees which are associated with the left-subexpression and the right subexpression with a root method that compares the two expressions. Consider the expression version of Control Panel "MacTCP" is version "2.02". Consider the state of the parser at the moment that it attempts to apply the <Relation> production with [Relop]. The expression tree already associated with the left subexpression, $1, has representation (Control-Panel "MacTCP") and that associated with the right subexpression, $3, has representation (version (string "2.02")). The expression tree associated to the overall <Relation> expression is the merger of these two according to the pattern (is $1 $3). Hence, the resulting expression tree is representable as (is (Control-Panel "MacTCP") (version (string "2.02"))).

Associated with each production is an action of appropriate form which describes how the tree is built. In certain implementations, the tree may only be built up implicitly.

Parsing can continue normally, if at every step of the parsing the next available symbol matches an allowable type; or it can fail, if an unexpected combination occurs. As soon as parsing fails, the piece of advice may be declared not relevant.

In the currently understood best method of implementing the invention, each valid method is already known to the parser at parse time. Unlike some other languages, parsing can fail if a clause is syntactically correct but uses phrases that name currently unknown methods.

In the currently understood best method of implementing the invention, each subexpression takes values which are strongly typed and for which the type is known in advance. Example data types include integer, string, and Boolean. Each method is known at parse time to work with certain combinations of data types of inputs and to give certain definite data types as outputs. Attempts to apply methods to forbidden data types are diagnosed as failure of the parse. If so, the piece of advice may be declared not relevant.

At the successful completion of parsing, an expression tree is built up consisting in essence of a collection of method invocations and associated arguments and associated data types of those arguments. Evaluation of the expression is the process of performing the appropriate method dispatching in the appropriate order.

Evaluation can be successful, or it can fail. It can fail, for example, from excessive use of system resources, unavailability of a resource, excessive delay in obtaining a resource, or for some other reason. Successful evaluation can yield a Boolean value of True or False or some other value. The interpretation of a piece of advice as relevant is equivalent to saying that the evaluation is successful, the value was Boolean, and is true.

In particular, if a certain subexpression cannot be interpreted as a valid expression in the language, if the subexpression attempts to apply methods to forbidden data types, or if the subexpression cannot currently be evaluated, the whole expression can fail, and the advice is automatically declared not relevant.

Extensible Language

The purpose of the relevance language is to describe precisely the state of a computer, its contents, attachments, and environment. This state can change as the consumer purchases new software and/or hardware, or as new software/hardware objects are invented. This state can change as consumer computers are used to represent consumers in new problem areas, for example, in personal finance, management of communicating devices in the home, or other areas.

Consequently it is not possible to delimit in advance the components of state that may be of interest to which the invention provides access. It is desirable for the relevance language to give future authors the ability to extend the relevance language to express concepts about system state that have not yet been conceived.

In one implementation of the invention, the vocabulary of the relevance language may be extended by the authorities and by authors at individual advice sites.

In that implementation, the relevance language is extensible by developing dynamically loaded libraries which add new vocabulary and semantics to the language and/or modify existing vocabulary and methods. These are referred to herein as inspector libraries and may be downloaded from an advice site and installed on a given consumer computer, thereby changing the meaning of the relevance language on that computer, and allowing new bodies of advice to be interpreted on that computer.

These dynamically loaded libraries contain declarations of the new data types which must be added to the language, of the new properties associated with the data types, of the data type resulting when a specific property is obtained for an object of a specific type, and of methods, i.e. executable code that implements access to the properties.

Non-procedural Language

Unlike many languages used in connection with the operation and/or maintenance of computers, the relevance language does not need to be procedural. That is, it need not specify how to manipulate the contents of various fragments of memory. This is the opposite of being descriptive. It is not necessary to enable traditional procedural services, such as loops, assignments, and conditionals.

On the contrary, making these services available in an expansive fashion may pose various security and privacy threats, by making it easy for carelessly written or maliciously written advisories to consume excessive resources at evaluation time.

In the currently understood best method of implementing the invention, procedural services are not made available in the relevance language. As inspection of the above grammar description shows the language has:

no named variables no assignment statements no function calls, or at least no explicit function calls with variable arguments no loops or conditional execution These differences in appearance between the relevance language and other common languages are rooted in the following view:

Because of concerns about unattended evaluation, the language should ideally have no side effects on the computer or environment.

To inspire consumer confidence, consumers must have be able to see for themselves that the language has no effects on the computer or environment.

A descriptive language, unlike a procedural one, has the appearance of having no side effects.

In short, the structure of the language and the visible limitations should communicate a message of security to the consumer.

The following discussion addresses two key differences of the relevance language from procedural languages:

Function Calls. The relevance language has method dispatches which correspond to function calls in some other languages, but they are of a more tightly constrained form.

First, there are the unary methods and the binary methods that occur in arithmetic and logical operations: +,−,*,/, and, or, =, and similar operations. These can be thought of as unary or binary function calls, but they are of a very restricted form, implementing well understood methods that typically pose little danger or resource burden.

Second, there are unnamed properties such as modification time.

Third, there are named properties such as application Photoshop".

The unnamed properties can be thought of as function calls applied to an object, but very bland ones, because no parameters are involved. Typically, a property is computed by extracting a certain value from a certain slot of a data structure. They typically pose little danger or resource burden. The named properties may be thought of as two-variable function calls. The first variable is the object and the second object is the string name-specifier. However, these also are not very general operations because the string name-specifier, in one implementation, may not itself be a computed result. It must instead be string constant. The types of calculations that can be specified in this way are tightly constrained. Again, typically a named property is computed by extracting a certain value from a certain slot of a data structure, so it poses little danger or resource burden.

Loops and Conditional Execution

The relevance language has no for, while, or if statements, but it does have a limited ability to perform iteration. It does this using a construct referred to as plural properties. In the relevance language there can be both singular and plural properties, e.g. both entry and entries properties, the first referring to a result which must be a singleton and the second referring to a result which may be a plurality. Typically, pluralities are further qualified by the use of the whose ( ) clause to restrict to subcollections.

By the plural-singular dichotomy, certain fine distinctions of meaning may be maintained. For example:

exists application "Photoshop"

has the meaning that there exists exactly one such application; and exists applications "Photoshop" whose(version of it is version "4.0")

has the meaning that there exists one or more than one application called "Photoshop", and among those there exists one with version 4.0.

In the second example, an iteration is implicitly performed over the collection of all applications called Photoshop" on the system in question, so the effect of a loop is obtained without using traditional procedural programming.

The restrictions on the expressiveness of the language help make the language safer from the viewpoint of privacy and security guarantees (see below). Nevertheless, the language is designed to be powerful in that it is intended to be highly expressive. A few words in this language provide access to answers about the system state which would be impossible to obtain in traditional procedural languages short of writing hundreds of lines of code and invoking many specialized functions in system libraries.

If an apparent need should arise for the kind of services that traditionally are handled by procedural languages, it may typically be satisfied by extending the relevance language using the inspector library mechanism mentioned earlier, and described in more detail below. This has two advantages:

[Efficiency] Including new inspectors by this extension mechanism, rather than by offering procedural services in the relevance language, leads to more efficient execution. Inspectors typically make available efficient compiled methods of execution, minimizing burden on system resources at relevance evaluation time while the relevance language is interpreted, which is typically slower.

[Security] Including new inspectors by this extension mechanism allows one to correct problematic situations. If a certain complex expression is used in many places and has bad side effects, then it can be very hard to correct. If an equivalent piece of code is included as an inspector library, then one can identify the problematic code by using the relevance language to identify whether that inspector is installed on the user computer. This makes it possible to write counter advisories against advice that depends on inspector libraries.

Consumer-accessibility

The relevance language controls the execution of a system on a potentially vast number of computers. It is highly desirable, though not strictly necessary, for a relevance clause to be something which, in principle, a consumer could read and form an approximate understanding of, though few users may choose to do this in most cases.

In the currently understood best method of implementing the invention, the syntax of the relevance language resembles the syntax of plain English, with key roles in the language played by clauses formed from articles such as of, as, whose, and verbs such as exists.

The highly constrained nature of the language fosters consumer understanding. The language avoids constructs which assume a computer programming background by suppressing concepts such as arrays, loops, and conditional evaluation.

Inspector Libraries

Components of Inspector Libraries

Parsing of a clause in the relevance language results, conceptually, in the generation of a list of method dispatches (see FIG. 11), in which certain methods are called in a certain order with certain argument lists. This evaluation is a process of systematically carrying out the sequence of method dispatches in the appropriate order. Method dispatches are an important aspect the relevance process.

An inspector library is a collection of methods (see FIG. 15) and associated interfaces which allows for the installation of methods into the advice reader. Because of the structure of the parser and the evaluation process, an inspector library may contain some of the following components:

Declaration of a [Phrase] to be used in the relevance language.

Association of that [Phrase] to a specific method.

Declaration of a new data type to be used in the evaluation process.

Declaration of the calling prototype of the method. This includes the number and the required data types of the arguments to be supplied to the method.

Declaration of the result data type of the method.

Implementation of that method in executable form.

Declaration of special hooks associating code to be called on events, such as advice reader initialization, advice reader termination, beginning of advice reader main evaluation loop, and ending of advice reader main evaluation loop.

Declaration of special hooks associated with creation and maintenance of special caches associated with the method.

Implementation of special event methods and cache methods in executable form.

Conceptually, an inspector library can be linked into the advice reader with all the declarations evaluated, resulting in changes to the advice reader's internal data structures, so that new method invocations become available.

These declarations affect two fundamental data structures of the system. The first is a syntax table giving all allowed phrases and the associated data types on which they may operate and the associated data types that result. This is used at lexical analysis time. The second is a method dispatch table, giving a systematic way to determine the associated executable method for a given phrase and data types. This is used at evaluation time.

Object-oriented Structure

A convenient way to implement the above inspector library structure is to rely on the features of a modern object-oriented programming language, such as C++. In effect, the built-in features of such a language, i.e. object declarations, polymorphism, and operator overloading, are ways of declaring that certain phrases have a certain meaning when applied to certain data types, and of systematically organizing that information. Other features, such as constructors, copy-constructors, and destructors, are ways of defining certain initialize time and terminate time code bodies.

In the currently understood best method, such features of modern object oriented languages are used to provide the various features of inspector libraries.

Extension

In one implementation, as described above, it is possible to install several inspector libraries in an instance of the advice reader. The inspector libraries that are so installed define the set of recognized [Phrase]s in the relevance language, the set of allowable data types at evaluation time, and the set of methods associated with those data types.

In short, the relevance language may be dynamically constituted. In one implementation, inspector libraries may be created by advice providers and downloaded to the consumer computer as part of the site synchronization.

Such libraries may be managed by the advice reader, for example, by storage in a well known location, such as a subdirectory of the overall directory managed by the advice reader. The inspector libraries in this directory may be linked into the advice reader at the time the advice reader is initialized.

When this linking happens, declaration routines are invoked, installing new [Phrase]s in the lexical analysis table of the relevance language, and associating these [Phrase]s to certain method invocations. The language expands in this way to include new descriptive possibilities.

Layered Language Definition

The relevance language may therefore be open ended, built up in layer upon layer of extensions. Hence, to understand a completely installed system is to understand the layers which have been installed, and to understand the methods that each layer provides. In a typical installation, these layers are as follows:

Base Layer. Contains the basic mechanics of clause evaluation: a number of basic built-in phrases and associated methods. It is expected that the base layer is the same on every consumer computer carrying the advice reader.

System-Specific Layer. This consists of a layer associated with a certain operating system, giving information about the characteristics of a certain family of computers and their attached devices and environment. For example, such a layer, in one implementation, provides methods to get the system date and time, the sizes of various files, the contents of the PRAM, or the names of attached peripheral devices.

Vendor-Specific Layers. This collection of potentially a large number of extensions layers is typically produced by third parties, giving special access to the internals of certain hardware devices and software products. One can think of potential authors ranging a span of products from hardware producers (e.g. of cable modems) to software producers (e.g. of Photoshop and plug-Ins) to service providers (e.g. America On-Line).

Example: Version Inspector

The following is an example of an inspector for the version property of data type Application under the Macintosh OS. This inspector declares the following:

A new [Phrase] to be added to the relevance language: version;

A new data type, version, which has already been referred to in several examples above;

Several properties of this data type which are available under Macintosh OS:

Major Revision. The leading numeric field of the revision number.

Minor Revision. The secondary numeric field of the revision number.

Stage. A String, such as Alpha, Beta.

Country. A String, such as USA or France.

String1. A String.

String2. A String.

Methods, in the form of executable code, which implement the above properties by opening the resource fork of the application, extracting the desired information, and converting into the required data types.

A new named property of World, version, which casts a string property specifier, such as the 1.1 in version 1.1, into a version data type.

Upon installation, this inspector makes available to the system a series of data types and properties which may be as depicted in FIG. 14. As an example, to check if the beta version of an application with version number 0.99 is used, one might write the relevance clause:

Stage of application "Netscape Navigator" is "Beta"

and Minor Revision of application "Netscape Navigator" is 99 and Major Revision of application "Netscape Navigator" is 0

Special Inspectors

The language extension mechanism described above has powerful consequences, for example, as described in the following:

OS Inspectors

A system specific inspector can access the properties of the operating system and allow advice to be written to verify the existence and configuration of attached devices and other subsystems.

The following is an example of a valid fragment written for use with the Macintosh OS inspector library:

exists serial device "Modem Port"

The intent of this fragment is to check if this is the type of Macintosh having a dedicated modem port, which is to be distinguished from a Modem/Printer Port. The property of World referred to as serial device potentially matches several different devices. The qualifier selects from among those the one which has the name "Modem Port." If there are any such devices, the phrase evaluates to True. If not, the phrase evaluates to False.

input name of serial device "Modem Port" is ".Aln"

The intent of this fragment is to check if the modem port is using the standard serial driver for that port. The specific property of World referred to as serial device "Modem Port" is an object with property input name. The fragment checks to see if this is equal to .Aln, its usual value in the Mac OS.

Examples of other properties and data types available in the Macintosh OS inspector library include:

Physical RAM. Property of World. Integer-valued: number of bytes of installed RAM memory.

Logical RAM. Property of World. Integer-valued: number of bytes of installed RAM memory and virtual memory.

Virtual Memory. Property of World. Boolean-valued: True if the virtual memory option is enabled.

PowerPC. Property of World. Boolean-valued: True if the CPU is a PowerPC.

System version. Property of World. Data type:version. Version of system which is currently installed.

ROM version. Property of World. Data type: version. Version of ROM which is currently installed.

These examples make it clear that one can write relevance clauses which target machines having, for example, a small amount of memory, outdated ROMs, or old system versions.

Registry Inspector

Modern personal computer operating systems, such as Windows 95 and Macintosh OS 8, have special databases referred to as registries which record a considerable amount of information about the configuration of the system, and the installation of certain pieces of software. A registry inspector is an inspector library which, when installed in the advice reader, enables the relevance language to refer to and evaluate properties of the registry database.

The following is an example on the Macintosh platform:

22=integer value of entry "APPL.interrupt" of entry "bandit" of entry "Device Tree" of entry "devices" of Registry The intent of the fragment is to enter the Macintosh name registry, find entry "devices", look for the entry "Device Tree" within that, and descend to the subentry "bandit" and then the subsubentry "APPL.interrupt". The resulting entry is then converted into an integer value and compared with code 22.

The registry may contain a vast amount of information about the computer on which it operates. The registry inspector makes all this information accessible to the relevance language.

Preferences Inspector

Typical application programs on modern computers, such as Netscape and Microsoft Word, have special databases, referred to as preferences files, which record a considerable amount of information about the configuration of a certain program. A preferences inspector is an inspector library which, when installed in the advice reader, enables the relevance language to refer to and evaluate properties of the preferences file of a specific application.

The following is an example:

Suppose that the Web browser application Netscape Navigator has a preferences file, which associates to various content types. A helper application knows how to process that content type. For example, a helper application associated with a graphics file of type JPEG might be JPEGView, and a helper application associated with type x-pn-realaudio might be RealAudio Player.

Suppose that an advice provider called RealAudio wants to author advisories which target users whose Web browsers are misconfigured, and to provide them with automatic corrections to the configuration.

Suppose that there is available a Netscape Navigator Preferences inspector and that, after installation of that inspector in the advice reader, Netscape Navigator Preferences becomes a property of World.

This provider could then target consumers with RealAudio products, but improperly configured Web browsers, by authoring an advisory with relevance clause:

```
exists application "RealAudio Player 4.0"
and exists application "Netscape Navigator"
and ((helper name of entry "x-pn-realaudio" of entry "Helper Table"
    of Netscape Navigator Preferences)
  is not "RealAudio Player 4.0"
)
```

The intent of the fragment is to access the Netscape Navigator Preferences file, find entry "Helper Table", look for the entry "x-pn-realaudio" within that, and extract the associated helper name. The resulting entry is a string which is compared with "RealAudio Player 4.0."

The preferences file of a modern software application contains a considerable amount of information about the working of the application, and a preferences inspector makes all this information accessible to the relevance language.

Database Inspector

Many consumer computers contain, either explicitly or implicitly, a commercial database which stores information about the consumer. Examples include:

Databases associated with personal finance programs. Consumers who use Check Free, Quicken, and similar programs implicitly have databases on their machine.

Databases associated with small office suites. Consumers who are running small businesses have customer databases, supplier databases, and accounting databases on their machines.

A database inspector is an extension to the base relevance language whose purpose is to allow the relevance language to access fields in a database. An example syntax is as follows:

numeric field "CURRENT BALANCE" of FoxBase Database "Personal.DBF"<0

The intent of this fragment is as follows: The advice provider is attempting to reach consumers who use Check-Free. Users of CheckFree have a FoxBase-created database resident on their machine which is identified as Personal.DBF. The fragment intends to reach such consumers whose current bank balance, as indicated by the database, is negative. The semantics of the evaluation depend on the implementation of the FoxBase Database inspector.

It may be assumed that this works as follows: A database named Personal.DBF is located on the consumer computer's mass storage, is interpreted as if in FoxBase format, and the numeric field with field name CURRENT BALANCE is extracted. The fragment then compares the extracted value to the value 0.

Note that if the consumer does not have a database of the indicated type, the clause above fails to parse or fails to evaluate. Either way, it is not declared relevant. This reduces the need to worry about qualifying clauses of this type by lengthy preambles which check if the software of a certain type is available. Parse time failure could occur because the consumer computer does not have the FoxBase Database inspector installed. Evaluation time failure could occur because the file Personal.DBF cannot be located.

An application of this technology is in the technical support arena. Suppose that an advice provider publishes software which, as with CheckFree, creates and manages a database, and the provider would like to help consumers keep the database well updated. The advice provider could author advisories which target common problems in the consumer database, e.g. consumers who forgot to initialize the database with the correct balance. Such advisories would call these problems to the attention of consumers who have them, as well as specifying solutions to the problems.

User Profile Inspector

The invention maintains a file or files offering a user profile, consisting of certain identifying phrases and associated values.

A user profile inspector is an inspector library that can be installed in the advice reader and which enables the relevance language to refer to data stored in the user profile. At a high level of abstraction, this is the same type of function that is enabled by the database inspectors or registry inspectors, only with a different database being inspected.

As an example of how such an inspector might be used, suppose it was desired to reach users with Zip Codes of the form 947XX. Supposing that the user profile has a variable referred to as Zip Code, the relevance clause:

947=(value of variable "Zip Code" of User Profile as integer)/100 would provide the needed functionality. The intent of this clause is as follows: The user profile is inspected, the variable named Zip Code is extracted, it is converted from string to integer, and the resulting integer is divided by 100. The two trailing digits are lost in the process, leaving an integer with three digits that may be compared to 947.

In one implementation, the user profile is a dynamically expanding database, with new variables added as advice providers need them. A mechanism is provided so that an advice provider can author a template file which describes a collection of variables to which the advice provider plans to refer in advisories and would like the consumer to specify. The template file is placed at the advice site and is automatically gathered at synchronization time. The template file is used to drive an editing module on the consumer computer which presents the user a list of the template variable names and a list of their current values or blanks if they have not previously been defined. The user can then fill in the blank fields and edit other fields. In this way, the variables which the provider wants defined can be brought to the attention of the user and edited.

The portion of the user profile associated with the specific advice site in this way is called the site profile. The advisory with relevance clause:

not exists Data file of site Profile checks whether the site profile has been initialized for this site. If not, the advisory should have, as human-interpretable content, a message which indicates that the advice provider would like the user to fill out the user profile variables needed for correct functioning of advice associated with that site. It should have as computer interpretable content an invocation of an editing module which uses the new template to present the user with choices for editing a new user profile.

The advisory with relevance clause:

Modification Time of Data file of site Profile <Modification Time of Template file of site Profile checks whether the site profile has been updated since the last new template file. If not, the advisory should have, as human interpretable content, a message which indicates that the advice provider would like the user to add some new user profile variables needed for the future correct functioning of advice associated with that site. It should have as computer interpretable content an invocation of an editing module which uses the new template and the old profile to present the user with choices for editing.

Remote Inspector

In principle, inspector libraries can also give the relevance language the ability to inspect properties of other communicating devices. These include:

Remote Physical Measurements. Ask other devices for information which those devices can measure, the information possibly to include position, temperature, voltage, or status of a process.

Remote Device Queries. Ask other devices for information about themselves or about their state.

Remote Computation. Ask other computers for the result of a calculation, for example a calculation specified by a formula, program, or script provided by the inspector.

Remote Database Queries. Ask other computers with databases to answer queries concerning contents of those databases.

Remote relevance Invocation. Pass a relevance clause to another computer and obtain the result, as evaluated by the other computer in that computer's environment.

The following is an example of a remote physical measurement. Suppose there is an inspector library which defines a property of the World called Internet atomic clock and which has the ability to make queries to an authoritative timekeeper by Internet protocols that can return the result as a relevance language time data type. Suppose that it also defines a property of the World referred to as system Greenwich Time which gives the Greenwich Mean Time equivalent of the system clock. The following relevance clause targets consumers whose system time is incorrectly set:

abs((Greenwich Time of Internet Atomic Clock)−System Greenwich Time) >time "10 Seconds"

The following is an example of a remote device query. Suppose there is an inspector library which defines a property of the World called network Postscript printer and which has the ability to make queries to the currently selected printer to determine if it is properly configured. A valid relevance clause is:

Model of Network Postscript Printer is "LaserJet 5" and ROM Version of Network Postscript Printer <version "2.0"

which targets those consumers with LaserJet 5 printers having old ROMs.

The following is an example of a remote database inspector. Suppose that the advice provider is a large organization that serves a population of advice consumers who are employees, who have small hand held computational devices, and who keep important data on a remote computer which has a trust relationship via security handshaking with these small devices. Suppose that the employees use organizational data which is accessible via a Lightweight directory Access Protocol (LDAP) database server accessible over Internet (see W. Yeong, T. Howes, S. Kille, LDAP (*Lightweight Directory Access Protocol*), Internet Standards Track RFC 1777(1995)). The advice provider would like to serve up advice which asserts conditions about the employees assigned project which is not available on the hand held machine, but instead is available by LDAP queries to the LDAP server. In addition, it asserts conditions about the employees status which are only available on the hand held machine.

The provider develops an inspector library which can access data on the LDAP server, and an inspector library which can access data on the hand held device. Suppose that the installation of these inspectors includes steps to configure the LDAP queries with appropriate passwords and appropriate usernames. A valid phrase in the relevance language is:

sponsor of assigned project of Employee LDAP record is "U.S. Government" and (per diem charges of current daily expense of Employee Handheld record >35)

The intent of this fragment is for a certain entry to be extracted from the LDAP database associated with this employee, and the sponsor name compared to "U.S. Government." If that condition holds, the current travel expense record is queried for a per diem claim.

This approach provides a way of anonymously and proactively targeting employees listed in the organizational database as subject to a per diem rate lower than the expenses they are generating. Thus, the invention provides a method of checking expense claims during travel, well before submission.

Important issues arise in the specification of the interfaces with remote systems. One aspect is that there must be a trust relationship between the consumer computer requesting the remote service and the other device or computer fulfilling the request to allow automatic evaluation of relevance. The communications must be encrypted in some cases. The degree of resource use must be monitored. Digital authentication must be available in some cases. These are all details that can be handled by well-known mechanisms.

The provision of a process whereby an advice provider can author advisories which refer not only to properties of the consumer computer and its environment, but also to properties accessible by query from the consumer computer, creates a new communications protocol described below, i.e. the personal information access protocol.

Inspecting Program Log Files

Many computer software applications and processes maintain a log file or files the contain a record of the history of execution of the application or process. Standard examples of this include transaction logs kept by mail servers and by login daemons, backup logs kept by backup software, and error logs kept by user programs.

A program log inspector is an inspector library that can be installed in the advice reader and which enables the relevance language to refer to data stored in a certain log file or files. At a high level of abstraction, this is the same type of function that is enabled by database inspectors, registry inspectors, or user profile inspectors, only with a different database being inspected.

Such an inspector library defines access methods the allow one to obtain key data items from log files.

As an example of how such an inspector is used, suppose it was desired to reach users who run the application GraphMaker, where the log file generated by Graphmaker contained an error entry with error code 93456.

Suppose that this error code indicates that a certain PostScript printer was unable to process the file output by Graphmaker. It is desirable to communicate to consumers in this situation the fact that there is a workaround for this problem. Suppose that Graphmaker has an inspector library available at its advice site which implements a set of methods associated with the central data type, which is referred to as GraphMaker error log. Assume that when this inspector library is installed in the advice reader, GraphMaker error log is a property of World. Assume that GraphMaker error log has a property referred to as entry, and that the result of such a property is an object of type GraphMaker error log entry with properties error code and error message, yielding integer and string data types, respectively. Then, there:

exists entries "Error" of GraphMaker error log whose (Error Code of it =93456)

provides the needed functionality. The intent of this clause is as follows: The file associated with the GraphMaker error log is located and opened, and a search is made through this file for entries of type error as opposed to warning. These entries are examined to determine if any of them is associated with an error code of the indicated type.

This enables a technical support organization to develop a process for maintenance of complex products in the field where:

The product is developed so that exceptional conditions are identified and logged;

Inspectors for this log are developed and published at an advice site; and

Advice is authored which inspects the log to identify and correct problematic situations.

In this way a technical support organization can target consumers experiencing certain program faults.

Inspecting the Advice System

The advice reader maintains subscription information, pools of advisories and, in one implementation, logs that indicate the history of relevance evaluation and of automatic solution operation.

An advice system inspector is an inspector library that can be installed in the advice reader and which enables the relevance language to refer to data stored and managed by the advice reader itself. At a high level of abstraction, this is the same type of function that is enabled by database inspectors, registry inspectors, or user profile inspectors, only with a different database being inspected.

Such an inspector library defines access methods the allow one to obtain key data items from important components of the system:

The subscription database: Existence or nonexistence of certain subscriptions, address of advice sites associated with certain subscriptions, synchronization schedule associated with certain subscriptions, digital authentication information associated with certain subscriptions, other interesting attributes.

The advice database: Existence or nonexistence of certain advisory in the advice database. Relevance or irrelevance of certain advisory in the advice database. Existence or nonexistence of certain author in the advice database. Existence or nonexistence of certain subject in the advice database.

The advice readers log files: Existence of a subscription to a certain site sometime in the past. Existence or nonexistence of certain diagnostic conditions, for example, aborted evaluation of certain advisory due to excessive time to evaluate an advisory. Relevance of certain advisory at some time in the past. Acceptance by user of an automatic solution operator associated with certain advisory at some time in the past.

The advice readers configuration: Installation of certain inspectors. Parameters of advice reader operation. User Preferences.

As an example of how such an inspector is used, suppose that in January 1998 a special piece of patch code was released which modified the application Graphmaker. Suppose that most consumers who installed this patch learned of it through the advisory process described herein. It is desired to reach users running the application GraphMaker which at some point in the past, prompted by an advisory, had installed the patch to the Graphmaker application. Suppose this is because an improved version of the patch has become available.

A comprehensive strategy for this situation formulates several advisories. The strategy formulates an advisory for users who have a current subscription to the advice site. This is prosaic in construction, and uses mechanisms described earlier. However, a comprehensive strategy also formulates three other advisories intended ultimately for other users:

First, the strategy formulates an advisory for users who no longer subscribe to the advice site, but who may have done so at some time in the past. The advisory is distributed by various means outside the normal subscription mechanism of the invention, for example through a service, e.g. UrgentAdviceNet. This advisory looks to see if GraphMaker is installed, to see if there is no active subscription to the GraphMaker advice site, and then at the log file generated by the advice reader to see if Graphmaker advisory "98/1/08-1" was relevant at some time in the past and if the user had accepted the proposed solution. Any consumer for whom this is relevant is notified, first that they should resubscribe to the site if possible, and second that when they do they get instructions about updating the patched code.

Second, the strategy formulates an advisory for users who have never subscribed to the advice site and never received the earlier advisory. This advisory checks if the affected version of GraphMaker is installed, and then sees if the current subscription database shows no active subscription, and also if the log shows no formerly active subscription. Any consumer for whom this is relevant is notified, first that they should subscribe to the site if possible, and second that when they do they get instructions about updating the patched code.

Third, the strategy formulates a counter-advisory for users who have somehow obtained a copy of the former advisory by means other than subscription, and which is somehow still active in the advice database. Such an advisory is not automatically deleted by site synchronization because it is not associated with the originating advice site. The advisory identifies the existence in the advice database of the old advisory. Any consumer for whom this is relevant is notified, first that this active advisory is no longer avowed by its author, second that the consumer should subscribe to the site if possible, and third that when they do they get instructions about updating the patched code.

Suppose that advice reader has an inspector library installed which implements a set of methods associated with three central data types, referred to as adviceNet subscription inspector, adviceNet advice inspector, and adviceNet history inspector.

With such inspectors one may target consumers who may have adopted the proposed solution of the advisory in the past, but who do not currently subscribe:

exists application "GraphMaker" whose(version of it is version "1.01")

and not exists entry "GraphMaker" of adviceNet Subscription inspector and exists entry "relevant" of adviceNet History inspector whose (author of it is "GraphMaker" and
identifier of it is "98/01/08-1" and
adoption status of it is "Accept")

With such inspectors one may also target consumers who have never subscribed:

exists application "GraphMaker" whose(version of it is version "1.01")

and not exists entry "Subscription" of adviceNet History inspector whose (name of it is "GraphMaker")

With such inspectors one may also target consumers who received the advice by other means than subscription:

exists application "GraphMaker" whose(version of it is version "1.01")

and exists entry "Advisory" of adviceNet advice Database whose (author of it is "GraphMaker" and identifier of it is "98/01/08-1")

These inspectors enable a technical support organization to develop a process for maintenance of bodies of advisories and to adapt to the consequences of adoption/non-adoption of previous advisories.

A second type of example is provided by the case where an advice provider RealAudio wants to author an advisory checking whether a certain inspector is installed and is the correct version, for example, because advice depends on this. Assume that there is an inspector library which, when installed, adds adviceNet configuration as a property of World. RealAudio could serve up advice at its site with the relevance clause:

not exists inspector library "Netscape Preferences" of adviceNet Configuration allowing one to check that an inspector library was not installed. The humanly interpretable content of the associated message is an explanation that for RealAudio advice to work properly, the user should get the appropriate inspector from the Netscape site. In addition, it could serve up advice qualified by:

version of inspector library "Netscape Preferences" of adviceNet
Configuration
is not version "1.0"

to target users with the wrong version of an inspector library.

Such an inspector enables a technical support organization to make sure that the advice reader is correctly configured to use the advice provided by that organization.

Variations

Alternate Transport Mechanisms

So far, the discussion herein has centered around a single mechanism for the transport of advisories. In fact, there are many situations where other means of transport are useful and/or desirable. Some such means of transport include:

advice by physical transport. An advisory may arrive at the consumer computer by file copy from a floppy disk, CD-ROM, or similar physically transportable medium.

advice by e-mail. An advisory may arrive as part of an e-mail message, routed from another consumer, or from an advice provider.

advice by USENet. An advisory may arrive as part of a news message distributed according to the USENet protocol, posted by another consumer, or by an advice provider.

advice by proprietary protocol. An advisory may arrive as part of a message distributed according to a proprietary protocol.

advice by file transfer. An advisory may be obtained by file transfer further machine, where said transfer uses an application other than the advice reader. For example, a user might direct a Web browser to download an advisory file that is pointed to by a hypertext link. Or, an application might direct the downloading of an advisory, without user control, using FTP or some file sharing protocol.

There are three different procedures for treating advice that has arrived by one of these routes:

Adding to advice database. The advice is added to the existing database of advice being tested continually for relevance.

Situational evaluation. The advice is evaluated for relevance when opened, but not entered into any permanently maintained pool. When closed, the advisory has no interaction with the system. This type of advice is part of a manual check, for example, in a once only situation.

Stockpiling. The advice is stored on the consumer computer's storage device for future use. This means that at some future time it is added to the advice database or at some future time it undergoes one-time evaluation.

Figure 16:
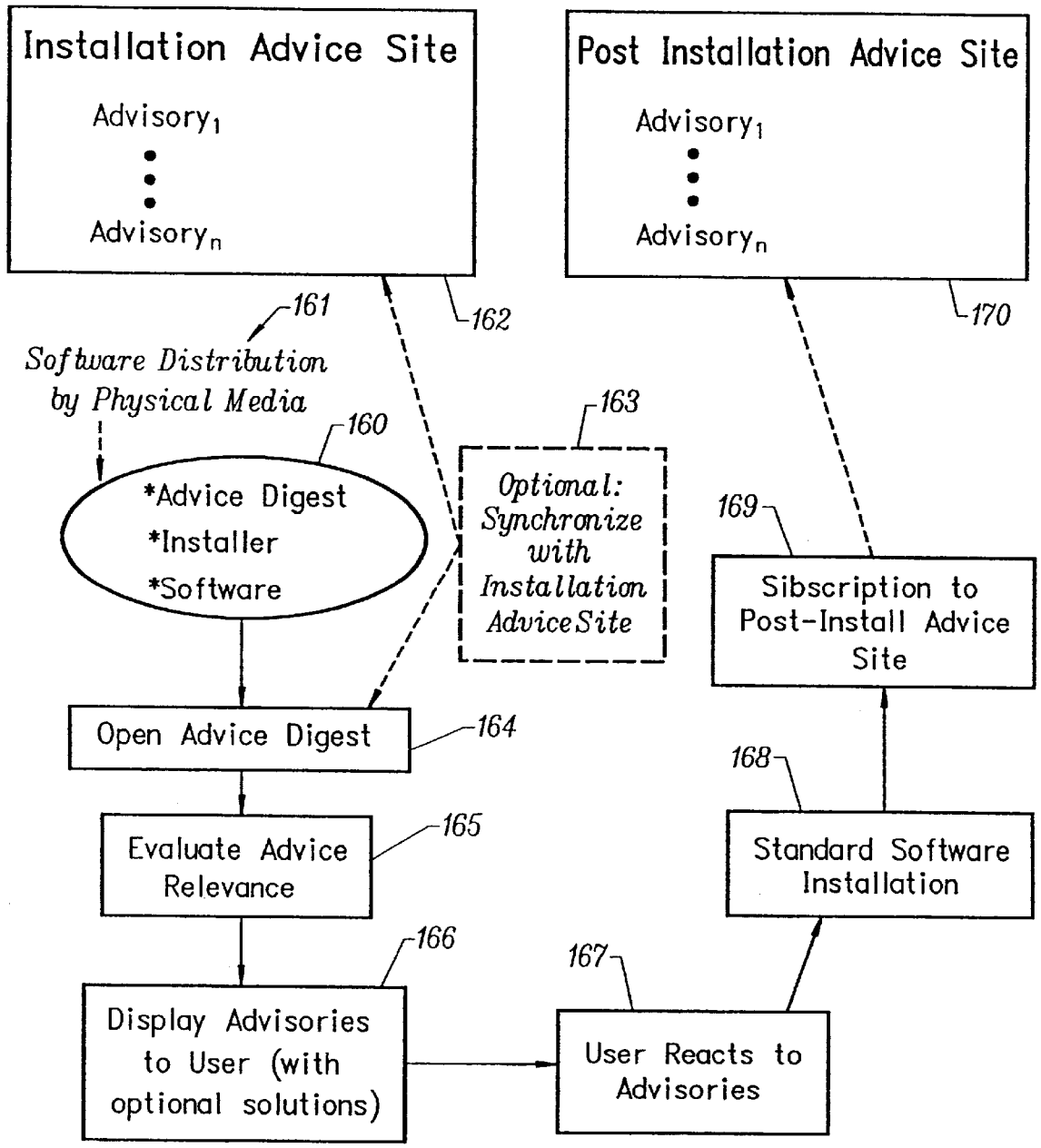
FIG. 16 is a block diagram showing situational advice according to the invention.

The possibility of situational evaluation, i.e. situational advice, bears special notice (see FIG. 16). This can be used to create rather complex digests of advisories which are opened by the consumer only when special needs or situations arise.

The following are examples of alternate transport mechanisms applied in the technical support application area:

advice before purchase. An advice digest arrives at the consumer computer as part of the shopping process for a new piece of software or hardware on the consumer computer. This collection may arrive by physical transport of media or by electronic transfer, for example, the consumer may obtain the digest from a Web site devoted to shopping. The digest, when processed by the advice reader, evaluates the consumers hardware situation and informs the consumer about its suitability for various possible purchases. The process is typically run only once.

advice with installation. An advice digest 160 may arrive at the consumer computer as part of the installation process for a new piece of software or hardware on the consumer computer. This piece of software may have arrived by physical transport of media 161 or by electronic transfer 162. The new advisories may be added as part of an automatic initialization process whereby a subscription is automatically initiated and the advisories are placed in the advice pool as a way of initiating the local site image. An optional synchronization of the user location with the advice site may occur 163. The user reader opens the advice digest 164 and evaluates advice relevance 165. Advisories are displayed with optional solutions 166 and the user reacts to the advisories 167. The system may perform a standard software installation 168 and enter a subscription to a post-install advice site 169 to receive post-install advisories 170.

problem diagnosis. An advice digest may arrive at the consumer computer as part of the installation process for a new piece of software or hardware on the consumer computer. However, no use is made of the digest at installation time. Instead, the digest is copied onto the storage device of the computer. Later, the user is informed to open the digest by any of several means for situational use when a certain problem arises. Upon doing so, the user is notified of various advisories which apply to this specific situation and hardware/software/settings configuration. After the episode is over, the advice is closed, perhaps to be reopened at some later time for possible reuse.

Alternate Notification Mechanisms

Advisories can be presented to the user in other ways than through the usual advice reader interface. For example:

Via Notify Box in Other Applications. The user may be notified of the existence of a relevant advisory while using another application. Notification uses a mechanism appropriate to that application. For example, the consumer is engaged in another activity, e.g. viewing a video, and is notified in an unobtrusive way, e.g. in this case by picture-in-picture.

Via Desktop/Screen Saver. The user may be notified of the existence of a relevant advisory when he is not using an application. Notification uses a mechanism appropriate to the default presentation. For example, the desktop has an animated icon depicting the existence of relevant advisories. Another example, a screensaver presents an animated presentation whose state indicates status of machine, e.g. subsystems affected by advisories.

Via e-mail. The user may be notified of the existence of a relevant advisory by electronic messaging using e-mail. This includes textual summaries indicating the number and type of relevant advisories and the number and type of affected system components.

Via messaging. The user may be notified of the existence of a relevant advisory by electronic messaging driving other modalities of information transmission. This may include standard means of communication, such as pager, phone, and fax transmission. For example, in an environment where consumer appliances are connected to a computer in the home, the invention inspects properties of the devices and pages the consumer with urgent messages. An advisory is written referencing the temperature in the home, with the effect that if the temperature were excessively high or low, an advisory is relevant. Assuming that the relevance notification is set up to use alphanumeric paging, the consumer is paged to indicate that the temperature in the house was out of normal bounds.

Frequency of Relevance Evaluation

As so far described, relevance evaluation is a process carried out by the advice reader. A typical implementation continually evaluates all advice in the advice database for relevance, metering total CPU resource usage, and keeping resource consumption measured over intervals of, e.g. 1 second, below a certain fraction of available CPU time.

A typical implementation allows user involvement in three ways:

First, by allowing the user to set parameters controlling the fraction of CPU resource used during continuous evaluation.

Second, by allowing the user to group advisories into special pools which are evaluated according to a differing schedules. For example, a manual pool is evaluated only under manual evaluation, while a nightly pool is evaluated only at a certain user specified time in the evening.

Third, by allowing the user to schedule relevance evaluation for an individual piece of advice manually, overriding all pool membership parameters.

There are a variety of important variations on this approach:

Skipping evaluation. In certain settings, it may be desirable not to evaluate each piece of advice in a pool with each pass through the pool. For example, those pieces of advice which take a very long time to evaluate are periodically skipped, or skipped based on the CPU usage of other applications running on the consumer computer. A piece of advice which is unevaluated retains the relevance status of the previous evaluation.

Scheduling based on author comments. In one implementation, the author of the advisory can specify the scheduling of relevance evaluation. He includes in the advisory file an Evaluate-When line that specifies details of evaluation scheduling. Options may include either a periodic schedule for relevance evaluation, a condition for relevance evaluation, or membership in a well known advice pool with a standard evaluation schedule.

Scheduling based on advice reader analysis. The process of evaluating relevance may be viewed as analogous to the process of running various processes in a computer operating system. Using traditional operating systems scheduling ideas, it is possible to allocate priorities to advisories and to assign lower priorities to certain processes. A special case of this is the procedure skipping evaluation, discussed above.

Variations in Relevance Evaluation

Figure 17:
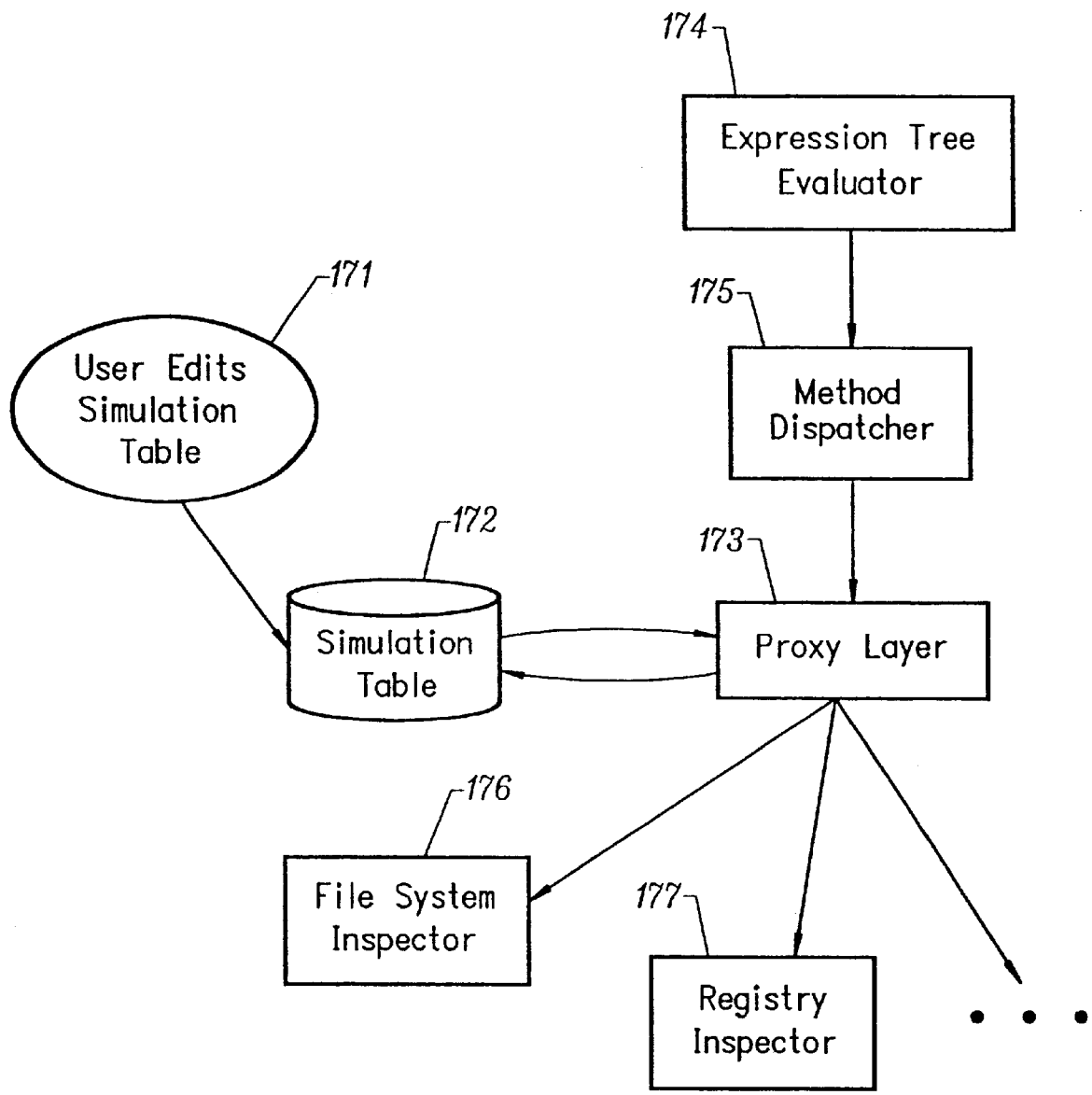
FIG. 17 is a block diagram showing simulate d conditions according to the invention.

Simulated Conditions. In certain situations (see FIG. 17), it is useful to the consumer to simulate evaluation of advice in an environment other than the one which actually obtains.

In one implementation of the advice reader, a method is provided to simulate conditions which do not in fact obtain. Such an advice reader has a modification to the method invocation dispatcher of the advice reader. In this modification, the name of the method and the involved data types are compared with a simulation table 172 in a proxy layer 173 before a method dispatch occurs. The simulation table contents are user editable 171. If there is no match, dispatch occurs as normally, i.e. an advisory received from an expression tree evaluator 174 is dispatched by the method dispatcher 175. If there is a match, dispatch is suspended, and instead the value of the method is obtained by look-up from the associated cell of the simulation table. The result in either case is passed by the proxy layer to the system, e.g. to the file system inspector 176 or registry inspector 177.

Such an implementation allows the consumer to simulate conditions. The consumer overrides the usual relevance evaluation procedure by editing the simulation table, and by installing names of methods and argument types to be bypassed and the associated values to be returned.

In this way it is possible to provide a tool to:

Pretend the existence of devices which are typically connected, but are currently unreachable;

Determine whether a certain advisory or family of advisories goes away (i.e. become irrelevant) if certain modifications to the consumer computer are made, without actually making the modification;

Determine if the installation of a product causes certain advisories to become relevant.

There are many other applications of this approach.

User filtering. It has been tacitly assumed that a user typically wants to see all relevant advisories from all sites. In practice, a user might be interested in filtering the display of advisories, focusing on items from a certain site, from a certain pool, focusing on advisories which exhibiting certain keyword labels in the Refers-to or Solution-Affects.

Promotion of Trust

The invention provides a powerful tool for connecting advice consumers with advice provided by advice authors.

In certain settings, the invention must be security and privacy aware. For an extensive discussion of security and privacy considerations, see below. A typical instance of such a setting is where invention is:

connecting an advice provider and a provider consumer via a public network, such as the Internet;

the typical advice consumer is a lay person; and the advice provider is a large business or other concern which needs to protect and enhance its reputation.

In such a setting, it is important to take into account the widely perceived insecurity of public networks, and to offer tools so that consumers and providers behave wisely.

The communications process disclosed herein is designed to support the development of wise habits on the parts of both advice consumers and advice providers. A cornerstone of the process is that users should only interact with trusted providers, and to this end, the invention provides technology supporting the evaluation of trustworthiness by consumers and maintenance of trustworthy status by providers.

Importance of Trust

In general a trustworthy advice site has several qualitative attributes.

Quality. The advice is perceived by consumers as being well-intentioned, well-conceived, and well-executed.

Security. The advice is perceived by consumers as being secure, having no intent to harm, and having both an intent to help and being carefully tested and responsibly maintained.

Privacy. The advice is perceived by consumers as being private, having no intent to snoop or pry, and having both an intent to keep private and being carefully designed and responsibly maintained to maintain that intent.

Relevance. The advice is perceived by consumers as being tightly targeted, having no intent to go to wide populations of users as would a broadcast message (this is a practice sometimes called spamming in other messaging modalities, such as e-mail), and having both an intent to reach narrow groups of consumers with a focused need to know, and being carefully designed and responsibly maintained to achieve that intent.

The invention offers a number of technological tools facilitating open communication between consumer and provider which lead to proper attributions of trust. The invention, in one implementation, may offer mechanisms allowing interested providers to promote consumer trust and consumers to learn how to discriminate between trustworthy and untrustworthy providers:

Disclosure. Advice providers may have the ability to disclose the potential effects of advice, to describe experiences during testing or in the field.

Discovery. Advice consumers may have the ability to learn about the potential effects of advice, and about the experiences of others with certain advice providers, or with certain advice sites.

Feedback. Advice consumers may have the ability to comment on their experiences with certain pieces of advice.

Correction. Advice providers may have the ability to retract faulty advice.

Certification. Advice providers may have the ability to seek certification of their advice as safe and effective by an outside ratings service. The advice reader may have the ability to block advisories which are not rated in accordance with the consumer specifications.

The following is a more detailed discussion of these mechanisms.

Disclosure Mechanisms

The invention offers advice providers the ability to describe, in the humanly Interpretable component of the message, the potential effects of advice, about the experiences of the advice provider in testing or from user feedback.

By using several methods of disclosure, an advice provider can gain consumer trust and visibility.

In one implementation, a more formal method of documenting and monitoring the effects of the advice is offered, enabling an advice provider to disclose names of potential effects through stereotyped keywords.

A central authority, such as Better Advice Bureau, publishes a registered list of keywords which are used to describe the subsystems of the user computer or its environment which may be affected by the proposed solution, or the effects of the proposed solution on personal privacy. An advice provider, in authoring advice, uses this mechanism to disclose potential effects of a recommended solution operator through stereotyped keywords in a header line Solution-Affects.

In one implementation of the advice reader, these keywords are searchable, and indexable and relevance evaluation is subsidiary to it.

Consumer ease of use may be bolstered, in one implementation, by allowing various kinds of user side filtering based on these keywords. For example, a user plagued by enormous numbers of advisories whenever he detached the CD-ROM drive temporarily could use this feature to simplify his life. He would declare irrelevant all advisories referring to the CD-ROM drive in their keywords fields, and then afterwards detach the CD-ROM drive. In this way, even if there were advisories ordinarily triggered by the non-existence of an attached CD-ROM drive, the user would not have to see them. For an alternate mechanism, see the discussion of simulated conditions above.

Consumer confidence may also be bolstered by allowing such kinds of user-side filtering based on these keywords. For example, suppose that an available keyword reveals consumer Identity to a provider. By using this when it is the case, a provider has disclosed the effects of a message. A consumer who, as a matter of policy does not participate in surveys and similar information gathering advisories could specify that all advisories which contained this keyword should be declared irrelevant. In this way, the provider has done his duty to disclose and the consumer who trusts the provider is rewarded with the ability to see only the important messages.

Discovery Mechanisms

In a typical implementation, the advice consumer can inform himself of potential impacts of a piece of advice before deciding to apply the recommended solution operator. Some of this may already be done using existing Internet technology. The consumer can query other Web sites and search engines to see if there is any news about a certain advisory.

The invention extends this mechanism through a special Internet server referred to as the Better Advice Bureau. The Better Advice Bureau serves as a central clearinghouse for information about the effects and side effects of advice. The user can at any time query the Better Advice Bureau, asking for any recorded comments about a specific advisory or a specific site.

Feedback Mechanisms

In a typical implementation, the advice consumer can provide feedback to the advice provider and to other consumers describing user experience with a piece of advice. Some of this may already be done using existing Internet technology. The consumer can use e-mail and USENet newsgroups to notify others about experience with a certain advisory.

In one implementation, the invention extends this mechanism through a special Internet server referred to as the Better Advice Bureau. The Better Advice Bureau serves as a central clearinghouse for information about the effects and side effects of advice. The user can at any time submit to the Better Advice Bureau Web site (described below), recording comments about the specific advisory or the specific site. The Better Advice Bureau can relay those comments to the advice provider, who can respond to them. In one implementation, the Better Advice Bureau protects the identity of the consumer by stripping off identifiers before mailing or posting. The Better Advice Bureau compiles all the information submitted by consumers, and provider responses, into a database available for queries over the network.

In one implementation, the advice reader offers a direct access to this feature by including an easy way to create a message automatically about a certain advisory in the standard advisory display, and address it to the authorities at Better Advice Bureau. For example, a button is placed as part of the advice browser window. By clicking on that button, a mailer window opens up with the sending and recipient addresses, and with the advisory number and subject already supplied. The user is then always one click away from being able to record a commentary about certain advice.

Correction Mechanisms

In a typical implementation, the advice provider can disown advice that it has posted in error. This is done by removing the advisory from the provider's advice site. Over time, as subscribing advice readers synchronize with the provider's site, the advisory automatically disappears from those consumer computers.

In certain settings, this is not a sufficiently proactive solution. For example, certain advisories may be distributed by means other than the usual the advice reader/advice site model. To the extent that certain consumers may have such advisories in their advice pool, but without associating them with a subscription, they need to be dealt with by a counter advisory. This is an advisory which acts as advice against another piece of advice. Using an advice inspector library as described above, it is possible to write an advisory that is relevant when the consumer computer has a certain advisory in its main advice pool. Such an advisory is typically as follows:

The advisory 40139 which we released on May 31, 1998 has been recalled, and we recommend that you delete it from your advice system immediately.

If you agree to this, click the <DoIt>button below. (signed) <Authors Name>.

Such counter advice is distributed by submitting it to UrgentAdviceNet, a special advice site to which all advice readers subscribe. The piece of advice is rapidly diffused to users.

In summary, the invention offers the following process for dealing with faulty advice:

Removing the bad advisory from the providers advice site.

Writing a counter advisory and submitting it to UrgentAdviceNet.

Writing a better advisory.

Placing the better advisory at the providers advice site.

Certification Mechanisms

One technique to further consumer acceptance of the use of advisories and the associated solutions is to remove some of the burden for determining the trustworthiness of messages from the individual consumer. A method to do this is for a ratings service at a central site to offer a service to advice providers that certifies advice as being in accord with certain publicly known privacy and security standards. Under existing Web protocols (see Khare, Rohit, *Digital Signature Label Architecture,* The World Wide Web Journal, Vol. 2, Number 3, pp. 49–64, Oreilly (Summer 1997) http://www.w3.org/DSIG) there is a method for the establishment of URL ratings services, via a message block that can reliably certify that a certain ratings agency asserts that certain information resources have certain properties. The credibility of such assertions, i.e. that the advice is actually being certified by the service and not by an impostor, is based on deployment of standard authentication and encryption devices. Applying this technology, a ratings service can be established at a central site, e.g. Better Advice Bureau.org as described below, to certify that certain advice operates in a fashion generally accepted as appropriate for the advertised task, is used in a manner to protect individual identity, and has generally benign effects. Advice authors seeking certification of the trustworthiness of their advice submit those advisories to the certification authority, which studies the messages and, at its option, agree to certifies some of those messages. Here certification means that, according to a well known standard, a special ratings block is appended to the message indicating that the message is asserted by the authority to have certain attributes.

In one embodiment of the invention, the consumer is offered the option of making integral use of one or more ratings services. This functions as follows:

A ratings service uses a well known format, such as PICS (see Khare, Rohit, *Digital Signature Label Architecture,* The World Wide Web Journal, Vol. 2, Number 3, pp. 49–64, Oreilly (Summer 1997) http://www.w3.org/DSIG), for describing it ratings of resources such as advice sites and individual advisories.

The ratings service publishes a list of descriptive keywords used in the ratings system, such as BAB-Privacy-Standards-Compliant or does not affect file system.

The ratings service labels individual advisories using its own defined labeling system, inserting these labels into the advisories as ratings blocks according to a standard labeling format, such as PICS.

The ratings service labels individual advice sites by attaching labels to site description files using its own defined labeling system, inserting these labels into the site description files as ratings blocks according to a standard labeling format, such as PICS.

The ratings blocks are interpreted and authenticated by an established cryptographic signature mechanism associated with the service, and part of the ratings labeling standard.

The user interface of the advice reader is extended to contain a new component, i.e. the certification manager. This component allows the user to permit advisories to be evaluated for relevance only when they have been credibly certified by a trusted privacy ratings service as having properties with which the user is comfortable. For example, the user blocks advisories which are not certified by Better Advice Bureau as BAB-Privacy-Standards-Compliant, thereby obtaining a measure of confidence that advisories used in his system do not violate his privacy by revealing information to the outside world.

The certification manager has two defined roles:

Eliciting User Desires. The certification manager plays a role in initializing the certification process. It makes available to the user a list of potential ratings services among which the user can select. When a service is selected, the certification manager obtains from the ratings service URL a list of the defined ratings keywords, and allows the user to design a filter based on specifying that certain keywords or combinations of keywords must be present (or absent) for a message to be trusted.

Enforcing Policy. The certification manager also has the responsibility to parse and validate the ratings associated with individual messages, and block the evaluation of uncertified messages, or of certified messages not exhibiting the users desired attributes.

Privileged Sites

In one implementation, the advice reader is preconfigured with hardwired subscriptions to three privileged advice sites. These built-in subscriptions play a central role in ensuring the security of the invention; together they form an immune system.

advisories.com advisories.com is a Web and FTP site operated by the producer of the advice reader software. This allows users from all over the world to obtain information and updates about the system, about the advice reader, and any updates to the software or the invention's communication protocols.

It is also a trusted site for the distribution of subscription information. Digitally authenticated site description files can be found here for many of the major advice sites on the Internet. These site description files are signed with a digital signature mechanism that is automatically intelligible to every copy of the advice reader. This serves an important security function. As described in the section on security below, it is very important that there be a well known and trusted location that is the source for accurate information about starting a new subscription. By getting site description files from advisories.com, a user has a degree of confidence that he is getting accurate subscription information and is not vulnerable to various security problems.

It is also a site for the distribution of authoring information, in particular, coordination of certain authoring conventions. Two specific conventions have already been mentioned:

Keyword Coordination. This concerns the way in which advisories are used by advice authors to disclose descriptions of potential effects of advice on the consumers computer or possessions or environment. A current listing of adopted keywords may be made available at advisories.com site.

Coordination of User Profile Variables. This concerns a mechanism by which new variables may be added to the user profile by different advice providers. A current listing of adopted variables their formats and promulgators may be made available at advisories.com site.

BetterAdviceBureau.org

Better Advice Bureau.org is both a Web site and an advice site on the Internet. It is a site dedicated to the maintenance of the communications protocol as a civilized means of communication.

The Better Advice Bureau.org Web site describes the principles of system operation, describes why the system is useful, and why it protects individual security and privacy. It describes known risks and recommended procedures for interacting with the system. It serves as a clearing house for user complaints about the operation of advisories, and as a place that consumers may come to for research about the experiences associated with an advisory that they are contemplating to apply.

The Better Advice Bureau.org advice site is an advice site to which all advice readers subscribe. It issues what is referred to as meta-advice or counter-advice, in the form of advisories against bad advisories, or against bad sites. By this device, consumers become aware of situations within the advice process which are dangerous from the standpoint of security or privacy, and they can then take corrective measures.

It is also a site for the distribution of ratings information, in particular, publication of certain rating conventions, as described above. There are commonly accepted methods for rating resources on the Web according to criteria provided by a ratings service (see Khare, Rohit, *Digital Signature Label Architecture,* The World Wide Web Journal, Vol. 2, Number 3, pp. 49–64, Oreilly (Summer 1997) http://www.w3.org/DSIG). The Better Advice Bureau, in one implementation, functions as a certifier of the privacy and security and usefulness of individual advisories. In this role, the Better Advice Bureau rates individual advisories by including in them a certain special ratings block, according to a well known ratings format, such as PICS. The Better Advice Bureau also publishes at its Web site the information needed to interpret such ratings blocks, including:

A list of descriptive keywords used in the ratings system, such as BAB-Privacy-Standards-Compliant or Does Not Affect file System.

Public key information associated with the certification process.

UrgentAdvice.net

UrgentAdviceNet serves to distribute advisories rapidly to all advisory consumers. It is used sparingly, to deal with urgent situations acutely affecting significant numbers of users. In one implementation, it has a high priority in synchronization, being synchronized every time any synchronization takes place.

Other Application Areas

In this document so far, the invention has been described in connection with the technical support application. The following is a partial list of other applications to which the invention may be put.

Consolidator.com

An Air Ticket consolidator purchases a block of 50 seats on a flight from New York to London for August 20. The consolidator wants to resell those seats to travelers. The consolidator maintains a relationship with a variety of travel agents.

The consolidator uses the invention to market its product more efficiently. The consolidator functions as advice provider, and authors an advisory whose relevance line asserts the existence of a consumer in the travel agency customer database who has reserved a ticket to go to from New York to London on that date, or near that date. The advice provider places the advisory at his advice site.

Advice consumers, in this case the various travel agencies working with the ticket consolidator, have their representative computers set to subscribe to the consolidators advice site. They also install a special inspector in their computer which searches the travel agency customer database for customers with certain travel plans. Advisories flow to their computers and are automatically inspected for relevance. Here relevance means a potential traveler who has plans to travel. The travel agent offers the traveler a ticket at the reduced price provided by the consolidator. The consolidator then makes a sale and the travel agent a commission. All participants win.

CheapFlights.com

A large airline frequently has last minute opportunities for travel at bargain rates. The airline wants to match the tickets to consumers with a continuing interest in last minute travel to certain cities. This airline can use the invention to market its product more efficiently. The airline functions as advice provider and authors advisories whose relevance line asserts the existence, in the user profile, of an expressed desire to travel to a certain city. The advice provider places the advisory at his advice site.

Advice consumers, in this case the potential travelers, have their representative computers set to subscribe to the airlines advice site. They add expressions of special interest to their user profiles indicating cities they are willing to fly to on short notice. Advisories flow to their computers and are automatically inspected for relevance. Here, relevance means a potential opportunity for a flight on short notice.

Commodity.com

The system above described works in many other commercial areas, e.g. one could build as a result, such sites as CheapConcerts.com and CheapHotelSuites.com working on similar principles.

Figure 18:
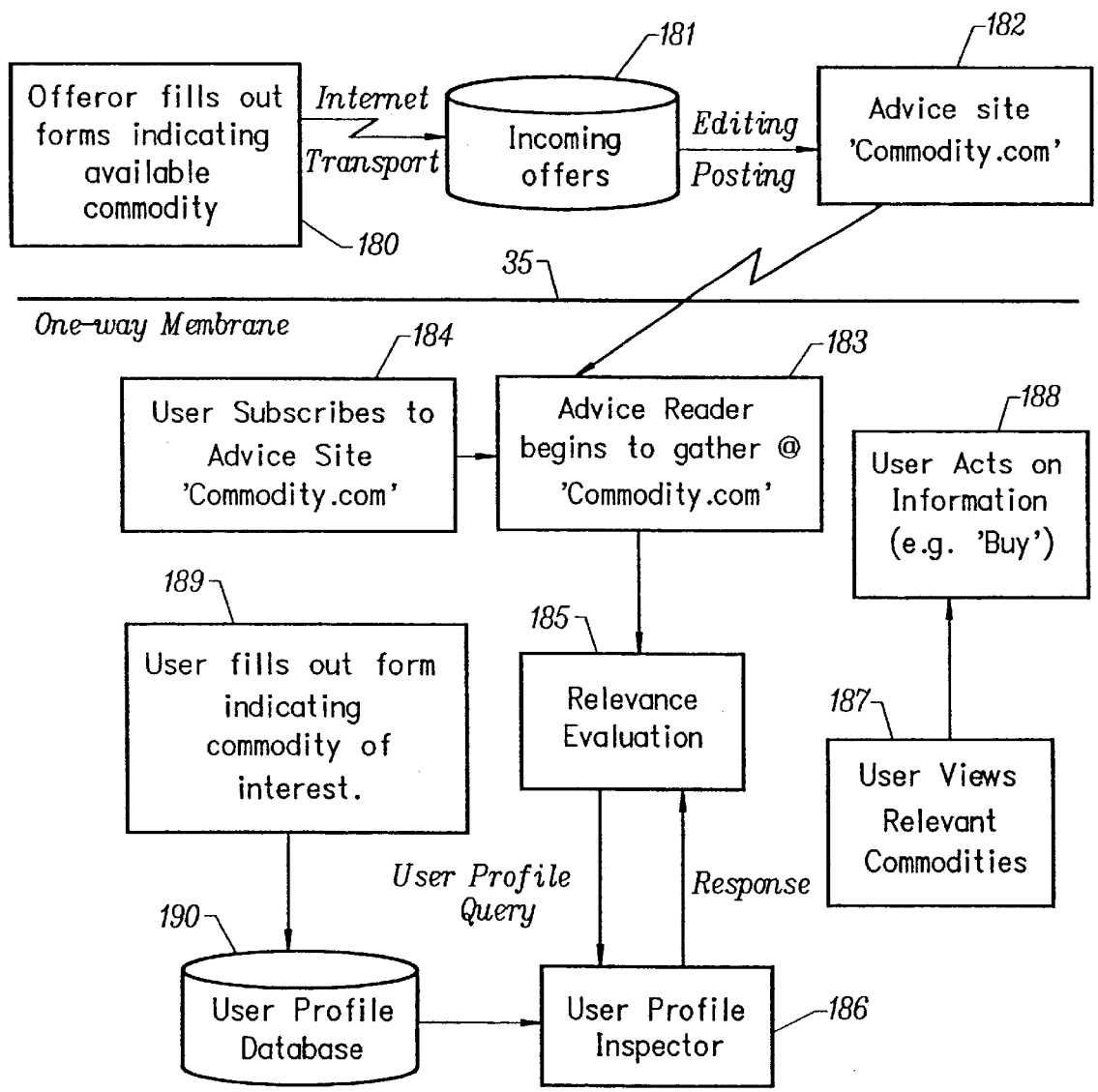
FIG. 18 is a block diagram showing a commodity market according to the invention.

Extending this point, it is possible to run a new type of commodity market using the invention. In one model (see FIG. 18), there is a central site referred to as Commodity.com that functions as the market maker. This is attractive in a setting currently handled by classified ads, where there are many individual offerors seeking a central marketplace. The process is as follows:

3. Offeror submits to Commodity.com an advisory offering object for sale 180.

3. Commodity.com advice site staff edits and posts advisories 181, 182.

3. Users subscribe to Commodity.com 184.

4. Subscribers input information about interests to user profile 189, 190.

4. Relevant advisories concern objects meeting their interests. The process proceeds are described above, where the advice reader gathers advisories from Comodity.com 183. Relevance evaluation is performed 185 in accordance with a user profile 190, as inspected by a user profile inspector 186. The user view the relevant commodities 187 and acts on the information contained therein 188.

BalanceTransfer.com

In the world of financial services, there are many companies that attempt to market specific services to customers directly. These include credit cards with specially low rates on cash advances, particularly credit balance transfers from competing financial instruments, and mortgage refinancing offers.

The attempt to reach consumers is expensive and often difficult. Certain consumers, who might otherwise be interested in the financial benefits of the service, do not allow telephone or mail contacts. Other consumers do not disclose sensitive information over the phone, which is typically required to participate.

The following is an example of a financial services offer through use of the invention. This embodiment of the invention is described as a centralized system, although it easily could be a decentralized system.

Offeror submits advisory to BalanceTransfer.com offering balance transfer to those with sufficient balances and incomes.

4. BalanceTransfer.com advice site staff edits advisories and posts.

4. User subscribes to BalanceTransfer.com.

2. User fills out information about credit card balance, existing interest rate on balance, and income for User Profile.

Advice reader uses remote connection to verify balance, preserving privacy.

Relevant offers are those which benefit user. The advisory, if well written, uses the income data to test if the applicant is approved. Hence, relevant advisories have credit pre-approved.

There are many variations on this kind of advice. Home refinancing operates in substantially the same way. The advisory is written mentioning variables associated with the principal, current interest and term of an existing loan. An advisory is relevant if it provides a set of better terms than an existing loan.

There is no reason why this service must be globally centralized. In a typical variation, individual mortgage brokers offer their own advice sites.

BadPills.com

The invention can be used for a variety of consumer product warnings recalls, and safety advisories. The following is one example.

BadPills.com is a site where information is available about drug products and their interactions. The following describes is how the site operates to notify pharmacies about potentially damaging drug interactions in their customer base.

The FDA and other organizations, e.g. pharmaceutical manufacturers and consumer organizations, submit information about interactions and side effects of medications. Each advisory has the following form:

The relevance clause asserts the existence in the pharmacy database of customers with active prescriptions for drugs with a known potentially damaging interaction.

The human readable content tells about the interaction, tells the pharmacist that he has such an interaction in his client base, and urges the pharmacist to correct the situation.

Advice site collects submissions, edits and posts.

Pharmacy subscribes to the site. As part of subscription initiation, the pharmacy must install a standard pharmacy customer database inspector on its computer. This inspector can check to see if any patients in the database have a certain prescription.

Pharmacy computer gathers advisories routinely.

Relevance evaluation generates queries to pharmacy customer database inspector.

Database inspector processes pharmacy database.

Relevant messages are provided for dangerous drug combinations.

There are many variations on this embodiment of the invention. A similar service for physicians is made available through a physician patient database inspector for those physicians who keep track of patient subscriptions on their office computers. A similar service for patients is made available through an individual health record database inspector for those Individuals who enter their own subscriptions in the user profile. One way to simplify this is to have an information exchange program, allowing a user to remotely query the pharmacy database for information about himself.

Group Anonymous Messaging

Suppose there is a group G of individuals who wish to have an anonymous communication. with a provider P. The individuals in G are widely distributed and do not know each other. There is a way to use invention to set up a site for two-way anonymous communication of this kind.

Such communications are made widely available and are used by many persons. For the anonymity of the participants, it is important that the system be used by many different persons from many different groups.

The site is an anonymous posting advice site where any e-mail sent to a certain address has its identity stripped and is posted at the advice site. Such an advice site operates completely automatically. This site may be referred to as SecretFriends.org.

This site may be used in conjunction with private-public key cryptosystems. Secure off-line refers to a system where an agent of G arranges with P for a conversation. The agent delivers to P a public-key which is created for G for the purpose of conducting this discussion. This key is not actually public. It is a secret known only to G and to P. It is only referred to as a public key because it is the key which is commonly made public in standard applications of public-private key systems. The key is only delivered to P. Similarly, the agent returns a specially created public key from P to G.

G and P exchange messages by the following process:

Subscribing to SecretFriends.org.

Authoring messages which are relevant only to those holding the decryption key they have released.

Using anonymous remailers or other means to post to SecretFriends.org the encrypted messages.

This approach provides anonymous communications as follows: A participant's advice reader synchronizes with SecretFriends.org. Potentially, a great number of advisories, actually encrypted messages, are obtained. The only messages that are displayed by the advice reader are those that are actually decryptable using the indicated key. The others are all jettisoned. The relevant advisory is then decrypted and read.

This approach provides anonymity under the AEUP protocol because, assuming many different people are using SecretFriends.com, there are a great number of messages being placed there, and only a tiny fraction end up being of interest to a given reader. Because of the structure of AEUP, no one watching the process at the advice site can tell which messages turned out to be relevant to which user.

Distribution of Sensitive Product Information

A variant on the group anonymous messaging embodiment, in a specific setting, is provided as an information service for consumers of products who do not want it known that they use the indicated product. For example, users of antipsychotic medication or those undergoing cancer treatment.

Users of the sensitive product are given a numerical code with the purchase of the product which serves as the (secret) public key. The users then subscribe to a certain advice site, arranged in advance, which is, for example, SecretFriends.org, or an industrywide consortium site, for example Druginfo.org. The users indicate in their subscription the (secret) public key. The advice reader periodically synchronizes with the site, and brings in advisories, some of which may concern the product. The others do not concern the product. Only the advisories associated with the specific medication pass the digital signature test and become relevant.

Security Issues

When the invention disclosed herein is implemented as described above and deployed in the technical support application, it may be operating in a security and privacy critical setting. The implemented system is then typically interacting automatically with the Internet, and obtaining and using resources from remote computers without direct human oversight. These resources remain resident on the consumer computer, typically over an extended period of time, being evaluated periodically for relevance. When relevant advisories are identified, the advice reader displays to the human consumer the explanatory content of the relevant advisory. This explanatory content may propose to the consumer actions which may have effects on the computer, on attached devices, or elsewhere. If the consumer gives approval, these actions typically are then carried out automatically.

In short, the advice reader introduces into the consumer computer documents that are processed automatically and that after processing may propose to the user potentially permanent modifications to the computer or its environment. The consensus opinion of networking professionals (see Anonymous (1997) Maximum Security, Sams.net Publishing, Indianapolis; Oaks, S. (1998), Java Security, Oreilly, Sebastopol, Calif.; and Baker, R. H. (1995) Network Security, McGraw-Hill, New York) is that unsupervised interaction with the Internet poses serious risks. In fact the invention, in its standard mode of operation, does not expose the advice consumer or advice provider to risks greater than the baseline risks involved in typical usage of e-mail, browsers, and related Internet tools. Those modes of Internet interaction are currently considered acceptable risks. The invention, in a typical mode of operation, offers lower risk.

Preliminary Comments

Two fundamental points are of interest.

Trusted sites. The concept of trust is discussed above. Users should only subscribe to advice sites that are known to them to provide trustworthy advice. In fact, consumers typically configure their advice reader to subscribe mainly to advice from large concerns which manufacture goods and services of interest to the consumer such as, for example, a computer manufacturer, a software publisher, or the provider of Internet service. Subscription to substantial organizations of this type is a reasonably secure practice. Such organizations have an interest in providing trustworthy advice so that they maintain rapport with their consumers. It is anticipated that very few risks are posed to advice consumers who subscribe to advice authored by such concerns.

Better Advice Bureau. The Better Advice Bureau.org, which is described above, is a fundamental tool for ensuring the security of invention users. All invention users subscribe to this site. This site compiles counter advice, informing users about dangerous sites and about bad advice which is circulating. The Better Advice Bureau functions in some respects as an immune system for the invention, allowing the correction of dangerous situations. UrgentAdviceNet is another site to which all users subscribe. It provides a special mechanism for delivering very urgent counter advice to the consumer population.

Absence of High Profile Risk

The following discussion of security considers some of the more well known risks of Internet interaction and then explains why these well known risks actually do not arise under the invention when used in a typical implementation.

Inventory of High Profile Risks

Internet operations have in the past suffered a number of active threats that can be symbolized by three figures who have captured the popular imagination:

Break-ins: Kevin Mitnick. Over a period of years Mitnick used the Internet systematically to break into computers worldwide, and he managed deliberately to cause some to crash or to lose data permanently. While it is supposed that Mitnick was some sort of evil genius the truth is that sites on the Internet give instructions on how to break into Pentagon computers. A Pentagon led experiment in 1997 showed that using publicly available information one could, in fact, access classified DOD computers and cause permanent damage to files.

Attacks. The Internet currently makes software tools available for free which allow their users to attack other peoples computers over the Internet, causing those computers to crash. The basic strategy is to connect to various TCP/IP port servers on the intended victim computer and flood it with requests for service. (Anonymous, Maximum Security, Sams.Net 1997)

Worms: Robert Morris, Jr. In a well-known 1988 episode, Morris released a worm which spread rapidly across the Internet, installing itself in many machines, and while in execution on those machines, spread itself to other machines. In fact, Morris was attempting no more than a prank. The rapid and pervasive spread of the worm surprised him, as did the enormous amount of time required to eradicate the worm and regain full capabilities of the affected computers. The powerfully disruptive nature of the worm was caused by its ability to spread automatically, and run automatically on whatever machine it reached. This case dramatizes the risks that can arise through the automatic spreading of executable code across the Internet. (Pfleeger, *Security in computing*, Prentice Hall 1996)

Absence of Consumer Exposure to High-profile Risk

The advice reader does not expose the consumer to additional risk from these high profile sources beyond the baseline risk he suffers now.

The advice reader is not vulnerable to break-in because it does not offer any kind of interactive shell offering log-in access, as the term break-in requires.

The advice reader does not expose the consumer computer to any extra risk of attack beyond the risk the consumer already faces due to Internet connectivity.

The advice reader adds no risk because it does not make available any perpetually open TCP/IP port which can be flooded with requests. There is nothing the outside world can do to try to talk to or initiate an interaction with the advice reader.

The advice reader does not expose the network to any risks of worms. In a typical configuration, the system does not offer any mechanism by which anything can spread from advice reader to advice reader.

Server Exposure

Consider the vulnerability of the invention server to active threats. A server using the invention, as with any Internet-based server, exists for the purpose of offering services to the outside world. It is visible on the Internet and open for business, typically around the clock.

There is no risk of break-in, because there is no interactive shell offering log-in access, as the term break-in implies. However, the server can be flooded with requests as with any Internet server. There are well known techniques to combat such request floods, and professional Web site operators know about them. The server side users of the invention are professionals who are well equipped to evaluate and react to this type of standard threat.

The invention's server does not expose the server to any risks of worms. In a typical configuration, the system does not offer any mechanism by which anything can spread from advice reader to advice server, or by which anything other than an extremely narrow range of functions can be performed by the server.

Protective Influence

There is a certain sense in which the invention actually can help protect against worms, break-ins, and attacks. The advice delivery mechanism allows network security personnel to create advisories warning the consumer when the consumer is behaving in a way that leaves the door open to criminal disruption. The advice delivery mechanism also allows network security personnel to author advisories which diagnose whether a user is currently being attacked, or has been recently attacked. In this way, the invention functions as an immune system, allowing the rapid spread of corrective advice.

Spoofing Risks

In effect, the invention interaction is never completely unsupervised. The advice reader only interacts with advice sites that have been subscribed to by the user. The user is therefore, in his choice of subscriptions, exerting a kind of permanent high level supervision. If the user subscribes only to sites offered by organizations with a strong incentive to provide trustworthy advice, he is protected. An individual making harmful advice does not legally have a way to force the introduction of that advice into any given advice reader.

There is a very important category of active threat which is not widely known, i.e. attack by spoofing. In this category falls spoofing of Internet locations, i.e. the user thinks he is communicating with a certain trusted site, but actually is communicating with an impostor site. Another kind of spoofing is the use of mole programs which appear to be standard applications but which actually are not, and can violate privacy and security in other ways. (Anonymous, *Maximum Security,* Sams.Net 1997)

DNS Spoofing

In this scenario, an impostor creates a near clone of a popular and trusted site, such as the site of MicroComp. However, the impostor site also contains harmful advice.

DNS spoofing provides a way for the impostor site to appear to certain users on the network as if it were actually the popular and trusted site of MicroComp. The only way this could happen under current network protocols is for the impostor to interfere with the DNS lookup process of certain consumers, and misdirect certain consumer advice requests aimed for MicroComp.

DNS spoofing operates as follows: The impostor must have system level access to a machine on the Internet which is physically located in a position to intercept some of the domain name resolution requests intended for a certain Domain Name Server (DNS). The impostor programs the IP routing logic to inspect the intercepted requests looking for those which refer to MicroComp and, when such a request is found, to return an incorrect TCP/IP address, the returned address referring to his fake advice site. All advice readers situated downstream from the impostor are in this way misdirected to the fake advice site whenever they try to go to the MicroComp advice site. The fake site appears just like a real site, but distributes harmful advice under the pretense of being a trusted provider. In short, by perpetrating DNS fraud, there is a way for an attacker to introduce damaging advice directly into one or many computers.

This sort of activity constitutes criminal fraud under current federal regulations. This type of fraud is reportedly rare (see Anonymous (1997) Maximum Security, Sams.net Publishing, Indianapolis. In addition, a perpetrator able to carry off this type of fraud might find systems using the invention to be less attractive than other targets. For example, DNS spoofing of large electronic commerce sites such as bookstores and computer software warehouses is more attractive to the perpetrator, in the sense of offering a more rewarding payoff if the spoof is successful. Indeed, the perpetrator could offer a Web site pretending to be the Web site of a certain merchant, offering up Web pages with the same general visual appearance as Web pages from the correct site. The fake Web site contains forms which the user fills out to execute the transaction. In reality, those forms are used to capture information about credit card numbers or other sensitive financial data. This seems a more direct way for a perpetrator to benefit from a DNS spoofing scheme.

This sort of activity affects only a subset of the users of a large public network such as the Internet. For example, assuming that an individual consumer enjoys a secure connection to a DNS server, and assuming also that the information on the DNS is maintained securely, DNS spoofing is not a material threat for that particular consumer. In most moderately large corporate environments, DNS services are provided within the corporate intranet. Assuming that the impostor is outside the corporation, then for advice consumers within the corporation, this spoofing threat is stymied by the standard security devices for intranets, i.e. firewalls. Certain noncorporate advice consumers enjoy Internet access through Internet service providers offering DNS servers located on the Internet in close physical proximity to their modem banks. Assuming that the impostor is not inside the physical domain of the Internet service provider's offices, consumers who use such DNS services may also be secure against DNS spoofing.

In effect, spoofing is only a threat for advice readers relying on insecure connections to their DNS. In future network protocols, DNS connections may be digitally authenticated, and the spoofing threat is stymied in such settings as well. Until that time, the invention has a way to stymie this threat under the current regime using digital authentication of advice itself. Digital authentication of advice is also of interest to those consumers with secure DNS connections because advice may be distributed, in some implementations, by insecure means such as e-mail or sneakernet. It gives the user additional confidence in the advice he is receiving.

In a typical implementation of invention, the term digital authentication refers to the use of existing digital signature mechanisms based on so called public-key/private-key pairs (see *PGP* 4.0 *Users Manual,* PGP Pretty Good Privacy, Inc. (1997)). This mechanism is developing into a well understood, mature, and reliable standard. Other forms of digital authentication can be used with equal validity.

The following describes how the public-private key pair mechanism is used to authenticate advice. The advice provider, e.g. MicroComp, acquires a public-key/private-key pair, of which the private key is a secret known only to the provider. The provider takes steps, described below, to publicize the correct public key. The provider, knowing both keys of the pair, attaches to each advisory a signature block which is successfully interpreted by an advice reader which knows the correct public key. The ability to interpret the block is considered by the advice reader proof that the author knew both keys, which is considered proof that the author is in fact MicroComp. In a typical implementation, a user interface component informs the user that a given piece of advice is signed by MicroComp. The precise meaning of this is that the signature block is successfully interpreted by using the known public key.

The invention's mechanism for protection from the DNS spoofing threat involves actions by both the consumer and the provider. The provider authors a site description file, containing a listing of the information related to the subscription, including the site's location and the site's digital signature public key. The provider publishes the site description file, for example in physical media such as a disk or CD-ROM, as part of the distribution of a software product offered by MicroComp. In this way, many consumers obtain copies of the site description file by secure means. A consumer initializing a subscription to MicroComp presents to the advice reader's subscription manager the site description file for MicroComp. The provider, whenever authoring an advisory, attaches a digital signature block. The advice reader, whenever obtaining a piece of advice, checks that the digital signature is successfully interpreted using the public key known to the reader to correspond to MicroComp.

Unless the advisory passes this test, the advice reader refuses to evaluate the advice for relevance. The reader may also notify the user that there is unsigned advice coming from a site whose site description file claims that the site provides only signed advice. The reader also offers to inform Better Advice Bureau of this fact.

To see why this approach protects against DNS spoofing, it is important to understand a basic feature of the public-key/private-key system. It is commonly accepted that an impostor faces a very difficult time trying to fake the digital signature of MicroComp.Com. This conclusion rests on the assumption that the impostor must make a successful fake signature using only the publicly available information associated with the encryption scheme; i.e. that the impostor does not have access directly to MicroComp.Com's private key. It is computationally an extremely difficult task for an impostor to fake a digital signature correctly from publicly available data (see C. Pfleeger, *Security in Computing*, Second Edition, Prentice-Hall(1996); and *PGP 4.0 Users Manual*, PGP Pretty Good Privacy, Inc. (1997)). It is an equivalent computational task to the task of factoring an integer with hundreds or thousands of digits into its prime factors. Using networks of many thousands of computer workstations over periods of many months, it has been possible to factor individual numbers with about 150–200 digits. However, this has been achieved only by a kind of vast scientific collaborative enterprise. It is unlikely that an impostor has access to the required resources for mounting an effort that would succeed on integers of the lengths commonly used in signature algorithms. Moreover, there is an easy remedy, i.e. double the number of digits of the keys, putting the factorization task beyond reach of any currently conceivable collaborative effort based on currently conceivable computational resources.

In short, an impostor is highly unlikely to be able to author advice with a digital signature which is intelligible using the correct MicroComp public key. Unless the impostor can do this, the advice reader refuses to evaluate the advice for relevance, and so the impostors advice poses no substantial threat.

Key Spoofing

An apparent hole in the digital authentication system is the possibility of key spoofing. In this scenario, the consumer's advice reader has somehow accepted an incorrect public key for MicroComp, i.e. a key which is not the correct key for MicroComp, but is instead the public key of a public-key/private-key pair owned by the impostor. If this happens, then the advice reader can be deceived because it recognizes the impostor's advice as valid. However, the invention is designed to prevent this scenario from occurring.

For key spoofing to occur, the consumer's subscription must be initiated using a site description file that is not obtained through secure channels, such as the original software installation from physical media. The impostor must author fake site description files and distribute these on the Internet.

A typical implementation of invention cannot be fooled by key spoofing. There are three mechanisms for this, any combination of which may be effective:

Certification of site description files. In one implementation, site description files may include a digital signature by a central authority, the Better Advice Bureau, testifying that the site description file purporting to be authored by MicroComp is, in fact, so authored. The digital signature of Better Advice Bureau is hard wired into the advice reader, thereby avoiding the possibility of spoofing the Better Advice Bureau certification.

Spoof-Proof Key Verification. A typical implementation of the subscription manager performs key verification prior to recording a subscription. It contains hard wired information enabling it to make a direct TCP/IP connection to a hard wired IP address of a key authentication server. Such a server verifies that a given organizations public key is as it is said to be. Because the contact address of the server is hard wired into the program, access to the key server cannot be DNS spoofed.

Counter-advice. If a certain site is successfully spoofed, it may submit to Better Advice Bureau.org an advisory which goes out to all advice readers because Better Advice Bureau.org is a built-in subscription. The advisory asserts the value of the correct public key associated with the site. Those users with incorrect public keys are notified with the relevant advisory, which explains the risks involved. If the issue is particularly urgent, the site UrgentAdviceNet is employed.

In summary, if the advice reader and its subscriptions are appropriately configured, the advice consumer is protected from spoofing when the advice provider digitally signs his advisories.

Reduction of Spoofing Threats

DNS Spoofing, while a significant threat to Internet security, is not more of a threat to the invention than to other components of the Internet, especially e-commerce. The Better Advice Bureau.org and UrgentAdviceNet are important devices to help suppress spoofing of advice.

Better Advice Bureau.org and UrgentAdviceNet are important devices to help suppress spoofing of all Internet activities. By the use of this combination, the Internets susceptibility to spoofing may be reduced, and the attractiveness of spoofing in other settings, outside of invention are reduced.

Advice Reader Moles

Another potential hole in the invention's security system is the possibility that a copy of the executable binary of a legitimate advice reader is acquired by an attacker, and then is systematically altered to introduce various new behaviors. The resultant illegitimate reader is then redistributed on the Internet, where it masquerades as a legitimate copy of the advice reader, and is downloaded and used by unsuspecting consumers. Nothing can stop the creation of such illegitimate readers. Nothing can stop illegitimate versions of a software tool from displaying very damaging behavior. This is well understood by the community of Internet users worldwide. Anyone who downloads software over the Internet from sites which are not authentic providers of trusted software exposes himself to the same risk, whether the software is a word processor, a spreadsheet, a Web browser, or the advice reader.

However, of concern is the possibility of illegitimate mole readers whose goal is not to cause damage but to compromise the security and privacy of the user. Such mole readers contain subtle features escaping detection by casual observation but allowing for subtle effects on the user's environment or for the gathering and forwarding of important information about the user. Again, the invention is no more vulnerable to this kind of modification than any other piece of software. However, the typical implementation of the invention contains two mechanisms which can identify the existence of mole software and help correct the situation.

Server-Challenge. This is implemented as part of the invention server-reader interaction protocol. A typical implementation of the server begins its transaction with an advice reader through a handshaking session, in which the server challenges the reader to prove that it is a valid version of an advice reader. In a typical implementation, the advice reader is written to create certain data blocks with known properties dynamically in memory at known location offsets from the beginning of the program. The method by which the data was created and the purpose of the creation are guarded secrets. The server selects random blocks of this data and asks the reader for the correct digital digest associated with such a block. If the program is altered, it is difficult for the executable code to answer the challenge correctly. If the server receives an unsatisfactory answer, the server then transmits advice to the reader which is automatically relevant, stating that the user's advice reader appears illegitimate. The advice reader may also refuse to interact with servers that do not pass a digital authentication test.

Advice-Challenge. The invention, at Better Advice Bureau.org, offers advice whose intent is to verify that a valid configuration of the invention is installed. The advice, which may change daily, asserts that certain blocks of the data in the CPU memory while the advice reader is running have certain digital digests. The blocks are chosen randomly by the Better Advice Bureau.org authority, or according to design, when a certain well known mole is to be diagnosed from a specific motif in the binary data at a specific location.

In summary, invention diagnoses moles and notifies users about them.

Reduction of Mole Threats

Moles, while a potential threat to Internet security and privacy, are not more of a threat to the invention than to other components of the Internet, especially e-commerce. Better Advice Bureau.org and UrgentAdviceNet are important devices to help suppress spoofing. The same remark applies to moles. Better Advice Bureau.org and UrgentAdviceNet are important devices to help suppress mole applications uniformly. By the use of these devices, the Internet's susceptibility to mole activities may be reduced, and the attractiveness of mole activities in other settings, outside of invention is reduced.

Irreducible Core Risks

A threat is caused by defective advice offered in good faith by usually trustworthy authors. Advice authors have reputation incentives which tend to make them want to provide good advice. Advice providers in one core application, e.g. technical support, are part of sophisticated organizations which have the ability to do things in a disciplined way. They understand that advice should be tested for safety and effectiveness and be released in a deliberate, staged manner. Because of this, it is likely that very few pieces of advice in the technical support applications area are defective. Nevertheless, there are occasional problems with advice authored by typically trustworthy providers.

The risks posed by advice are of two kinds:

First, there are the risks posed by advice gathering and evaluation.

Second, there are risks posed by the solution process, i.e. by the users response to a relevant advisory which offers the user a solution to a problem. This second type of risk is by far the more serious one. When the user agrees to a solution, he is allowing powerful actions with potentially permanent consequences. The advice reader is not able to provide any kind of protection against the effects of applying flawed or malicious solutions. Instead, the burden of security must fall on the user, who should always limit subscriptions to well known, trusted sites, and should always carefully check the explanation and the authenticity of authorship before accepting a solution proposed by an advisory. In its typical configuration, invention does not automatically apply solution operators, precisely because of the need for user supervision.

As for the first kind of risk, that from gathering and evaluation, the invention is specially designed to limit risk.

It is true that the invention is typically used in a mode of automatic unattended operation. In this mode, advisories are gathered from external advice sites without user intervention and are automatically evaluated for relevance without user intervention. As mentioned earlier, the consensus of Internet experts is that automatic unattended operation over the Internet poses serious risks.

However, the invention does not download arbitrary resources, nor does it evaluate arbitrary executable code. Its design imposes constraints on what information can flow into the computer automatically, and on what effects automatic evaluation can have. These constraints are specifically imposed to avoid the known risks of unattended operation.

In its typical configuration, the invention does not automatically apply solution operators, even when performing automatic unattended operation. In that typical configuration, the effects of automatic unattended operation on the system are not direct effects, i.e. the advice reader does not enable modify access to a specific piece of the system environment. The effects are instead indirect, i.e. side effects of consuming too many resources during the downloading and evaluation of advice. The side effects to be concerned with are of three types:

(a) Advice gathering might monopolize all network bandwidth.

(b) Advice gathering might fill up the local storage device.

(c) Relevance evaluation might consume all CPU cycles.

Problems (a) and (b) are solved by resource rationing. The information that can flow into the computer consists of ASCII text files. By imposing resource quotas at download time, the system protects against the possibility that overly many network resources are used and protects against the possibility that overly big files are downloaded into the machine, exhausting the capacity of the processor or storage device. Problem (c) is also partly solved by resource rationing. By metering CPU usage and imposing resource quotas, the invention can address the problem.

Security Support in the Invention

The invention is designed to support security habits in several ways.

Language Structure

The relevance language is an example of mobile code. Such code is written by an author on one computer for interpretation on another computer. Recently, there has been considerable interest in the development of safe languages for mobile coding (see S. Oaks, *Java Security,* Oreilly (1998); and N. Borenstein, *Email with a mind of its own: The Safe-TCL Language for Enabled mail,* http://minsky.med.Virginia.edu:80/sdm7g/Projects/Python/safe-tcl/). Java and Safe-TCL are examples of so called safe languages, i.e. they are considered to provide a degree of safety that traditional languages such as C and C++ cannot offer.

The relevance language is a language for mobile coding. The language offers a level of security protection in excess of the current norm of the Internet business community. Relevance Language interpretation is inherently safer than safe languages for mobile code, such as Java and TCL. Java, TCL, and related languages are procedural languages. They contain control features such as loops, recursion, and branching statements which, if abused, can consume large fractions of system CPU resources. They offer authors storage allocation facilities which, if abused, can potentially consume large fractions of system memory resources. Remote unattended operation of code from these languages obtained over the Internet can in fact be dangerous, despite the labeling as safe. In fact, these mobile code languages are typically only used in attended operation. For example, mobile Java code is typically used in Web browsers, with a human watching the screen as the code runs. It is implicitly understood that the human is supervising the execution of the process.

The relevance language is a descriptive language rather than a procedural language. It describes a state of the computer and its environment. Relevance evaluation is a process of determining whether this state holds or not. This description of the state uses a language that does not exhibit traditional control structures, such as loops, nor does it have traditional storage allocation facilities.

In fact, the relevance language is so tightly constrained that it is not Turing-complete. It does not suffer from the famous Turing halting problem, which is a typical property of procedural languages. The Turing halting problem is to decide whether a given computer program ever halts or not. Most procedural languages are undecidable. They contain programs, perhaps even simple ones, for which it can never be known in advance whether the program must always halt. Java and TCL programs can be undecidable. In stark contrast, statements expressible in the relevance language are decidable, i.e. they halt.

This is an additional level of security that goes well beyond the security guarantees of mobile code languages, such as Java and TCL.

Human Intelligibility

An additional security feature of the invention is the human intelligibility of the relevance language. The relevance language has an appearance which is reminiscent of ordinary English. A consumer who reads English can form an approximate sense of what a given piece of advice is doing by inspecting the plain text of the advisory. In this way, consumers are brought into the process of understanding the advisories sent to them. While it is true that untrustworthy advice providers, by writing opaque relevance clauses, may still be able to disguise their intentions, the more important point is that trustworthy advice providers are able to make their intentions clear to consumers, and thereby gain and cultivate trust.

Disclosure and Labeling

The invention offers, in one implementation, a mechanism to encourage advice providers to label their advisories clearly for intended effects and thereby provide the public an accurate understanding of the risks associated with a given solution operators.

In this implementation, the Better Advice Bureau defines and maintains a list of special labels which indicate the effects of a certain solution operator, for example, the subsystems affected, the extent to which effects are reversible, and the availability of further documentation explaining the proposed change. The advice provider uses this labeling system to describe the effects of the advisories published by the provider. The advice reader uses this labeling mechanism as part of its user interface during the solution proposal process. When a consumer is contemplating applying a solution operator, part of the user interface indicates for the consumer the types of side effects which may result, according to the labeling which the provider has supplied.

Both consumers and providers, under the guidance of a central classification, come to have a common way to understand and discuss the potential effects of a system modification. The Better Advice Bureau issues counter advisories against advisories which inaccurately label the effects of their advisories. The advice reader uses distinctive visual identifiers to call attention to advice with extreme effects and to call attention to advice with no labeled effects. The consumer may refuse to approve proposed solution operators which are unlabelled, or to subscribe to sites which author unlabelled operators.

Security Summary

There are several illegal activities that threaten the security of the consumer. However, in every instance, the system has been designed with an effective means of defense. The invention does not expose the user to levels of risk in excess of those risks already experienced through the use of e-mail and Web browsing. In fact, the risks from invention are far lower than the risks of those standard activities.

There is also the possibility that otherwise trustworthy advice authors release damaging advice. The system is designed to contain and correct such situations. The extent of damage due to honest mistakes is contained because advice has access to only a limited complement of system resources, e.g. disk storage and CPU time, and the use of these resources is metered and rationed in a typical implementation. The structure of advice files and the associated relevance language is relatively transparent to consumers, which helps them play a role in fostering their own security. Finally, through the advisory process, through Better Advice Bureau and UrgentAdviceNet, the invention contains mechanisms to correct security problems automatically as they arise.

Privacy Issues

The advice reader accesses a great deal of information about the consumer's computer, about the contents of the files on the consumer's computer, and about the interactions of that computer with devices in the immediate environment. To the extent that the consumer stores information about his financial, personal, or medical affairs on the computer, typical implementations of the advice reader are able to access that information, for example bank balances and prescription drug information. To the extent that the consumer computer has access to network devices which form part of the consumer's home or work environment, the advice reader is able to access information about that environment, for example whether certain devices are present in the environment, whether they are operating, and what their conditions of operation are. Enabling the invention to access this information is beneficial to the consumer, allowing helpful advice to be written which can identify problematic situations and call them to the attention of the consumer.

Much of the information that invention has access to is potentially sensitive, and most consumers would not knowingly permit such data to be divulged to strangers. Any system which can access such sensitive information must also protect the information. As explained below, the advice reader acts to preserve the privacy of the consumer.

Existing Internet Privacy Standards

The invention is designed to protect user privacy, offering a level of protection far in excess of the current norm of the Internet business community.

Internet mediated activities, such as Web browsing and on-line commerce, can result in the disclosure to Web servers of information about the browsing consumer's identity, computer configuration, and also certain items about consumer shopping or browsing interests. There is no single accepted standard of privacy, and industry groups have formed for the purpose of gathering information about consumers from their Web interactions and sharing among themselves information about the consumers. Consumer oriented groups such as EPIC (Electronic Privacy information Center) have formed in response, and there are currently political battles over the consumer's right to electronic privacy.

The invention offers a method which meets or exceeds the level of information privacy desired by consumer groups, while providing the fine grained targeting of messages to recipients desired by industry groups.

The standard that the invention offers is understood by considering a classification of privacy respecting/threatening behaviors. The ethical standards of advice providers are classified into four categories, definitions of which are provided below.

(Ea) Completely Ethical
(Eb) Merely Ethical
(Ec) Merely Legal
(Ed) Criminal

Completely ethical behavior of an information provider is defined as full respect of consumer privacy and of the intended purpose of the invention communications protocol. A completely ethical provider would . . .

never seek to perform covert identification or surveillance of a consumer community. In particular, it would:
  make no efforts to infer from server activity the identity or attributes of any consumer,
  make no efforts to infer from network activity the attributes of any consumer, and
make no efforts to use the Internet as a pure broadcast advertising medium, creating messages which make unsolicited contact with all or a very large number of consumers passively receiving messages.
fully disclose to consumers the existence and purpose of data gathering efforts;
make no efforts to use information so received in ways unrelated to the disclosed purpose of the information gathering effort;
make no efforts to use information gathered from such a questionnaire to correlate with future server or network activity.

Completely ethical behavior is a standard much higher than that obeyed by many actors in the current Internet business community. The Internet business community at the moment contains a wide range of attitudes and behaviors towards consumer privacy. There are many instances of behavior that can be classified as merely ethical, or merely legal.

Merely ethical means that the behavior of inferring user identity or attributes from Internet activity, while providing some sort of notice that privacy compromises are taking place, respects the provider-consumer relationship by not using the information to initiate unwanted contacts with consumers and not sharing the information with other businesses. In effect, merely ethical behavior restricts the use of information gathering to internal research and planning purposes, in much the same way that ethical companies currently use information gathered from product registration cards.

Merely legal means that the behavior of inferring user identity or attributes from Internet activity, provides only minimal notice that some sort of privacy compromise is taking place, and then subsequently makes maximum exploitation of the gathered information under current laws, which includes systematically sharing the information with other businesses and initiating unwanted contacts with consumers. The standard of many Internet based information gathering efforts is at precisely the level of merely legal. Companies which are collecting information about the consumer rely on the Web browser to notify the user that an insecure process is taking place. They do not make any separate notice of their own, explaining what information is being gathered or how it is used.

Privacy Protection

The invention does not allow unsolicited interactions with the outside world. In routine operation, the invention has interactions only with the advice servers to the user has subscribed. Assuming that security problems, such as spoofing and moles are not an issue, the risk of compromising privacy is therefore focused on the interaction between consumer and trusted advice provider. As described below, the invention's communications protocol divides the advisory communications process into the following stages:

(ACP-a) Subscription. The consumer anonymously initiates a subscription.
(ACP-b) Gathering. The consumer's advice reader anonymously gathers advice from the site.
(ACP-c) Evaluation. The consumer's advice reader evaluates advice for relevance.
(ACP-d) Explanation. The consumer's advice reader displays a document authored by the advice provider, explaining why a certain advisory is relevant, and proposing a solution/response.
(ACP-e) Solution/Response. The consumer evaluates the document and, potentially, accepts the proposed solution/response, potentially interacting with the world as a result.

The invention, operating with the AEUP communications protocol, makes steps (ACP-a)-(ACP-d) completely private and localizes the information sharing potential to step (ACP-e).

Operationally, a completely ethical advice provider never seeks to violate the privacy protection of steps (ACP-a)-(ACP-d) of the protocol. In particular, a completely ethical provider never seeks to perform covert identification or surveillance of a consumer community using the invention. There are no efforts to infer from server activity the identity or attributes of any user. There are no efforts to develop tools to infer from network activity the attributes of any user. There are no efforts to use the invention as a pure broadcast advertising medium, creating advisories which make unsolicited contact with all or a very large number of consumers. Any efforts to use the invention to gather information from consumers are based on a questionnaire process at solution time (ACP-e) and come with full prior disclosure to the consumer at explanation time (ACP-d), in easily understandable terms, of the types of information being gathered, of the purposes for which they are being gathered. There are no efforts to use information so received in ways unrelated to the disclosed purpose of the information gathering effort. There are no efforts to use information gathered from such a questionnaire to correlate with future server activity.

In one typical implementation, the invention encourages providers to behave in a completely ethical way. The invention may provide mechanisms to encourage consumer knowledge of the standards of completely ethical behavior and knowledge of the standards kept by individual providers. The invention contains mechanisms to defeat and discourage criminal attacks on privacy and to defeat and discourage unethical behavior.

In a typical implementation, the invention has several mechanisms to promote and enforce completely ethical behavior.

First, by encouraging subscription to trusted advice sites, the system encourages users to be aware of the quality of a site. One important component of quality is ethical quality.

Second, the Better Advice Bureau provides a mechanism to issue advisories warning against unethical sites. The Better Advice Bureau maintains an openly accessible list of objective causes for counter advisories. This list makes it clear to consumers and providers the types of behavior which result in counter advisories. In this way, providers receive guidance about what constitutes unethical behavior. Those providers wishing to preserve public trust act ethically.

Third, the invention may frustrate attempts to violate the privacy intent of the protocol. As described below, all legal threats to the protocol have effective responses from the invention, and a provider must engage in criminal activity to violate the communications protocol.

Privacy and AEUP

The invention uses a protocol (AEUP) for information exchange over open public networks which imposes a much higher standard of information ethics than the current industry standard. In addition, the protocol protects against certain outright criminal behavior.

The goal of AEUP is that:

Information on the machine stays on the machine.

That is, information about the consumer's computer or its environment which has been accessed by invention is not distributed to outside parties without explicit consent. In physical terms, AEUP provides a one way membrane between the consumer computer and the outside world. During unattended operation:

Information flows in, but no information flows out of the consumer computer.

This design constraint is expressed in four principles:

(PRIV-a) The act of subscription does not divulge the user's identity or attributes.

(PRIV-b) The act of gathering advice does not divulge the user's identity or attributes.

(PRIV-c) The act of evaluating relevance does not divulge the user's identity or attributes.

(PRIV-d) The act of passively viewing a relevant advisory does not divulge the user's identity or attributes.

When operated under AEUP, all automatic unattended operation preserves the privacy of the user's identity and attributes. The following discussion describes the ways in which AEUP and the overall invention process enable (PRIV-a)-(PRIV-d).

(PRIV-a) Privacy in the Act of Subscription.

Under AEUP, the information that a certain user is subscribing to a certain advice site is known only to the user and to his advice reader. This requires clarification. In common usage, the word subscription implies a sort of registration process by which a user identifies himself to a provider as a subscriber. Under AEUP, there is no such registration process. There is no need for it. Advice is made freely and anonymously available in the same way that Web sites make Web pages available freely and anonymously. The subscription process is an interaction between the user and the user's own advice reader, not between user and some external advice provider. The advice reader operating on the user's computer obtains from the user the selection of advice sites of interest and stores those on the user's computer only as part of a database maintained locally by the subscription manager component of the advice reader. That database controls the evaluation of advice, causing the advice gatherer to gather advice periodically from some sites and not from others. Subscription is a private matter.

(PRIV-b) Privacy in the Act of Gathering.

Under AEUP, the act of gathering advice does not reveal information that a certain consumer is interested in certain things, or that he has a certain computer configuration.

It may be objected that an advice site can learn about the identity of a subscriber from the fact that the subscriber's advice reader frequently gathers information from the site. However, in typical implementations, the only thing that can be learned from the act of gathering is that a connection to an advice site has been made from a certain IP address. Under current network protocols most consumers have dynamic IP addresses, and so the correlation between IP address and identity is weak, lasting typically a few minutes. Hence, the information in an IP address is generally of little value.

Moreover, consumers with static IP addresses who do not wish to divulge their true IP address may use a proxy server. Proxy servers are a well known tool by which certain IP client-server transactions are replaced by a three-party client-proxy-server interaction, with the proxy requesting data of the server and routing it anonymously to the client. To the server, it appears that the proxy is the client. To the client, it appears that the proxy is the server. There is never any direct contact between the server and client. The server never obtains the identity of the client, i.e. its IP number.

The invention, in one implementation, is configured to offer universal proxy service to all users, and the advice reader offers to the user, as one optional means of connection, the use of such a server. In such an implementation, Better Advice Bureau.org or another central authority offers an anonymous advice gathering server which accepts advice gathering requests from users, strips them of return addresses, routes them to advice sites, and forwards the returned information to the user. This mechanism conceals the IP address of the user.

The act of gathering may be thought to divulge information because the gatherer selects only certain documents from among those available at the advice site. This objection is based on a misunderstanding of AEUP. In a typical implementation, the advice gatherer always accesses all documents available at a certain site, which are not already present on the consumer machine. No selection of any kind is performed at gathering time. Relevance is determined only after all the advice has been gathered and stored on the consumer computer. The only correct inference that can be made from the behavior of the advice gatherer is that the consumer has an ongoing subscription to that site.

This approach is very different from currently popular approaches to obtaining relevant information using Internet. In the currently popular approach, the user fills out a form expressing, for example, preferences, characteristics, and system configurations. This form is sent to the server. The server then responds to the consumer in a focused way, based on the information that was contained in the form. This standard process reveals information about the consumer to the server.

In the invention's approach, the consumer's preferences and configurations are kept confidential on the consumer's machine. All of the advice offered by the site is brought to the consumer machine and is then evaluated for relevance privately.

(PRIV-c) Privacy in the Act of Evaluating Relevance.

The relevance or irrelevance of a given piece of advice can signal a great deal of information about an advice consumer's computer and its environment. A very narrowly focused condition, specifying contents of the user profile, and contents of specific files can, if true, convey a great deal of information about the user.

If the advice reader allows the fact of relevance or irrelevance of an advisory to leak out of the reader to the outside world, it compromises the consumer's privacy. If this happens during unattended operation, the outcome might be very serious because many thousands of advisories are being evaluated for relevance. If there is a mechanism for systematically discovering the relevance of an arbitrary collection of many pieces of advice, a complete profile about the consumer and his environment leaks out.

In a typical implementation, the advice reader's relevance evaluation process has as its only externally observable effect a resulting change in the state of the user interface. The user is notified when a certain piece of advice has become relevant, and that is all. In a typical implementation, the simple fact that something evaluated to relevant causes no activity outside of the user's computer which can be observed by others. There is a possible exception to this when remote inspectors are available. See below.

(PRIV-d)]The Act of Passively Viewing a Relevant Advisory Does Not Divulge the Users Identity or Attributes.

Reading a text file in the privacy of one's own interaction with one's own computer does not offer any breach of privacy. No one in the outside world need know that one has read the file. However, reading a Web page is a different matter. A hole in the one-way privacy membrane maintained by invention is opened by the careless offering of HTML or other hyperlinked media as a valid type of advisory content in the explanatory component of the advisory. The discussion below describes the hole and its consequences, and describes why the invention, in a typical implementation, does not leave this hole open.

Constraints on Solution Operations

The final step in the advice processing chain is the application of a recommended solution operation. Because this operation can be an essentially arbitrary operation, it is not possible for the invention to control the effects of this operation. In particular, the recommended operation includes electronic correspondence with the advice author, divulging identity and attributes. For this reason, there is a design constraint:

(PRIV-e) In typical implementations, the advice reader does not apply recommended solution operators automatically. They may only be applied after user approval.

Because of the wide-open nature of solution operators, the consumer plays an important role in protecting his own privacy. The act of applying a recommended solution operation may divulge the consumer's identity or attributes, whether the consumer knows this or not. An unethical advice author can create mole solution operators which, while claiming to do one sort of operation, could in fact be conducting electronic correspondence covertly, without informing the consumer. The consumer should only agree to apply solution operations which come from authors he trusts to behave in an ethical fashion.

Remote Inspectors: Plugging Leaks

In one implementation, there is a potential violation of the privacy of the relevance evaluation process, based on the assumption that advice reader allows conditional evaluation of and clauses, and the assumption that relevance clauses may refer to conditions which are verified by making queries to other computers and/or other devices remote from the computer on which the advice reader is running. A careless implementation of a remote inspector creates network activity that is observable to the outside world, and from which activity the value of certain relevance clauses is inferred. Inspectors which cause network activity are by no means central to the invention, and this particular privacy threat therefore affects only certain implementations of the invention. (Compare discussion of Covert Channels in Pfleeger, *Security in Computing*)

Consider an eavesdropper who would like to learn about the value of a relevance clause R when evaluated for relevance on a certain advice consumer's machine. Suppose that the eavesdropper operates an advice site which is trusted by the consumer and subscribed to by the advice reader, so the eavesdropper can introduce advice onto the machine. Suppose that the eavesdropper knows that the advice reader contains an inspector which, when invoked via clause I, generates network activity across a piece of the Internet under control of the eavesdropper. For example, suppose that the eavesdropper has system level access to a node of the Internet in a direct path between the consumer machine and a destination machine that is queried as a result of a certain inspector call. The eavesdropper is then in a position to program the IP transport logic at the node under his control to take note of the existence of IP traffic between the consumer and the destination.

In this hypothetical situation, the eavesdropper is in a position to author advice asserting R and I and to publish the advice at his advice site. After this advice is gathered by the consumer machine, it is evaluated automatically for relevance.

In one implementation of the advice reader, the evaluation of a clause A and B stops immediately as soon as A is determined to be false because it is not necessary to know the value of B to finish the evaluation of the phrase. As soon as A is determined to be false, the phrase A and B is known to have the value False. This scheme is referred to as conditional evaluation. There are implementations of the advice reader that do not perform conditional evaluation. These schemes always evaluate all subexpressions of an expression before inferring the value of the expression. The decision to use conditional evaluation in an implementation is based on performance considerations. Advice readers using conditional evaluation typically run faster.

Assuming that the advice reader implements conditional evaluation as described above, then the network activity prompted by the clause I only occurs if the clause R evaluates to True. The eavesdropper is in a position to observe this network activity, and hence to infer that clause R evaluates to True. Information about the consumer has leaked out of the consumer's computer due to the relevance evaluation.

In discussing this hypothetical situation, it should be noted that eavesdropping activity of the sort described constitutes a form of electronic stalking and may be illegal. Such situation requires either that the trusted advice author be himself an eavesdropper, engaging in conspiracy with the eavesdropper, or does not act to prevent unauthorized advice from being injected in his name, for example by signing his advice. The advice consumer may protect himself from this threat by subscribing to trustworthy sites only, i.e. sites meeting the standard of completely ethical behavior.

The advice consumer may also protect himself from this threat by configuring the advice reader to restrict the domain of allowed relevance checking to a domain where he has physical control. In extreme cases, this means limiting relevance to check conditions verifiable only on the machine where the advice reader is running.

There are presently four mechanisms whereby the advice reader can allow network activity and yet protect against this type of eavesdropping.

4. Disallow conditional evaluation of clauses. The advice reader is configured to avoid conditional evaluation. In that event, no information about relevance evaluation is revealed by the existence of observable network activity between consumer and destination.

4. Randomly reorder subexpressions for conditional evaluation. In evaluation of a clause A and B, the parser randomly reduces the clause to the equivalent of (& A B) with probability ½, and to perform (& B A) with probability ½. When this is done, the fact that remote network activity occurs in evaluation of the clause R and I implies that either a fair coin was tossed heads or that a clause R was true. This makes it impossible in a particular instance to determine whether R was actually true for the user in question.

4. Always force evaluation of subexpressions involving network activity. The advice reader is configured so that each inspector has an attribute Remote-Activity which is set in case the inspector causes activity off the machine running the inspector. The advice reader, in parsing a relevance clause, identifies those subexpressions which have attribute Remote-Activity and forces evaluation of those subexpressions.

5. Decouple network activity from relevance evaluation. Inspectors with the attribute Remote-Activity are constrained to work only on cached data, using queued requests, to a prespecified location or collection of locations. This means that an inspector, when receiving a request for an attribute determinable only remotely, can check a local cache. If the answer is found in the cache, it responds with the answer. If the answer is not found in the cache, the request is placed in the queue for future evaluation. Independently, a process runs according to a fixed schedule, e.g. once per day, which communicates with a fixed list of remote machines, and which at that time processes all requests that have been cached in the last day. In this way, relevance evaluation per se causes no network activity outside of regularly scheduled activity.

An appropriate combination of these mechanisms can safeguard the privacy of relevance evaluation, even in the indicated context of criminal eavesdropping.

HTML: Plugging Leaks

The final appearance of a typical modern HTML document is the product of several files rather than a single one. The HTML document itself gives a kind of logical skeleton of the display, and an inventory of the textual component, and a collection of links to various graphics and multimedia files, which provide the visual components. In traditional Web browsing practice, a Web browser constructs the rendered image in a series of stages. First the HTML file is gathered and the skeleton of the document is rendered. If the HTML document refers to remotely located multimedia files, then the Web browser begins to gather those files;. After the files arrive, they are used to format and render the final display.

Suppose that an advice provider has authored an advisory containing an HTML file making references to files located on the advice providers server in its explanatory component. Suppose also that the advice reader behaves as a traditional Web browser in rendering HTML. At the moment that the consumer reads the advisory, the underlying graphics files is gathered from the advice server. In other words, there is noticeable activity at the advice server caused by the fact of reading an advisory. If the advisory is irrelevant, the HTML is not rendered and, because the unrendered HTML never leads to a gathering of the multimedia file, the server can infer from this activity that an advisory evaluated to relevant. This constitutes a leak of information through the one way membrane, back from consumer to provider.

A completely ethical advice provider must not take any notice of this activity. However, a merely ethical advice provider could, in principle, exploit this fact to learn something about the consumer population. Indeed, such an advice provider can author an advisory referred to a special multimedia file, pointed to only by this advisory. Counting the number of references to the multimedia file, and dividing by the number of gathers of the advisory itself, one can obtain an estimate of the fraction of the consumer population which exhibited a certain combination of circumstances.

However the invention, in a typical implementation, takes steps to frustrate this sort of activity. Inducing leaks of this kind is considered less than completely ethical because, combined with other unethical behavior, it can compromise individual privacy. It is true that such leaks have an innocent and useful application. As long as no correlation is made between the information leaking back and individual identity, one could argue that the leak can be made to serve a constructive purpose of informing the advice provider about the user population in general. However, the existence of such a leak creates a temptation to perform such a correlation, which leads to serious privacy abuses.

There is another mechanism available by which the invention offers similar feedback to advice providers while protecting individual privacy, i.e. randomized response. To discourage attempts to exploit leaks caused by HTML, a typical implementation of invention can employ one or all of three mechanisms:

5. HTML-A Proxy server. By working exclusively through a proxy server, the advice reader can destroy all correlation which might otherwise be visible at the advice site between identity of gatherer and fact of gathering. In effect, the advice reader is requesting the multimedia file from the proxy server rather than the original site. In one implementation, the proxy server caches the multimedia file locally and so serves many requests for the multimedia file while only asking for the file once from the advice site. Advice sites may find this arrangement advantageous because it minimizes the load on their own server. In return, they lose the ability to make population attribute prevalence studies, or to make correlation between identity and attributes.

HTML-B Immediately gather all multimedia. In one implementation of the invention, the gathering process includes the automatic downloading of all multimedia files referred to in the HTML of an advisory. This works as follows: A preliminary parsing of the advisory leads to a listing of all multimedia files referred to in the HTML source of the explanatory component of the advisory. The advice gatherer gathers those files immediately, ensuring that if the advisory ever becomes relevant, the file is available locally. For this implementation of invention, there is no connection between the fact that a file was gathered and the possibility that a certain advisory may be relevant.

Mechanisms (HTML-A) and (HTML-B) may be used simultaneously. That is, a proxy server may gather advice on behalf of a client, and also all multimedia files referred to in any HTML source contained within that advice. The consumer advice reader initially gets only the advisory files, and not all the multimedia files. At the proper time, the multimedia files are gathered from the proxy server. In this way, there is again no connection between the fact that a file was gathered and the possibility that a certain advisory may be relevant.

5. HTML-C Download multimedia at random. In one implementation of the invention, the gathering process includes the random downloading of some multimedia files referred to in the HTML of some advisories. This works as follows: A preliminary parsing of the advisory leads to a listing of all multimedia files referred to in the HTML source of the explanatory component of the advisory. The advice gatherer periodically gathers a few randomly selected files from that list. This ensures that, for any advisory that an advice author publishes, a large fraction of the multimedia files are accessed, not for reasons of relevance, but due to outcomes pure chance experiments. Partially, this ensures that among those customers where an advisory becomes relevant, for many of them the file is already available locally. Under this implementation of the invention, there is no logical connection between the fact that a file is gathered and the possibility that a certain advisory is relevant. Whatever connection there may be is probabilistic and could be made rather weak by appropriate choice of the frequency of random downloading.

Support for Privacy Ethics

There are three meta-principles in the invention which help to enforce information ethics.

5. Ethical sites. Consumers should only subscribe to advice sites known to behave in an ethical fashion. Many consumers configure their advice reader to subscribe mainly to advice from large concerns which manufacture goods and services of interest to the consumer. For example, a computer manufacturer, a software publisher, or the provider of Internet service. Subscription to substantial organizations of this type is a reasonably secure practice. Such organizations have an interest in providing trustworthy advice so that they maintain rapport with their consumers. Few risks are posed to advice consumers who subscribe to advice authored by such concerns.

3. Clear definition of ethics. The Better Advice Bureau is a fundamental tool for encouraging ethical behavior of authors. All users subscribe to this site. This site compiles counter advice, informing users about unethical sites and about unethical advice which has been circulating. Better Advice Bureau defines a solution operator as unethical if it involves divulging information to the author without first informing the user that information is to be divulged or without informing the user accurately about the nature of the information that is to be divulged. If pieces of mole advice are circulating which behave unethically, and they come to the attention of Better Advice Bureau.org, it may release counter advisories against them. Hence, the Better Advice Bureau functions in some respects as an privacy protection system for the invention, allowing the correction of unethical situations.

Clear labeling of side effects. To make the definition of ethical behavior clear, and deviation from ethical behavior clear, the Better Advice Bureau describes a set of labels to be attached to advisories, indicating the potential side effects of solution operators. These labels indicate:

The critical subsystems which may be affected by the advisory's proposed solution.

Whether information may be revealed by using the advisory's proposed solution.

What types of information may be so revealed.

If information may be revealed, whether it may be used for marketing/mailing.

If information may be revealed, whether it may be shared with other companies.

Completely ethical behavior demands that advice authors label their advice according to its effects on potential consumers. Better Advice Bureau considers it grounds for a counter advisory if an advisory is mislabeled. Persistent, concerted efforts to misinform are considered by Better Advice Bureau grounds for a site counter subscription advisory.

Alternate Client-server Interactions

A key component of the invention is the synchronization between consumer and provider site images. This happens according to AEUP. However, there are other embodiments of the basic invention in which synchronization is effected by different means. These are described below.

Anonymous Selective Update Protocol

Under this protocol, the act of subscription and the act of synchronization are both anonymous as in the AEUP. However, the update process is selective rather than exhaustive.

ASUP Definition

Under ASUP, each advisory message is abstracted into a short form consisting of at least a message identifier referring to the original advisory, the relevance clause of the original advisory and, potentially, other information, such as a subject line. Under this protocol, the advice server, in addition to directory messages and whole advisory files, also serves to the advice reader the abstracts of one or many advisories.

Under ASUP, the gathering process changes. The advice reader, instead of ensuring that it has the entire body of each advisory of the advice site, ensures that it has at least the abstract for each message. It does this by issuing requests for all the abstracts of all the advisories that are new since the previous synchronization.

Under ASUP, the advice database changes. The database contains two kinds of entries: full advisories, and advisory abstracts.

Under ASUP, the advice reader schedules relevance evaluation for all the relevance clauses it has obtained, both those clauses contained in full advisories and those clauses contained in abstracts.

Under ASUP, a relevant advisory can trigger a new round of contact between advice reader and advice site. Depending on the configuration, the advice reader, either in anticipation of the user wanting the full advisory or after a direct user request, establishes a connection with the advice site, and requests the bodies of certain advisories.

The result of this protocol is that, whereas the consumer's advice reader accesses and evaluates all the published relevance clauses, it does not download all the published advisories.

Analysis of ASUP

This protocol can be advantageous if the published advisories consume considerably more storage than the abstracted advisories. It saves the consumer time in accessing a large body of advisories and saves the provider time in serving requests. A potential drawback of this protocol is the possibility of compromises of consumer privacy. Under the ASUP protocol, it is conceivable that an advice provider attempts to make inferences about the consumer based on observing the advisory files requested and not requested by the advice reader. If the protocol is implemented exactly as described above, the consumer never requests the entire advisory when the clause is not relevant and always request the entire advisory when the clause is relevant. An advice provider whose intent is to learn information about a specific consumer, in principle, correlates server requests for full advisories with IP addresses from which they came, inferring that requests signify the relevance of the corresponding advisory on the corresponding computer. If the IP address is permanently assigned to a certain consumer computer, the provider in principle correlates such requests with consumer identity. In this way, information about the consumer may leak back to the server.

Privacy Protection Under ASUP

Random gathering. The potential for information leaks is reduced by having the advice reader request full advisory bodies for some advisories whose relevance clauses are not relevant. This is done by a randomization mechanism. Each full advisory body is requested with a probability p, where p is a specified number.

Proxy server. The potential for information leaks is reduced by having the advice reader request full advisory bodies via a proxy server, which anonymously forwards advisory body requests to the advice site, and thereby masks to the advice site the identity of the requester. A centralized proxy server, for example located at the Better Advice Bureau or at advisories.com is made available for this purpose.

Proprietary server. The potential for information leaks is reduced by restricting the supply of server software. If the only server software which works with the invention protocol does not to make correlation between consumers and the advisories they request, and also does not log the requests, and if the users of the server software do not attempt to frustrate the intent of the proprietary protocol by eavesdropping on the server-reader transaction, then there is no disclosure of personal information to the server as a result of ASUP.

The supply of server software can be restricted by modifying the reader/server interaction so that a certain security handshake is mandatory. By using digital encryption technology as part of the security handshake and by restricting access to the appropriate security handshake keys, one restricts access to the ability to build server software.

Prohibitions against eavesdropping on client-server interactions can be enforced contractually. Valid server software may be made available only on condition that recipients do not eavesdrop.

Hence there are several avenues to safeguard privacy under ASUP.

NonAnonymous Exhaustive Update Protocol

In certain settings, the concept of anonymous subscription is not workable, for example because advisories are made available only on a for-pay basis, and the reader/server interaction includes a handshake segment in which the reader must qualify himself as a paying customer. A variant on this scenario is in providing advice to members of a club, where members are not in any narrow sense paying for the advice subscription itself, but need to be members to qualify for the advice.

The non-anonymous exhaustive update protocol (NEUP) is applied in a non-anonymous setting where a subscriber exhaustively updates downloading all new advisories at each synchronization. Under NEUP, the consumer's privacy is protected in the following sense: While the fact of the consumer's subscription is known to the provider, the routine act of gathering advice and evaluating relevance does not reveal information about the consumer to the provider.

NonAnonymous Selective Update Protocol

In certain settings, the concept of anonymous subscription is not workable and the use of exhaustive updating is not workable, either because there is a very large body of potentially relevant advisories to consider or each advisory is rather large in size, and very few of the advisories are likely to be relevant, so consumers and providers are not willing to devote extensive resources to exhaustive updating.

The non-anonymous selection update protocol (NSUP) provides this non-anonymous setting where the advice reader selectively updates, obtaining first abstracted advisories, evaluating relevance, and later downloads relevant advisories.

The NSUP by itself gives the consumer no guarantees privacy from the provider. The fact of the consumer's subscription is known to the provider and the routine act of gathering advice and evaluating relevance reveals to the provider which relevance clauses are True. Under NSUP, there are several mechanisms for helping to protect consumer privacy, e.g. randomization, proxy server, and proprietary server.

Alternate Advice Distribution

Centralized Advice Server

In one embodiment, a single centralized site stores the advice offered by many different advice providers, with the different advice sites actually serving as different subdirectories of a single file system. All advice readers operating on consumer computers synchronize their site images by contacting this centralized site and requesting resources, such as advisories, from this site. In practice, the single site actually consists of a collection of computers mirroring each other's functions and contents.

This arrangement has an impact in two areas:

Privacy. This arrangement prevents providers from learning about the identity or about any relevance attributes of any consumers by insulating consumers from providers. In particular, the ASUP protocol is safe in such a setting, provided the central advice site does not log or analyze reader-server transactions.

Security. This arrangement limits advice sites to those satisfying certain standards imposed by the central server management by restricting the supply of advice sites, and thereby ensures that advice sites are run by typically responsible organizations.

The centralized site allows advice providers to update the contents of their sites on the centralized server by use of standard methods, such as FTP or related file transfer methods.

Centralized Proxy Server

In one embodiment, a single centralized site is available to act as a Proxy server for all advice readers. There is a widely distributed base of advice sites. However, many users do not go to those sites individually. Instead, they configure their advice reader to get all advisories via the centralized proxy server. This is particularly true of users concerned about privacy violations.

The centralized proxy server caches the advice offered by many different advice providers. Advice readers on consumer computers request the proxy server to make available resources, such as advisories, from certain advice sites. If those resources are available on the proxy site, they are served immediately to the user. If they are not available, the original site is queried for the resources, which are both forwarded anonymously to the user, and also placed in the proxy site cache. The advice site includes a method to signal the centralized proxy site when the original site is changed, indicating that it is time to flush the cache (see Hallam-Baker, Phillip M. (1996) Notification for Proxy Caches, World-Wide-Web Consortium Technical Report, http://www.w3.org/TR/WD-proxy).

This arrangement addresses consumer privacy concerns. By insulating consumers from providers, this arrangement prevents providers from learning about the identity or about any relevance attributes of any consumers. In particular, even the ASUP protocol is safe in such a setting, provided the central advice site does not log or analyze reader-server transactions.

Centralized Anonymous Advice Remailer

In one embodiment, advice distribution operates by the use of Internet e-mail transport, routed through a centralized remailer by the use of anonymous mailing lists.

The advice site architecture discussed above is maintained. However, there is a widely distributed base of advice sites. Many readers do not contact those sites directly. Instead, they get advice by anonymous mail. In this implementation, advice sites e-mail their new advisories to the central remailer site, which in turn e-mails them to a mailing list which is kept confidential, consisting of individuals who have contacted the central site and established a subscription relationship. In this implementation, there is a new form of advisory specially designed for retraction. Advice sites handle retraction of advice by e-mailing retraction advisories to the central remailer site, which in turn e-mails them to the mailing list.

Under this arrangement, the advice reader cooperates with the e-mail reader on the consumer computer and with the consumer's e-mail reader configured to filter advice automatically into a mailbox designated for advice reader access. The advice reader performs site synchronization, not by contacting the original advice site, but instead by interpreting the contents of the mailbox that have arrived since the previous synchronization.

This approach is particularly suited for working with POP3 Internet mail servers. This arrangement is essentially an implementation of the AEUP protocol using e-mail. Neither the fact that a certain consumer has a subscription nor the fact of a certain advisory is relevant is generally available to the advice provider.

Under this arrangement, the one way membrane that AEUP provides is made particularly clear to consumers. Consumers understand that the advice site need not know that they subscribe to the site and that there is never direct IP traffic between the consumer machine and the advice site. They can see, by inspecting the plain text of the mail, that advisories are not coming to them directly from the advice site, but instead are transferred anonymously to them from the centralized advice remailer.

A potential weak spot in this arrangement is the existence of a secret mailing list whose secrecy is compromised. To inspire consumer confidence, it is best that the centralized remailer is operated by a trusted consumer minded authority.

By insulating consumers from providers, this arrangement prevents providers from learning about the identity or about any relevance attributes of any consumer who participates in this arrangement and who do not choose to disclose anything to the providers voluntarily.

USENET Advice Diffuser

In one embodiment, advice distribution operates via USENET news transport.

The advice site architecture described above is maintained. There is a widely distributed base of advice sites. However, many readers do not contact those sites directly. Instead, they get advice by USENET. In this implementation, a whole collection of USENET newsgroups is created, e.g. one per advice site. The advice site, from time to time, posts new advisories to USENET, which, in turn, cause the new postings to be distributed worldwide to all machines that operate as newsgroup servers.

Under this arrangement, the advice reader then performs site synchronization, not by contacting the original advice site, but instead using USENET protocols to contact a newsgroup server and access new postings in certain newsgroups.

This arrangement is essentially an implementation of the AEUP protocol using USENET. Neither the fact that a certain consumer has a subscription nor the fact of a certain advisory's being relevant is generally available to the advice provider.

Under this arrangement, the one way membrane that AEUP provides is made particularly clear to consumers. Consumers understand that the advice site need not know that they subscribe to the site and that there is never direct IP traffic between the consumer machine and the advice site. In fact, because the act of receiving news via USENET is anonymous, there is not even a mailing list anywhere and so there is no centralized information base linking them to the advice site.

Software Channels

In possible embodiment, advice distribution operates by the use of what are commonly referred to as channels by push providers, such as Backweb, Marimba, and Pointcast (see Ellerman, Castedo (1997) Channel Definition Format, World-Wide-Web Consortium Technical Report, http://www.w3.org/TR/NOTE-CDFsubmit.html). In another embodiment, advice distribution operates by the use of e-mail mailing lists. In either case, the distribution method is referred to as a channel. The logical relationships are the same. Nothing of importance changes below if every occurrence of the word channel is changed to mailing list.

The advice site architecture discussed above is maintained. There is a widely distributed base of advice sites. However, some readers do not contact those sites directly. Instead, they receive advisories through channels. In this implementation, a whole collection of channels is created, perhaps one per advice site. The advice site from time to time pushes new advisories to its channel which, in turn, causes the new offerings to be distributed worldwide to all machines that subscribe to that channel.

Under this arrangement, the advice reader perform site synchronization by listening for incoming data on the channel, and processing the incoming advisories as they arrive.

This arrangement is essentially an implementation of the NEUP protocol. Under some implementations of channels, the fact that a user has a subscription is known to the content provider. Typically, the fact a certain advisory is relevant is generally unavailable to the advice provider.

Under this arrangement, the one way membrane that AEUP provides is made particularly clear to consumers, if channel providers offer truly one-way channels and explain this to consumers. For example, mailing lists are well understood by consumers to offer what is typically a one-way communication. Consumers understand that communication only becomes two-way when the consumer wishes to initiate contacts in the other direction.

Alternate Mechanisms to Promote Consumer Trust

So far it has been assumed that the primary concerns that a consumer might have about privacy must be solved technologically. The viewpoint has been that it is only possible to protect consumer privacy by developing a system which renders it literally impossible for advice providers to make valid inferences about the relevance of certain advisories to specific consumers. It is an important achievement to be able to insulate consumers in this way. However, this insulation comes at the cost of certain constraints. In addition, some consumers may not be able to accept that there exists a purely technological solution to the privacy problem, and those consumers may suspect that any technological solution inevitably has failings, i.e. leaks from time to time. Such consumers worry about what happens if a leak occurs, and are not persuaded by technologist's assurances that no leaks can occur. Such consumers might be more reassured by explicit pledges on the part of advice providers that leaks would not be exploited by the providers.

A way to address consumer concerns about advice provider intentions is to restrict the population of advice providers to just those providers who have signed and who are fulfilling a contract to behave in ways which offer consumers guarantees. This has three components:

Ethical Standards. A fundamental document is made available providing a well known definition of ethical behavior. Certain advice providers have signed this document and deposited it with a central authority, such as Better Advice Bureau, which publishes the identities of signers.

User Interface. Users are given an option to restrict interactions just to providers who are known to follow the ethical standards.

Restriction of Server Privileges. The reader/server interaction is protected by a proprietary handshake mechanism, and access to the appropriate reader/server handshaking secret codes is licensed only to those who have signed the agreement on ethics. There are two natural ways this is done:

By a centralized server strategy, in which advice readers have their functioning restricted by a handshaking mechanism so that they can only interact with a centralized advice server, serving advice only from those sites known to be obligated to follow ethical standards and known to be in compliance.

Following a proprietary server strategy, in which advice readers can only interact with advice servers having the appropriate handshake, and the handshake is known only to servers at ethically bound advice sites.

In summary, there are some providers who have signed an agreement making a contractual guarantee of privacy to customers. There are some consumers who want to deal only with such providers, and there is a technological mechanism to restrict advice reader access to those providers.

Alternate Relevance Evaluation Models

The General Picture: State Comparison

In effect, a relevance clause is an assertion about the state of a computer or of its environment or of the state and environment of computational devices reachable from the computer. The relevance language provides a way for an author to describe components of the state of a computer. However, there are other ways that components of the state could be described.

The advice reader and the associated inspector libraries give a way to compare a description of the state with the actual state. However, there are other ways that components of the state could be compared with a description.

Community of Watchers

An alternate method of state description might rely on a community of watchers, i.e. specialized applications, each potentially with its own unique concerns and architecture, which can analyze specific assertions about the computer or its environment. Such an application is referred to as a watcher.

Consider a file watcher application that watches to see if certain files had appropriate attributes. This application maintains a database of assertions. Each entry names a file or directory, a list of the specified attributes of the object, a specified watching frequency, and a pointer to a message and action associated with failure of the assertion. Examples of specifiable attributes include existence, name, version, size, and checksum. The file system watcher, running continually, at scheduled times, or under user control, goes through its database of assertions and checks that each entry has the asserted status, e.g. each file has the specified attributes. If it finds an entry that does not have the required status, then it passes information about the failure of the assertion, along with the message and actions associated with the assertion, to a user interface module. The user interface module, a part of the watcher application, and an application used in common across the whole system, presents to the user information about failure of the asserted condition and relays the associated message and recommended response.

A file watcher application also interprets messages making new assertions about the state, or revokes old assertions. The receipt of such a message causes the file watcher to update its database of assertions to include entries making the new assertions or to delete entries making the revoked assertions. The file watcher itself receives these messages from a messaging module, which is part of the watcher application or an application used in common across the whole system.

A remote author who wants to assert conditions about the consumer computer authors messages intended for the file watcher application according to a published file watcher assertion specifier. This is a database entry homologous to the entries in the database kept by the file watcher, or a textual description of an entry, using a keyword language or other humanly interpretable descriptive device. Such a specifier is packaged for transport across networks or by other digital transfer mechanism. Such a package is distributed to consumer machines by any of the methods enumerated so far, i.e. AEUP, ASUP, NEUP, NSUP, e-mail, or channels.

Some potential advantages of this approach include:

5. Specialization yielding efficiency. A watcher, because it is specialized, is written to optimize the speed at completing a specialized set of tasks. For example, if a file system watcher has to watch several files in the same directory, it is to do so while making only one directory structure access rather than several, thereby saving disk operations. It is possible to avoid certain operations if it is known what the outcome is based on certain earlier operations. If several different assertions must be tested about the same file, it is possible to make a single file access to get the information about all of them simultaneously. In addition, if the watcher accepts instructions in a predefined format that avoids the need for parsing, it can evaluate assertions more quickly.

5. Specialization yielding expressiveness. A watcher, because it is specialized, is written to use a very convenient mode of describing a specialized set of tasks. For example, if a file system watcher accepted expressions in a language, that language is designed to incorporate well proven useful idioms from other systems. Thus, in UNIX, wild cards *, [a–z], ? and related constructs are useful in efficiently describing properties of file systems, for example, in referring to a large collection of files with similar but not identical names. A file system watcher makes use of such a specialized idiom without impacting the design of the interfaces of other watchers in the community of watchers.

5. Specialized scheduling algorithms. A watcher, because it is specialized, is written to schedule execution of the specialized task set that it addresses appropriately. For example, a file system watcher operating in continuous watch mode follows a specialized scheduling algorithm which is different from the algorithm used for a system settings watcher. In certain operating systems, for example, the file system itself maintains information about whether files or directories changed, which is used to defer evaluation of assertions because it is known that the state of the assertions has not changed since the previous evaluation.

6. Specialization yielding security and privacy. A watcher, because it is specialized, is written to block certain dangerous or revealing assertions. For example, a file system watcher has various user configurable security and privacy settings, enabling the user to control the access to certain files or elements within files.

The collection of watchers is large. In addition to file system watchers and system settings watchers, files such as serial device watchers, printer watchers, and network watchers are provided.

Community of Watchers is the Same Invention

The community of watchers approach is a variation on the invention. There are two ways to understand this point.

6. As an implementation layer. Notice that in the invention, the inspector libraries have their actual implementations carried out by variations of such specific watchers. For example, a file system watcher is built to watch various characteristics of various files. This is then exploited by the advice reader, as follows: File related method dispatches in the advice reader are implemented as queries to the file system watcher. The file system watcher answers each query and records the query in its database of assertions. The next time the same dispatch occurs, the file system watcher uses its specialized caching, scheduling, and optimizations to get the answer more cheaply, where feasible. In this way, the community of watchers is an implementation layer for inspectors and the user interface/messaging software of the community of watchers is the advice reader software.

As a variant implementation. Another way to see that the community of watchers is a related invention is to notice that the features which seem most attractive about the watcher approach, such as enabling specialized idioms for specialized tasks, are provided under both approaches. The UNIX patterning idioms are implemented by creating a named property of World referred to as located files which accepts UNIX-style patterns as the name-specifier string. The fragment:

not exists Located files "*.mat" whose(creator of it is creator "MATLAB")

which asks for a file in UNIX notation is provided within the invention's language through an inspector for the plural property located files UNIX-pattern.

Forest of Concerns as an Optimization Strategy

The community of watchers approach to state description articulates the concept of forest of concerns. Each interested author formulates a concern about the state of the consumer computer, these concerns are relayed to the computer, and the state of the computer is continually reviewed and compared with those concerns.

From an efficiency and scheduling viewpoint, it is good to organize the process of state description around the concept of a forest of elementary concerns rather than around the concept of relevance clauses. Many pieces of advice may have as subclauses the exact same phrase, and it is inefficient to evaluate those subclauses independently. For example, consider a pool of five pieces of advice with relevance clauses making assertions about the directory Adobe Photoshop. The first is:

exists Folder "Brushes and Patterns" of Folder containing Application "Adobe Photoshop 2.5"

The second is:

exists Folder "Calibration" of Folder containing Application "Adobe Photoshop 2.5"

The third is:

exists Folder "Color Palettes" of Folder containing Application "Adobe Photoshop 2.5"

The fourth is:

exists Folder "Plug-ins" of Folder containing Application "Adobe Photoshop 2.5"

The fifth is:

exists Folder "Third-Party Filters" of Folder containing Application "Adobe Photoshop 2.5"

In each case, evaluation of the relevance clause requires the evaluation of the phrase folder containing Application "Adobe Photoshop 2.5". In short, these five clauses do the same work five times.

It is possible to organize things differently, with the surface expressions being analyzed into a minimal collection of subexpressions. The collection of these subclauses are then watched in nonredundant fashion. More concretely, a pool of relevance clauses scheduled for joint evaluation is parsed into its forest of associated expression trees. This collection of trees is analyzed into its maximal subtrees. Two subtrees are equivalent if they are literally the same, i.e. the same method dispatches are applied to the same arguments, or are rearranged under valid applications of commutativity and associativity to be the same. An expression subtree is the child of another subtree if the associated expression occurs as a first level subexpression of the other associated expression.

A subtree is maximal if either:

(a) it has no parents, or (b) if it has at least two parents and the parents are inequivalent expressions.

The following illustrates the concept with the pool of five relevance clauses illustrated above. The first parses into:

```
(exists (Folder "Brushes and Patterns"
        (Folder-Containing
            (Application "Adobe Photoshop 2.5")
        )
    )
)
The second into:
(exists (Folder "Calibration"
        (Folder-Containing
            (Application "Adobe Photoshop 2.5")
        )
    )
)
The third into:
(exists (Folder "Color Palettes"
        (Folder-Containing
            (Application "Adobe Photoshop 2.5")
        )
    )
)
The fourth into:
(exists (Folder "Plug-Ins"
        (Folder-Containing
            (Application "Adobe Photoshop 2.5")
        )
    )
)
The fifth into:
(exists (Folder "Third-Party Filters"
        (Folder-Containing
            (Application "Adobe Photoshop 2.5")
        )
    )
)
```

Here, the five different relevance clauses are inequivalent because they name different properties. The collection of maximal expressions consists of these five expressions, plus one proper subexpression:

(Folder-Containing (Application "Adobe Photoshop 2.5")
)

A watcher organized around the maximal expressions operate in a nonredundant fashion as follows:
6. Parse all expressions in a collection of relevance clauses into expression trees.
6. Identify with unique labels those maximal subexpressions which have parents.
4. Transform each expression tree into a new tree built from references to its labeled maximal subexpressions.

When evaluating relevance, maintain extra storage, referred to as maximal-subexpression value storage, which records the value of maximal subexpressions for later use. When encountering a reference to a labeled maximal subexpression, first check this storage to see if a value is already recorded. If so, use the stored value. If not, evaluate the subexpression, recording the resulting value in the storage.

In more detail, this works as follows: For the pool of five relevance clauses above, the maximal subexpression:

(Folder-Containing (Application "Adobe Photoshop 2.5")
)

is associated with position one in maximal-subexpression storage. Transform a typical relevance clause by making appropriate references to this storage. In the case of the first of the relevance clauses this works as follows:

```
(exists (Folder "Brushes and Patterns"
        (Maximal-Subexpression 1
           (quote (Folder-Containing
                  (Application "Adobe Photoshop 2.5")
                  )
              )
           )
        )
     )
```

In summary, a wrapper referred to as Maximal-Subexpression is inserted around the identified maximal subexpression. This wrapper method has a first argument which associates the subexpression to storage index one, and a second argument which is a quoted-expression. This quoted expression is not evaluated prior to the invocation of the wrapper method. Instead it is parsed into an appropriate representation as an unevaluated data structure representing an expression for conditional evaluation which is to be passed to the wrapper method as data. The wrapper method looks at location one to see if a value is stored there. If so, the wrapper method returns that value. If not, the wrapper method asks to evaluate the subexpression which it has been passed. Upon completion of the evaluation, it stores the value in location one of the maximal-subexpression storage.

Suppose that this relevance clause is the first evaluated subexpression in a given advice pool, evaluation of which results in evaluation of the subexpression and recording of the value of the subexpression in position one of the maximal-subexpression storage.

Now consider the second item in the pool, in its transformed form:

```
(exists (Folder "Calibration"
       (Maximal-Subexpression 1
          (quote (Folder-Containing
```

-continued

```
                 (Application "Adobe Photoshop 2.5")
                 )
              )
           )
        )
     )
```

Suppose this clause is evaluated after the previous clause. There is no evaluation of the maximal subexpression because the wrapper finds that the subexpressions value is already recorded in storage.

It remains to discuss how one can identify maximal subexpressions in a forest of expression trees. This is obtained by a tree/forest pruning algorithm. Define as a terminal form any method invocation which does not depend on any other method evaluations for its value. Formally, it is either a named property of World (Application "Adobe Photoshop 2.5"), an unnamed property of World (System-Folder), or a constant (string "xxxx"), (integer 1234).

The algorithm begins by scanning a pool of relevance clauses for all unique terminal forms. It associates to each unique terminal form a list of pointers to all locations in the pool where that form occurs.

The algorithm initializes a database of working subexpression forms as the collection of all terminal forms, i.e. to begin with, the working subexpression forms are the terminal subexpression forms. These are marked for evaluation at the next stage.

The algorithm proceeds in stages, each stage transforming the working subexpression forms to a collection of parent forms. The algorithm stops when the working database is empty. At a given stage, it iterates through the collection of all working forms. For each form in the working collection marked for study at this stage, it considers the collection of all parent expressions of that expression. This is available because associated with a form is a list of pointers to its occurrences in the pool.

Among those parent method invocations, it identifies the unique forms, i.e. the unique combinations of method name and method arguments which have the given subexpression as a first level subexpression. These unique invocation patterns are referred to as parent forms. If there are no parent forms, the subexpression is deleted from the working database. If there is exactly one parent form, the subexpression is replaced in the working database by its parent form, the parent form being marked for processing only at the next stage, and the pointers to the occurrences of the parent form being properly calculated, using the previously available pointers to the children occurrences.

If there is more than one parent form, then a new maximal form is recognized. It is assigned a maximal-form ID number, and a wrapper transformation is made on each expression that references the form. That is, in all those expressions where the form occurs, a wrapper is inserted around the form according to the recipe:

(Maximal-Subexpression $ID# (quote $$))

where ID# is replaced by the ID number of the identified maximal-form, $$ refers to the occurrence of the maximal-form itself, and the (quote) form is the means of preventing immediate evaluation, as described above.

The working forms database is then expanded to include each unique parent form of the recognized maximal-form, with the newly added items marked for evaluation at the following stage, and with a list of pointers to the occurrences of each parent form in the advice pool.

At the conclusion of this algorithm, there is a collection of transformed expressions in which maximal common subexpressions have been identified and where only nonredundant evaluation is performed.

The reader may wish to verify that the algorithm produces exactly the desired result on the pool of five relevance clauses indicated earlier.

Alternates to Binary Relevance Determination

The invention contemplates a situation where messages arrive and computations are performed to evaluate certain assertions with the general goal of notifying the user about certain associated messages, where the timing, format, and other attributes of the notification, including the decision to notify or not, are influenced by the results of the specified computations. The broader notion of influencing relevance appraisal may be implemented by a slight variation on the system described above.

The invention, in one embodiment, obtains appraisals of relevance according to non-binary criteria. A well formed phrase in the relevance language results in numerical values rather than Boolean values. Boolean True is viewed as equivalent to the numerical value 1.0, and the Boolean False as equivalent to the numerical value 0.0. Suppose that certain clauses in a body of advice yield Boolean values, but other clauses yield numbers taking values between 0 and 1. A value between 0 and 1 is interpreted as indicating a degree of relevance that lies intermediate between certain relevance and certain irrelevance. In one embodiment, the user interface presents to the user advisories graded according to degree of relevance, with those having value 1.0 at the top of the list and those having value 0.0 at the bottom. This type of variation, extending Boolean to Real, is well known under the name fuzzy logic.

In a different embodiment, the outcome of relevance determination is a categorical label. In this embodiment, True and False are two labels, and the user interface is keyed to display messages labeled True. However, there are labels, such as Attractive Offer or Chronic Household Situation Needing Eventual Attention. Such labels result from evaluation of relevance clauses and, depending upon the user interface attached to the invention, such labels lead to different methods of notification or different methods of presentation than other kinds of labels. The implementation of a centralized coordination authority such as advisories.com offers a mechanism for publication and coordination of such labels. The implementation of user side filtering allows the user to associate means of notification to various labels, which means include the possibility of no notification.

In one embodiment of the invention, a layer of extra analysis is inserted between relevance appraisal and user interface. Thus, the result of relevance computation may be filtered based on user preferences and on observation of the user. Thus, the relevance computation, rather than determining uniquely the notification status of messages, influences the notification process. For example, a user side filtering method (see above) whereby a user suppresses the display of certain messages which are nominally relevant may be implemented. In one embodiment, such censoring mechanisms are applied automatically. An advice reader or other application contains a module to observe user behavior and make inferences about user preferences which can drive such censoring mechanisms. Similarly, in one embodiment, prioritization mechanisms are applied automatically. An advice reader or other application contains a module to observe user behavior and make inferences about user priorities, so that among relevant messages those which are more likely to be of interest to the user are displayed earlier or more prominently.

Alternate Message Formats

Alternate to MIME Wrappers

The disclosed preferred embodiment uses MIME, a well known Internet standard, as a means of packaging advisories for transport across the Internet and other digital transport media.

Another well known means for packaging textual information for remote interpretation is the XML language. This language also makes possible hierarchical messaging, and is able to accommodate message components of the types enumerated above.

There are many implementations of the basic arrangement disclosed herein. Whether using well known protocols such as MIME and XML or proprietary protocols, they constitute implementations of the invention.

Substitutes for Three-part Messaging

The invention is discussed in terms of a three-part message, containing humanly interpretable information, a relevance clause, and computer interpretable information. These three logically connected components need not be packaged in the same physical message. There needs to be only an association between these parts. For example, the ASUP protocol sends abstracts containing only message identifiers and the relevance clause separately from the message body, consisting of explanatory content, software, and references. Under ASUP, relevance evaluation drives a second reader-server interaction, where the associated message body is obtained. In other implementations, an even looser association between relevance clause and content is maintained, where a relevant result initiates exploration of a whole sequence of messages.

Substitutes for Relevance Language

The relevance language is a convenient means of describing the state of a consumer computer and its environment. However, other languages can be modified into forms which enable computed-relevance messaging.

JAVA Model

The JAVA programming language is a well known and widely available tool for specifying computations.

In one embodiment of the invention, the role of the relevance language is played using software tools implemented in the JAVA programming language. Owing to the popularity of JAVA this might find wide acceptance among software developers and other computer professionals.

In the currently understood best method of developing this implementation, a special variant of JAVA, RELEVANCE-JAVA is developed, with its own specialized resources and evaluated by a specialized variant of the JAVA machine. The intent of this special version is to provide some of the same privacy and security characteristics as the relevance language described earlier. RELEVANCE-JAVA supplies three specific features which make it very useful:

Specialized inspector libraries. Special JAVA objects and classes developed to enable the determination of properties of the consumer computer. These inspect file system, system settings, and related properties of the computer and its environment. This is effected by turning on certain features in the JAVA virtual machine which enable access of machine characteristics.

Privacy Restrictions. While RELEVANCE-JAVA is able to learn a great deal about the user machine, it does not have the ability to transmit any gathered information back to the author. This is effected by limiting the installed objects and classes and turning off certain features in the JAVA virtual machine.

Security Restrictions. While RELEVANCE-JAVA is able to learn a great deal about the user machine, it does not have the ability to modify the machine, i.e. to modify files and to affect the system settings.

The three part messaging model described above is conducted as follows: One part consists of humanly interpretable explanatory content; one part consists of RELEVANCE-JAVA code specifying conditions under which a message becomes relevant on certain consumer machines; and one part of computer interpretable code, perhaps in a different dialect of JAVA, able to cause effects on the consumer machine after consumer approval.

Visual Basic Model

The Visual Basic programming language is a well known and widely available tool for specifying computations.

In one embodiment of the invention, the role of the relevance language is played using software tools implemented in the Visual Basic programming language. Owing to the popularity of Visual Basic this finds wide acceptance among software developers and other computer professionals.

In the currently understood best method of developing this implementation, a special variant of Visual Basic, RELEVANT-BASIC is developed with its own specialized resources and evaluated by a specialized variant of the Basic interpreter. The intent of this special version is to provide some of the same privacy and security characteristics as the relevance language described earlier. RELEVANT-BASIC supplies three specific features which make it very useful:

Specialized inspector libraries. Special Visual Basic functions and data types are developed to enable the determination of properties of the consumer computer. These have the ability to inspect file system, system settings, and related properties of the computer and its environment.

Privacy Restrictions. While RELEVANT-BASIC is able to learn a great deal about the user machine, it does not have the ability to transmit any gathered information back to the author. This is effected by limiting the installed objects and classes and turning off certain features in the BASIC interpreter.

Security Restrictions. While RELEVANT-BASIC is able to learn a great deal about the user machine, it does not have the ability to modify the machine, i.e. to modify files and to affect the system settings.

The three part messaging model is conducted as follows: One part consists of humanly interpretable explanatory content; one part consists of RELEVANT-BASIC code specifying conditions under which a message becomes relevant on certain consumer machines; and one part of computer interpretable code, perhaps in a different dialect of Visual Basic, able to cause effects on the consumer machine after consumer approval.

UNIX Model

The UNIX Shell, in its variant implementations, may be viewed as a scripting language, a well known and widely available tool for examining properties of a file system and specifying computations.

In one embodiment of the invention, the role assigned to the relevance language is instead played by software tools implemented in the UNIX shell and associated UNIX Tools. Owing to the popularity of UNIX in its variant forms, this might find wide acceptance among software developers and other computer professionals.

In the currently understood best method of developing this implementation, a special variant of the UNIX Shell, RELEVANT-Shell is developed with its own specialized resources and evaluated by a specialized variant of the Shell interpreter. The intent of this special version is to provide some of the same privacy and security characteristics as the relevance language described earlier. RELEVANT-Shell supplies three specific features which make it useful:

Specialized inspector Applications. Special applications are developed to enable the determination of properties of the consumer computer. These have the ability to inspect file system, system settings, and related properties of the computer and its environment. These are known to RELEVANT-Shell.

Privacy Restrictions. While RELEVANT-Shell is able to learn about the user machine, it does not have the ability to transmit any gathered information back to the author. This is effected by disabling access to certain communications and networking features in the shell interpreter.

Security Restrictions. While the applications reachable through RELEVANT-Shell are able to learn about the user machine, they do not have the ability to modify the machine, i.e. to modify files and to affect the system settings, except through standard mechanisms, such as creating temporary files in standard locations such as tmp and subject to resource metering.

The three part messaging model is conducted as follows: One part consists of humanly interpretable explanatory content; one part consists of RELEVANT-Shell code specifying conditions under which a message becomes relevant on certain consumer machines; and one part of computer-interpretable code, perhaps in a different dialect of Shell or other UNIX-interpretable code, able to cause effects on the consumer machine after consumer approval.

Alternate State Description

The possibility of alternate methods of describing the state of the consumer computer is described above. It is possible to describe the state without using an overall relevance language if one has available a community of watchers, each with their own peculiar interfaces. The relevance language is then replaced by whatever means of expression by which the said application modules are invoked and controlled.

Relevance-mediated Processes

The description of the invention has taken the stance that the purpose of relevance evaluation is to mediate the decision to notify a consumer about the existence of a message. To that end, the advice reader application functions as a messaging center, and advisories play a role analogous to messages in e-mail, USENET news, and other messaging modalities, in that they are read by the user as part of a user defined schedule. In this viewpoint, the user is a manager of his computer, his property, and his affiliations, and he reads advice which helps him with his concerns in that managerial role.

However, there are other non-managerial settings in which relevance can drive the presentation of information to a consumer as an integral part of certain other processes in which the consumer is engaged.

Guidance. The consumer is the user of a computer applications program, and relevance based messaging provides guidance to the consumer at the moment before performing a certain action or at the moment after performing a certain action.

Composition. The consumer is reading a document using a display application on the computer, and relevance based content adaptation shapes the document so that the humanly interpretable message targets directly the characteristics of the reader.

In fact, all such applications are embodiments of the invention. Computed relevance messaging is of value much more broadly than in the managerial mode described above.

Relevance-guided Computer Interaction

The following is an example showing how an advisory is used to guide a user in the operation of a piece of software.

Consider the following problem: A certain dangerous e-mail message has been obtaining wide distribution. When received by a user with the e-mail program Eudora 4.0, the user sees an innocent looking mail message including an attachment with an invitation to the user to open the attachment. The attachment is actually a maliciously prepared document which, if opened, can cause damage to the user's computer.

The discussion below describes one implementation of relevance based messaging which helps to deal effectively with this situation. Under that implementation, an author writes an advisory which is evaluated for relevance before a user of Eudora opens an attachment. The relevance clause inspects various attributes of the contemplated action and precisely targets an attempt to open an attachment with certain attributes. The advisory then returns text to the mail application which the mail application displays to the user.

In one embodiment, the desired effect may be produced using an inter-application communication framework as follows:

The mail reader application has a special collection of relevance evaluation events, i.e. predefined events which are well known to authors of advisories.

Whenever one of these events occurs, the mail reader notifies the advice reader of the event via a standard event notification protocol.

The advice reader maintains event pools, i.e. advisories intended for evaluation upon receiving notice of certain events.

The advice reader evaluates the advisories in an event pool upon receiving notice of the corresponding event.

The advice reader notifies the user of a relevant message by either:

Notifying the user of the application directly, employing standard user interface devices of the advice reader; or Sending the relevant messages to the mail reader. The mail reader then displays those messages for the user, according to the user interface standards of that application.

The choice between these methods of notification is made under the control of user preferences, author preferences, or application defaults.

This event-driven framework is particularly powerful when:

The application sending an event signal includes descriptive information about the event. In the mail reader context, the event Eudora About to Open Attachment is accompanied by information about the sender of the mail, information about the name of the attachment file, information about the sender of the mail, and information about attributes of the attachment file.

The advice reader contains an inspector library which refers to properties furnished by the application, e.g. mail sender and file name.

In this context, if someone wants to warn every user receiving mail from king@athens.gr with an attachment named trojan.txt that he should not open the attachment, it is possible to author a relevance clause targeting the advisory to those people about to open such an attachment. The routing of advisories to advice event pools is handled through the header line mechanism of MIME and the message line variations discussed above. A simple header line of the form advice-event-pool:, followed by the name of a predefined advice event, indicates the desired routing.

Relevance-adapted Communication

Figure 19:
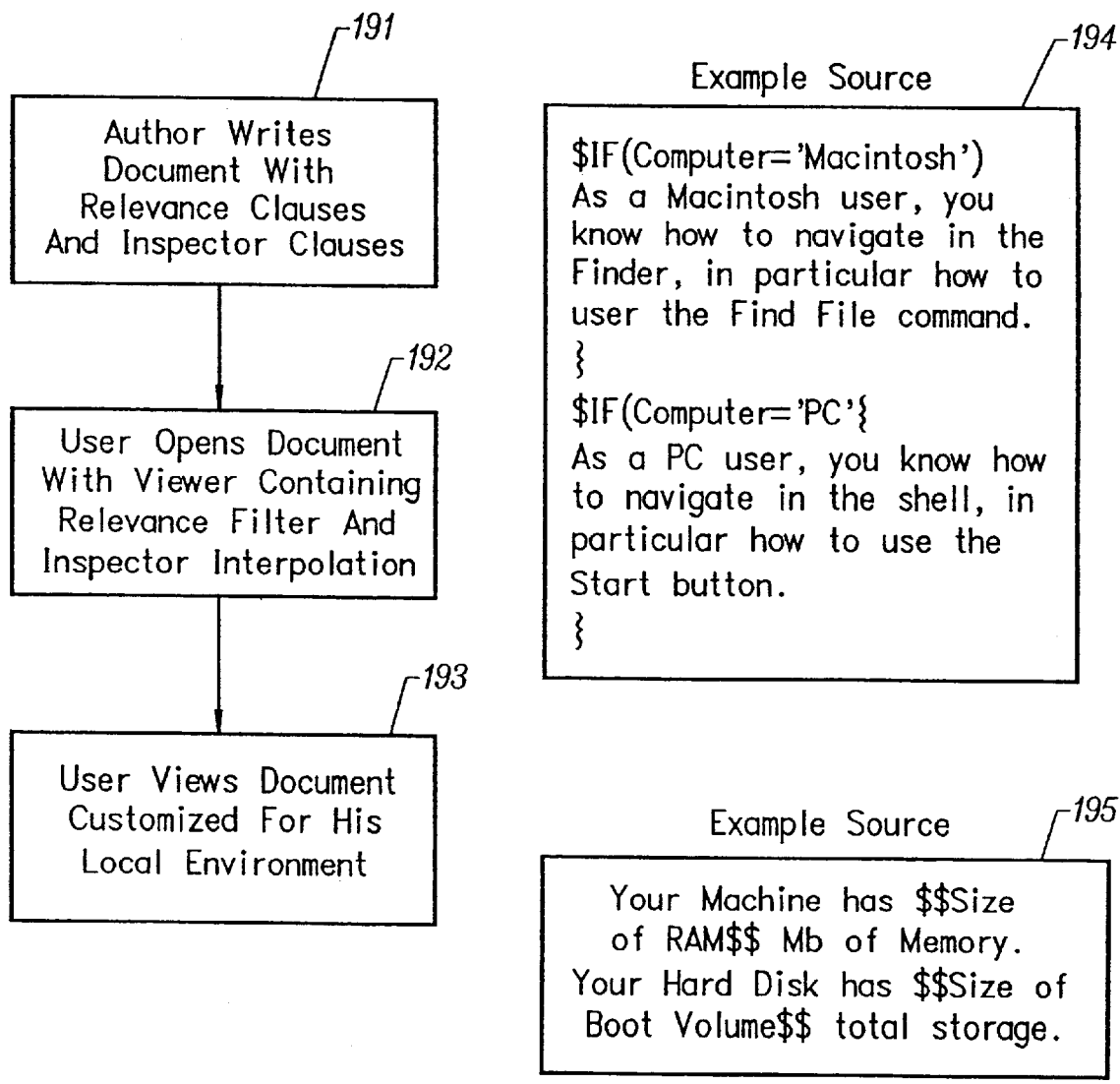
FIG. 19 is a flow diagram showing a relevance-adapted document according to the invention.

The following is an example showing how relevance is used to customize the distribution of a body of information (see FIG. 19):

Consider the following problem: A certain publisher wants to create an electronic document whose content is tailored to the reader, for example because it consists of advertising which is more suitable for some readers than others, or because it consists of technical information which is more suitable for some readers than others. However, an ideal customization requires intimate knowledge of the configuration and details of the consumer's preferences, possessions, and affiliations, information which is not likely to be made available by consumers.

The discussion below describes an implementation of a system using the relevance evaluation components of invention. This implementation allows the publisher to create relevance adapted documents, allowing solution of the problem. The publication is distributed as a digital document containing embedded within it references to many possible variations in content. The selection among possible variants is driven by relevance clauses. The components of the document that actually appear on the users display are those which are selected based on intimate knowledge of the characteristics of the user.

The following is one implementation of such a system: A certain base document processing target format is chosen. Suppose for concreteness this is HTML. A special source format is then defined, consisting of documents. In the present context, this is referred to as PRE-HTML. This source format 194 offers the possibility of arranging many hierarchically nested fragments of modified HTML in a linear order. Each component of such an arrangement is protected by one or more relevance clauses. The components of the source format differ from HTML in that they also offer embedded include expressions from the relevance language.

The advisory author writes the document with relevance clauses and inspector clauses 191. To create a custom document for a specific user, the source format document is transported to the user computer 192, and the document in source format is compiled into a custom target format document 195. The target format document is then processed by the intended target document processing system, producing a display of a customized document 193.

The compilation step is the step where the customization occurs and bears closer examination. As the source document is processed, various components are encountered. Those which are protected by relevance clauses which evaluate to False or at any rate not to True are discarded. They do not appear in the final target format file. Those which are protected by relevance clauses which evaluate to True are retained. They do appear in the final target format file. Each retained component is processed before placement in the target document file. If any include expressions are identified in the file, then those expressions are evaluated, and the results are interpolated into the target document file.

This solves the problem of customized document preparation because the relevance language enables the provider to prepare documents which are customized as if the author had access to detailed intimate knowledge of properties of the consumer's computer and environment, but it does so without the need for the consumer to reveal that intimate information to the provider.

This embodiment of the invention posits a provider with information which is presented to various consumers in precisely defined circumstances, and it uses the relevance guarded messaging model described above. Here, the gatherer, the watcher, and the notifier have different structure than they do in the invention as described above, but at an abstract level their functions are similar. For example, the tool which compiles a source format document into a target format document plays the role of both watcher and notifier in the five-part model discussed above, while the target document processing system plays the role of user interface for the notifier. The role of gatherer is played by whatever system or systems bring the source format document into the consumer environment.

There are privacy considerations in this sort of customized documentation. The use of HTML as a target language, for example, means that there is a possibility of leaks.

Other implementations of relevance driven document customization are possible. For example, one could develop a system in which the source document is not compiled once and for all into a target document in a well known format but, rather the source document is structured for interactive interpretation. The following is an example: A source document consists of many pages of PRE-HTML. Embedded in the source document are conditional compilation blocks protected by relevance clauses, and include expression substitutions using the relevance clauses, as described before. As the viewer goes through the document from page to page, each page is compiled from PRE-HTML to HTML and displayed as needed. Under this model, the user's path through the document is determined only at run time. For example, certain links in the document are relevance protected. The relevance expressions refer to attributes of the environment that are changing as the reader progresses through the document, i.e. they are changing because the reader is progressing through the document. For example, a reader is prompted for information as part of his reading of the document and, as a result of the prompt, a site profile variable changes, causing pages visited later in the reading to change as a result.

Remote Access to Personal Information

The invention makes it possible for an advisory author to target situations based on an arbitrary combination of computationally verifiable conditions of the consumer computer and its environment. This environment may include data which may be of a personal nature. To the extent that certain kinds of personal data may be widely assumed to exist in a standard format on a substantial population of personal computers this creates the possibility of the invention being used to advise a substantial population of individuals on issues of a personal nature. Natural applications areas include:

Personal Finance: If information about individual financial assets is assumed to exist on the consumer computer or in its environment in a standard format on a large collection of consumer computers, then advice authors can provide a large body of individuals timely and relevant advice about their bank account management or about their investment portfolio.

Personal Health Issues: If information about individual medical records is assumed to exist on the consumer computer or in its environment in a standard format on a large collection of consumer computers, then advice authors can provide a large body of individuals timely and relevant advice about drug interactions, or about interactions between genetic or blood type information and drugs.

This creates an unprecedented opportunity, i.e. the ability to offer highly targeted advice without compromising individual privacy. Although the advice author is authoring detailed assertions about the finances or health of the consumer, and although it requires intimate knowledge of sensitive personal information to evaluate those assertions, the system itself is not revealing this information back to the author. The consumer may, in some circumstances, choose to reveal such information after reading a relevant advisory.

Such applications are limited by the need for consumers to capture and maintain accurate data in a standard format about items which concern the consumers and which are accessible in a means well known to advice providers. It would be highly desirable to remove the data management and data input burden under this arrangement, so that consumers are not required to become data managers. In particular, it would be highly desirable for the professional organizations responsible for maintaining accurate data about their customers to be the locus of responsibility for data integrity. For example:

Pharmacies maintain records about their customers.
Doctors maintain records about their patients.
Financial institutions maintain records about their clients.
These actors are paid, in part, for keeping accurate and timely records about their patients, customers, or clients.

It would be highly desirable for consumers to have access to some key information that is maintained for them by the professional organizations with which they are affiliated. For example:

Instead of a consumer entering into his computer data about his drug prescriptions, it would be desirable for the needed data to be obtainable from the pharmacy automatically on demand by the consumer computer.

Instead of a consumer entering into his computer data about his stock portfolio and manipulating it daily, it would be desirable for any needed data to be obtained from the financial institution automatically on demand by the consumer computer.

Instead of a consumer entering into his computer data about his health records and manipulating the data as they change, it would be desirable for any needed data to be obtained from the medical institution automatically on demand by the consumer computer.

The following is a solution to this problem using the invention:

A standard collection of remote medical records inspectors, remote financial records inspectors, and remote drug prescription inspectors is developed, and their syntax and use is published. These inspectors have both server side components and client side components, to be described later.

Advice authors write advice concerning various issues associated with such personal information.

Certain doctors, financial institutions, and pharmacies install server side components at computers in their offices. They advertise to the public the availability of remote information access.

The consumer who is interested in benefiting from advice written using remote information access approaches the financial institution, doctor, or pharmacy and authorizes participation of his own information in the server software.

The consumer subscribes to certain advice sites whose advice includes advice making use of the remote inspectors. The subscription is initialized appropriately so that the consumer computers advice reader make use of the information.

Such advice is periodically evaluated according to the advice pool in which the advice is placed. Evaluation causes the consumer computer to establish connections to remote computers to obtain needed information. For example, the remote drug prescription inspector library on the consumer machine establishes a connection with the pharmacy information server and performs certain queries to check if the consumer has certain problematic prescription combinations.

The following is an example of an advisory that is written using this system: Suppose that a certain pharmaceutical manufacturer provides an antidepressant drug to its patients, and that it is discovered that patients who also use a certain anti-inflammatory may experience difficulties. In practice, one prescription might be due to a psychiatrist and the other by an orthopedist who might not be aware of the patient's other medical prescriptions. The manufacturer authors an advisory referring to the dangerous combination as follows:
exists pharmacy prescription "Xanax" and exists pharmacy prescription "Buterin"

The manufacturer includes a description of the potentially dangerous combination for a message body. When the advice reader on the consumer computer encounters this relevance clause, it contacts the pharmacy server with queries for pharmacy prescription Xanax and pharmacy prescription Buterin. It determines the relevance of the advisory based on this. It notifies the consumer of the situation if it turns out to be relevant.

An important issue in determining the consumer acceptance of this system is the ability of the system to protect consumer privacy. To this end, the interaction between client and server is carefully protected:

The connection between consumer client and pharmacy server is secured by standard cryptographic means (e.g. SSL protocol).

The identity of the client requesting the information is authenticated by the pharmacy server by standard cryptographic means.

By these devices, the pharmacy server avoids revealing information about a person except to the advice reader on that person's computer. The advice reader on that person's computer does not reveal information so received, at least under ordinary operations.

The following is a convenient interaction protocol for such remote inspectors. In this protocol, it is simple to make the client side software. The client transmits, over a secure link, ASCII strings describing the queries exactly as they are described in the surface language. In the above example, the client transmits pharmacy prescription Xanax." The server parses this using a miniature version of the relevance clause parser evaluator. The server knows that this clause refers to the prescription records of Joseph A. Patient because of the initial authentication work and, using standard database inquiry methods, searches the pharmacy database for an entry indicating that Mr. Patient had a pharmacy prescription to Xanax. The server then returns True or False as an ASCII string, and the client parses this string and returns the corresponding Boolean to the advice reader.

Bi-directional Communications

An intent of the invention is to allow only one way communication, taking information from advice provider to advice consumer, but not allowing information to leak back from consumer to provider. The phrase one way membrane evokes this.

However, there are numerous situations where this model is restrictive. For example, in certain situations consumers are willing to cooperate with providers, particularly when they receive a benefit from cooperating. An example is when consumers want to get technical support to solve a specific problem which existing advisories do not address. For the sake of solving their problem, they are willing to disclose various pieces of information about their configuration to the solution provider. In other situations, advice consumers subscribing to a certain site are actually employees of the organization which operates the advice site, and so they are willing to share information with that particular advice provider.

Open Bi-directional Communications

The phrase open bidirectional communications refers to a setting where the invention is run and the communications are typically one way, but occasionally there are processes which feed back information to the advice provider, and the process takes place in the clear with the consumer computer identity explicitly available to the provider.

Questionnaires

Figure 20:
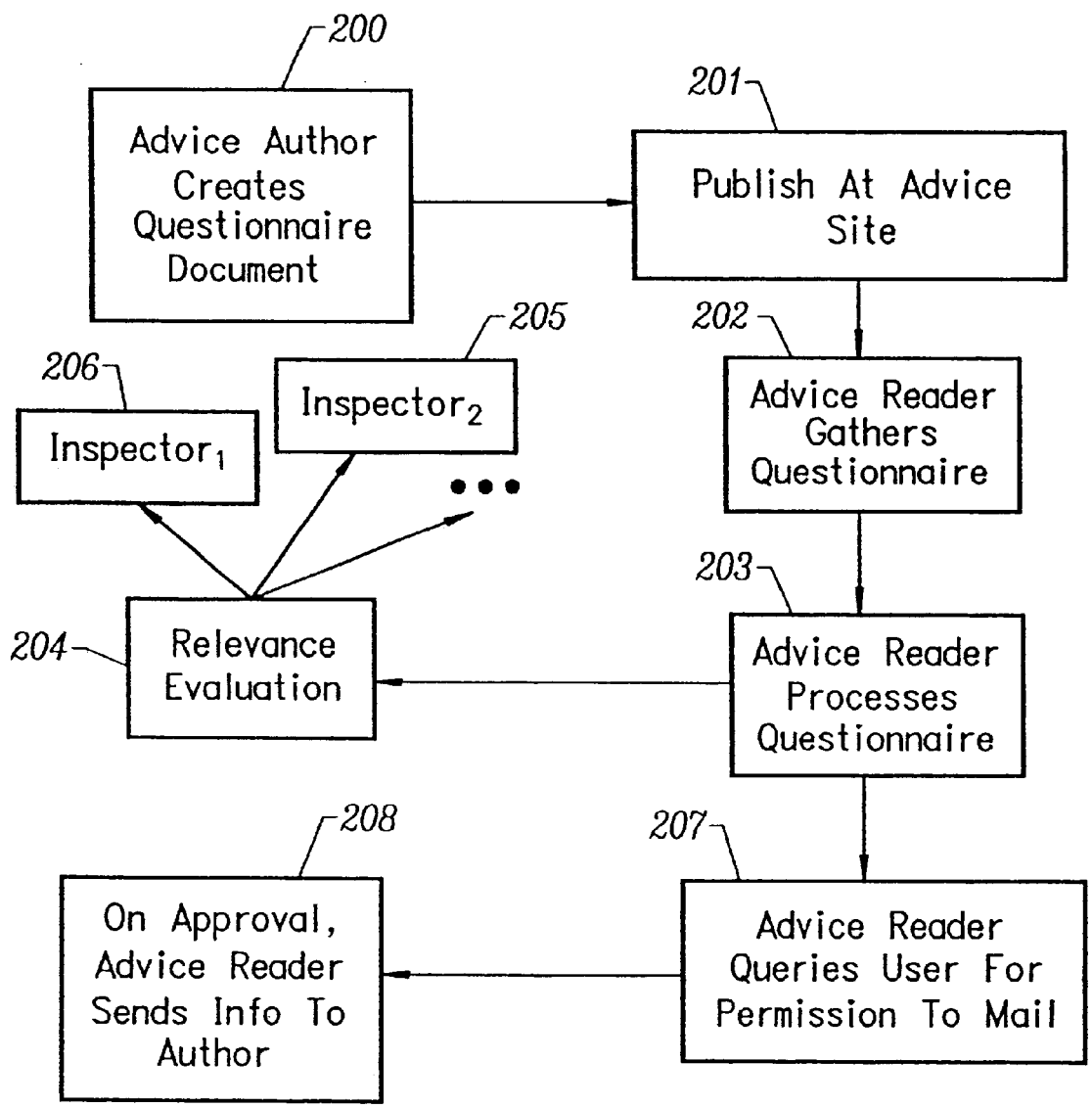
FIG. 20 is a flow diagram showing questionnaire processing according to the invention.

In one implementation (see FIG. 20), a particular document type is defined, referred to as a questionnaire 200, containing text together with comments, together with distinguished Include-Expressions. Suppose, that Include-Expressions are delimited by double Dollar Signs as in $$. The Include-Expressions are written in the relevance language, and need not evaluate to True or False. For example, they are string- or integer-valued. Suppose also that comments are preceded by %-signs.

An example questionnaire is:

% Data needed by ABC Corporation to

% Diagnose the XYZ Problem

Inventory of User Computer Configuration:

Computer Manufacturer: $$ Manufacturer of Computer $$

Model: $$ Model of Computer $$

OSVersion: $$ version of Operating System $$

RAM: $$ System Ram $$

Disk: $$ size of boot volume $$

This questionnaire contains text, such as computer manufacturer, as well as Include-Expressions, such as manufacturer of computer. The intent of the questionnaire is that information about the type of computer and about certain features be collected by the advice reader using its rich library of inspectors.

The following is an example showing how questionnaires are used: A questionnaire such as that above is authored by an advice provider 200 and is inserted inside the solution component of an advisory as a MIME component with distinctive content-type 201. The consumer sees a relevant advisory 202, accompanied by humanly interpretable content. The humanly interpretable content says:

You have the XYZ situation. In order to help you, we at ABC Corp. need some information about this situation—information about your system setting. This information can be automatically gathered for you if you'll push the button on the left below. You'll be given a chance to review the information and then to approve its transmission to ABC Corp.

Below the advisory are two buttons: one saying Gather information and the other saying Review Request. The first button signifies approval to gather the information; the second button signifies a request to view the source file of the questionnaire and thereby learn more about the provider's request to gather data.

If the user approves 203, the relevance clauses in the questionnaire are evaluated 204, for example using various inspectors 205, 206, and the corresponding results are included in the result where the relevance clauses had been. In the case of the previous example, this process produces:

% Data needed by ABC Corporation to
% Diagnose the XYZ Problem
Inventory of User Computer Configuration:
Computer Manufacturer: Toshiba
Model: T1200
OSType: Windows 98
OSVersion: 1.0
RAM: 64M
Disk: 2G The user may be shown the results of the include process and given a chance to inspect the results and to relay the results to the advice provider. In one implementation, the results are presented to the user as part of a mailer window, showing the intended recipient of this information 207, and with a button at the bottom marked Send It 208.

By this device, the relevance language simplifies communications between advice provider and advice consumer, allowing inspectors to gather information needed by the advice provider that is difficult for consumers to gather for themselves. The provider is helped because it quickly and accurately obtains information that may be essential in the technical support process, and the customer is helped because the process removes a burden which he would have had of finding the correct data and of reporting it accurately.

For this method to work it must have consumer acceptance. Consumers are sensitive to the possibility of questionnaire spoofing, where a questionnaire purports to gather information of one kind, e.g. CPU type, while actually gathering information about another kind, e.g. VISA card number or passwords.

One technique to further consumer acceptance is for a privacy ratings service at a central site to certify questionnaires as being in accord with privacy standards when they are appropriate implementations of the randomized response protocol. Under existing Web protocols (see Khare, Rohit (1997) Digital Signature Label Architecture, The World Wide Web Journal, Summer 1997, Vol. 2, Number 3, pp. 49–64, Oreilly, Sebastopol, Calif., http://www.w3.org/DSIG) there is a method for the establishment of ratings services which can reliably certify that certain messages have certain properties. The credibility of such assertions, i.e. that they are actually made by the service and not by an impostor, is based on deployment of standard authentication and encryption devices. Applying this technology, a privacy ratings service is established at a central site, e.g. Better Advice Bureau.org, to certify that certain questionnaires gather information in a fashion generally accepted as appropriate for the advertised task, and the information is used by the solicitor in a manner to protect individual identity. Advice authors seeking certification of the privacy respecting character of their questionnaires submit those messages to the certification authority, which studies the messages and, at its option, agrees to certify some of those messages as privacy respecting. In one embodiment of the invention, the user interface of the advice reader or similar component is configured to permit questionnaires to be displayed to users only when they have been credibly certified by a trusted privacy ratings service.

Mandatory Feedback

Figure 21:
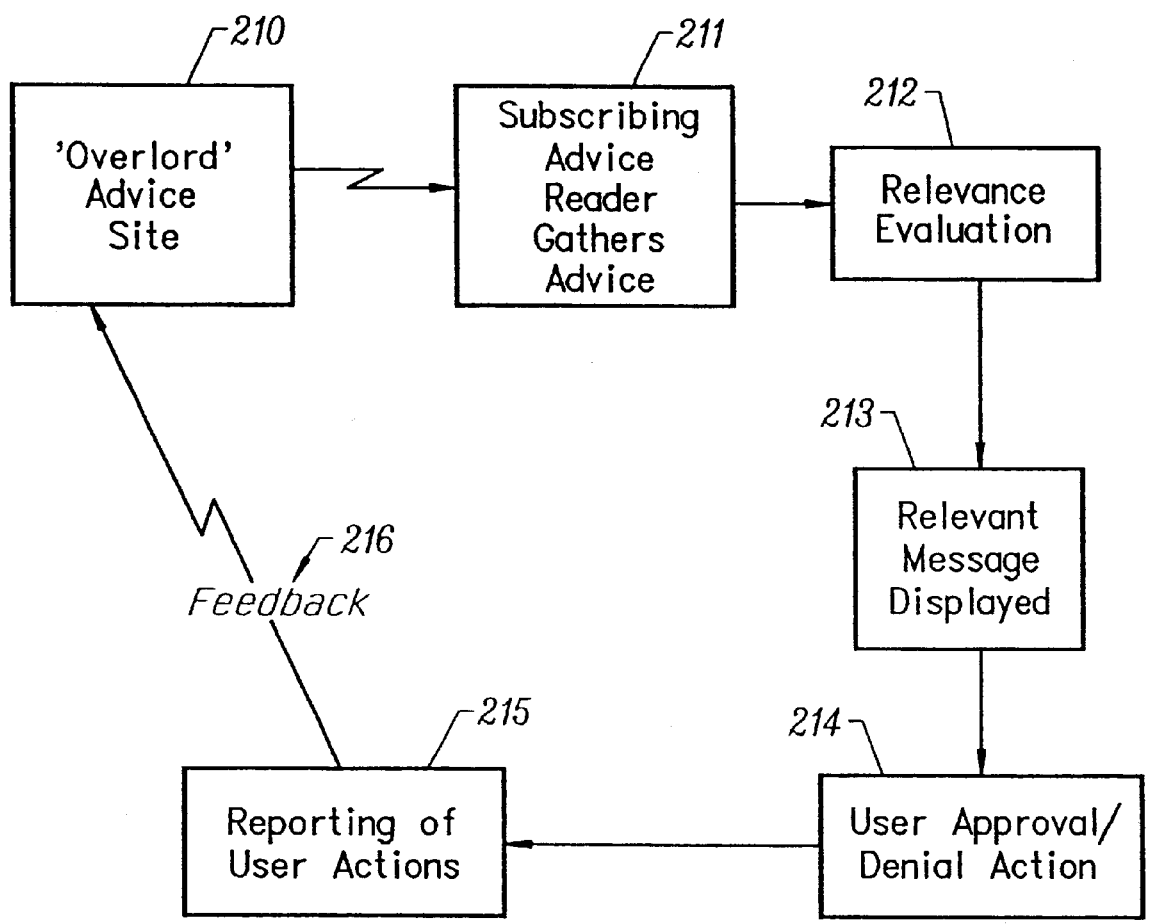
FIG. 21 is a flow diagram showing a mandatory feedback variant according to the invention.

In one embodiment of the invention (see FIG. 21), open two-way communication is possible for the purposes of maintaining a relationship with a certain trusted provider.

This assumes a consumer situation different from the usual invention setting. In this variant setting, certain kinds of advice providers enjoy a special status, for example as employers or contractors, which allows them certain coercive privileges not ordinarily enjoyed by advice providers in other settings. These overlord advice sites 210 publish advisories that are gathered by a reader 211, which then performs a relevance evaluation on the advisory 212. Relevant messages are displayed 213 to the user and the user may approve or deny such action 214 as recommended by the advisory. A feedback path 216 enables user actions to be reported 215 to the overlord advice site In this embodiment, any of the following options may be exercised:

Certain advice site subscriptions are mandatory;

Certain advice cannot be deleted by the user, advice by certain providers is not subject to user scheduling, prioritization, or deprecation;

Certain advice generates automatic feedback from the user to the provider, concerning some or all of:

(a) The consumer computer's identity;

(b) The relevance status of a certain advisory on that computer; and (c) The fact that a user has/has not taken a certain recommended solution in a certain advisory.

The feedback is transmitted by e-mail or by other convenient electronic means.

In this setting, a manager of many computers can:

(1) write advisories destined to many machines he is managing;

(2) expect that the machines all receive the advisory; and (3) expect to receive, in return, information about the relevance and/or solution status of the advice on all those machines.

Figure 22:
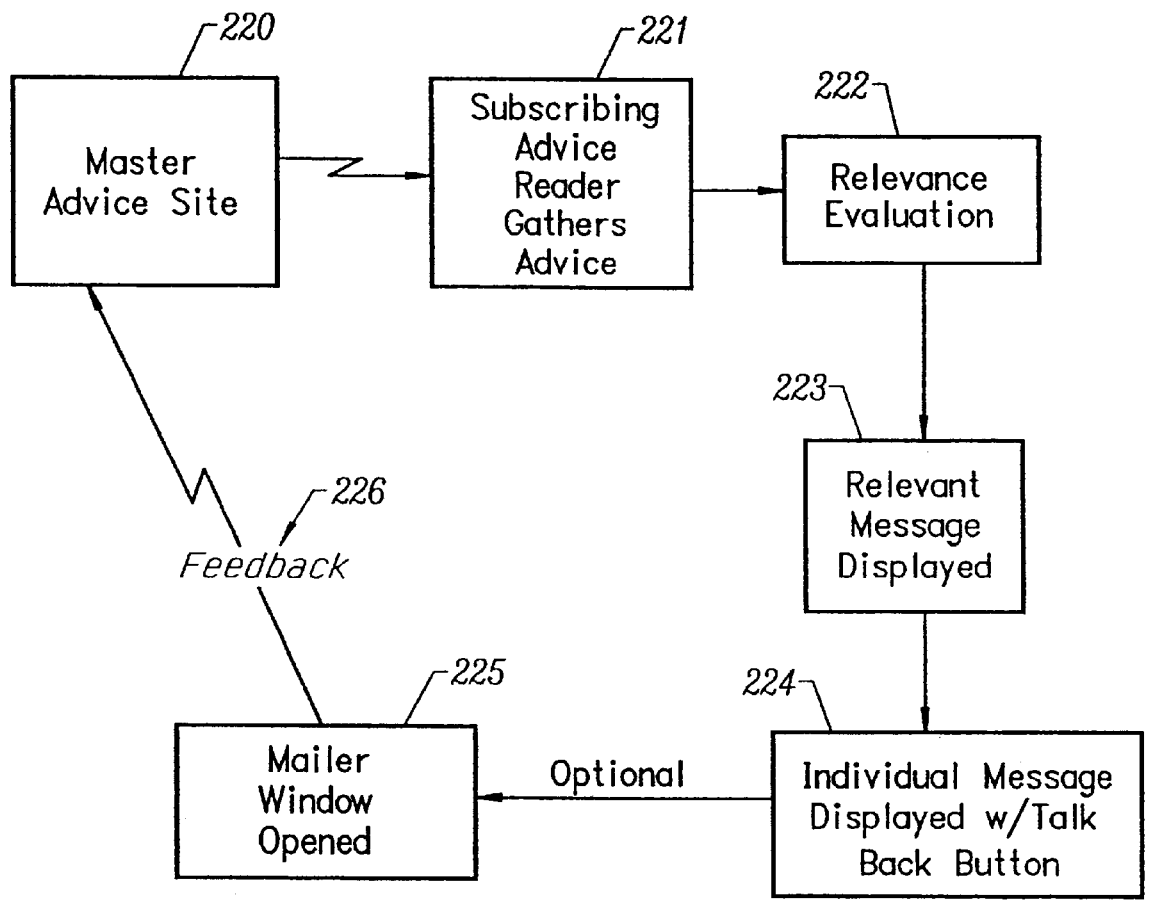
FIG. 22 is a flow diagram showing a consumer feedback variant according to the invention.

This set of functions may be implemented by modifying the basic advice reader architecture discussed above (see FIG. 22).

Advice sites 220 may be given a special overlord status (as discussed above in connection with FIG. 21) by configuring the subscription manager of the advice reader to enable such special status.

A new message line type, Mandated-Action, is instituted and is used by advice sites with overlord status to label a message component with a special keyword phrase as invoking a certain coercive privilege:

Not user deleteable labels a message as not deletable by the user through the advice reader user interface 221;

On relevance 222, Evaluate questionnaire 223 and mail back 224 labels a message as requiring immediate notification 225 of the author via a feedback path 226 upon relevance, the notification involving first processing of a questionnaire filling in the various include fields and second transmitting the information to the author;

Mail back on user acceptance labels a message as requiring immediate notification of the author upon user accepting a proposed action by selecting the action button of an associated advisory;

Mail back on user refusal labels a message as requiring immediate notification of the author upon user accepting a proposed action by selecting the action button of an associated advisory. The advice reader is modified in the appropriate way to carry out the indicated function when a message with overlord status is received and processed.

Masked Bi-directional Communications

It is possible to enable bidirectional communications while preserving some degree of privacy protection by masking the identity of the respondent.

Masking Via Anonymous Communications and Privacy Ratings

Figure 23:
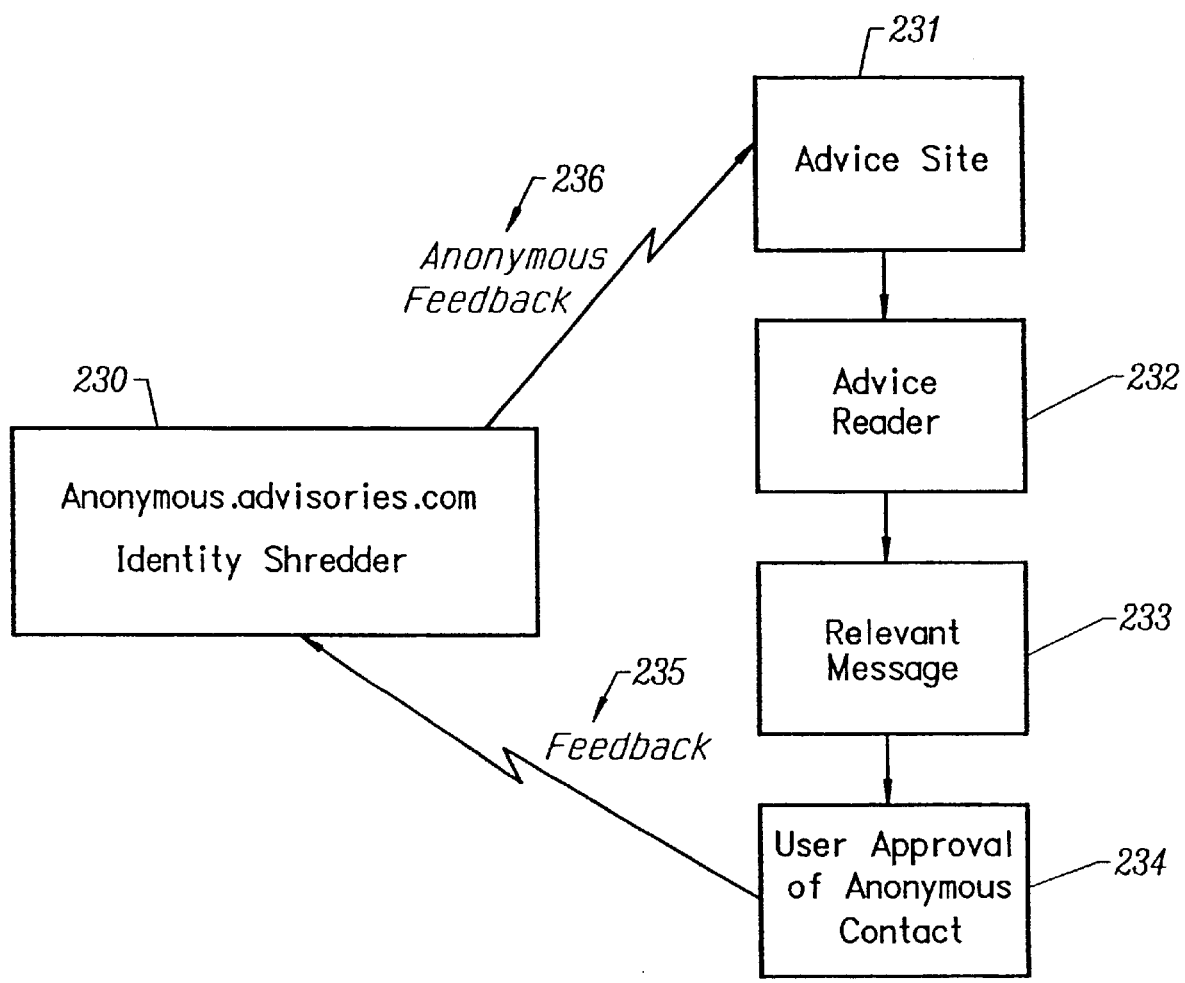
FIG. 23 is a flow diagram showing masked bi-directional communication by an anonymous server according to the invention.

In one implementation (see FIG. 23), an advice provider 231 obtains detailed information from consumer computers while communicating with consumers anonymously, thus enabling consumers to protect their own privacy. This embodiment of the invention limits the scope of communications so that when messages return to the advice provider:

Message headers contain no information uniquely identifying the respondent;
Message bodies themselves contain no information uniquely identifying the respondent; and
The process has these components:
  An advice provider 231 authors a document such as a questionnaire as described above, for gathering information automatically or an HTML form for gathering information by consumer interview. The user's advice reader 232 gathers this information.
  Upon determining relevance 233:
  If the document is a questionnaire, the advice reader fills in the appropriate include fields.
  If the document is an HTML form, the consumer fills in the appropriate survey questions.
  The document is e-mailed to the provider via anonymous routing along feedback paths 235, 236 through a certain centralized site, e.g. the Better Advice Bureau, advisories.com, or another site 230 offering identity protection via anonymous remailer or functionally equivalent services.

The final stage of this process removes information about the identity of the consumer, by stripping such identity from the message headers. Consumers are expected to have confidence in the fundamental validity of this approach because they understand that the centralized site has an incentive to protect the integrity of the process.

The consumer himself is responsible for ensuring that the message body is free of identifying information. For example, if the consumer responds to an HTML form asking for his name and address, then he is not protecting his own identity. If the consumer forwards a questionnaire containing identifying information, such as IP address, then he is not protecting his own identity.

In one implementation, the consumer protects his privacy with the help of a privacy ratings service at a central site. Under existing internet protocols (see Khare, Rohit, *Digital Signature Label Architecture,* The World Wide Web Journal, Vol. 2, Number 3, pp. 49–64, OReilly (1997) http://www.w3.org/DSIG) there is a method for the establishment of ratings services which reliably certifies that certain messages have certain properties. The credibility of such assertions, i.e. that they are actually made by the service and not by an impostor, is based on deployment of standard authentication and encryption devices. Applying this technology, a privacy ratings service is established at a central site, e.g. Better Advice Bureau.org, to certify that certain questionnaires do not contain devices soliciting sensitive information. Advice authors seeking certification of the privacy respecting character of their messages submit those messages to the certification authority which studies the messages and, at its option, agrees to certify some of those messages as privacy respecting. In one embodiment of the invention, the user interface of the advice reader or similar component is configured to permit questionnaires and forms to be displayed to users only when they are credibly certified by the privacy ratings service.

Masking Via Randomized Response

In one implementation, an advice provider obtains detailed information from consumer computers while enabling consumers to protect their own privacy. This embodiment of the invention limits the scope of communications so that when messages return to the advice provider:

Message bodies themselves contain no information which can be reliably inferred to reflect the true state of the consumer's computer or environment.

In certain embodiments, the technique is supplemented by the use of centralized anonymous communications and centralized privacy certifications.

The process has these components:
An advice provider authors a document similar to a questionnaire as described above, for gathering information automatically, however obeying additional constraints.
The advice reader fills in the appropriate include fields, randomly changing the answers, and changing the correct answers to incorrect answers, depending on a random mechanism.
The resulting document is returned to the author.

In one implementation, the process by which the information is returned is made anonymous. The document is addressed to a certain centralized site, e.g. the Better Advice Bureau, or advisories.com, or another site offering identity protection via anonymous remailer or functionally equivalent services. This final stage of this process removes information about the identity of the consumer by stripping such identity from the message headers.

The following discussion describes the concept of randomly changing the answers in more detail: Suppose that only questionnaires with Boolean values are allowed, although more general questionnaires are allowed with extra work. The relevance evaluation component of the advice reader evaluates the Boolean expressions indicated in the include fields. However, it does not always insert the result in the outgoing message. Refer to R as the value obtained by relevance evaluation. Instead of always substituting a representation of R in place of the include field, the advice reader conducts a two stage stochastic experiment. At the first stage, it obtains a random Boolean X from a random number generator, the random Boolean being equally likely to be True of False. The value of X is kept private, and drives a decision at the first stage. In this decision, if X is True, the decision is taken to insert a representation of R in the include field. If X is False, the decision is taken to obtain a second Boolean Y, again equiprobable, and to insert a representation of Y in the include field. As a result, in any specific message, it is impossible to say whether the answer obtained at the relevance evaluation stage (R) is True or False on the basis of that message alone because the reported value is equally likely to be R or Y, and the variable X driving the choice between R and Y is not divulged.

This provides a degree of privacy protection for the consumer.

At the same time, this randomized response communications protocol makes it possible for the questionnaire author to obtain information reliably about the population of users while not revealing information about specific users. If $\pi$ denotes the fraction of users in the sample with a certain characteristic, and p denotes the fraction of True responses received, then:

$$E(p)=\tfrac{1}{4}+\pi/2$$

where $E(\cdot)$ denotes mathematical expectation.
From $p \approx E(p)$ (the law of large numbers), $\pi$ can be estimated by:

$$\hat{\pi}=2(p-\tfrac{1}{4}).$$

For example, if 61% of the responses are True, one estimates that 72%=2(61%−25%) of the sample has the given characteristic.

There are extensions of the method to non-Boolean variables and to multiple item responses.

For this method to work it must have consumer acceptance. One technique to further consumer acceptance is for a privacy ratings service at a central site to certify messages as being in accord with privacy standards when they are appropriate implementations of the randomized response protocol. Under existing internet protocols (see Khare, Rohit, *Digital Signature Label Architecture,* The World Wide Web Journal, Vol. 2, Number 3, pp. 49–64, Oreilly (1997) http://www.w3.org/DSIG) there is a method for the establishment of ratings services, which reliably certifies that certain messages have certain properties. The credibility of such assertions, i.e. that they are actually made by the service and not by an impostor, is based on deployment of standard authentication and encryption devices. Applying this technology, a privacy ratings service is established at a central site, e.g. Better Advice Bureau.org, to certify that certain questionnaires use randomized response techniques appropriately and protect individual identity. Advice authors seeking certification of the privacy respecting character of their messages submit those messages to the certification authority which studies the messages and, at its option, agrees to certify some of those messages as privacy respecting. In one embodiment of the invention, the user interface of the advice reader or similar component is configured to permit questionnaires and forms to be displayed to users only when they have been credibly certified by the privacy ratings service.

Network Management

The following discussion describes two important variations of the basic invention which are useful in problems of network management, i.e. management of large networks of computational devices.

Mandatory Advice

Figure 24:
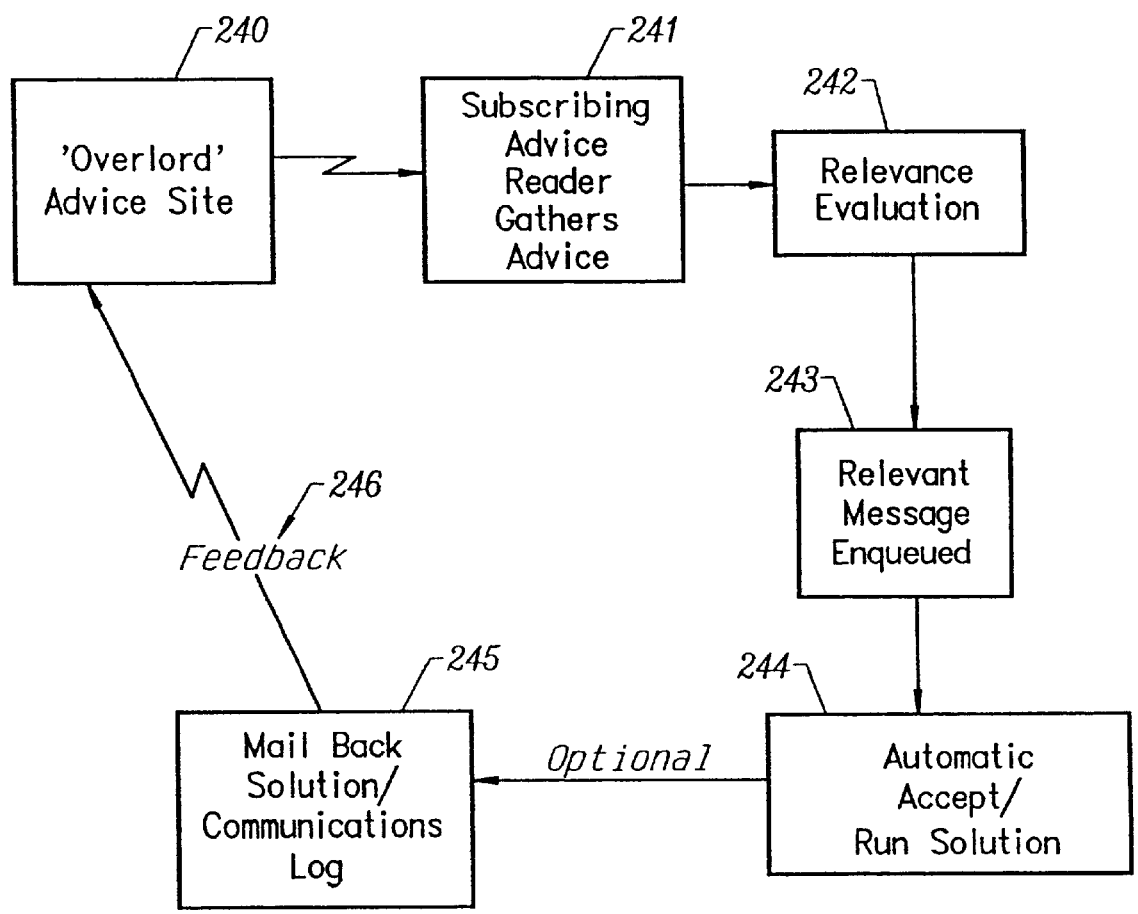
FIG. 24 is a flow diagram showing a further mandatory advice variant according to the invention.

In the basic description of the invention, it is assumed that advice is offered as a convenience to a human consumer who acts in a managerial role to read and act appropriately at his option (see FIG. 24).

There are settings where the basic communications model described earlier can be usefully modified so that there is no user review of certain advisories. As an example of one such setting, a network administrator 240 supervises a large network of communicating computational devices, each one in a potentially different and dynamically changing state. The network administrator wants certain devices to perform a certain operation, but does not know which devices those are.

In this setting, it is valuable to have an advice reader program 241 which obtains and reviews 242 advisories, but which automatically applies the indicated solution operator 244 when relevance 243 is determined. This enables the network administrator to write a general advisory targeting many machines but not knowing in advance which machines those turn out to be, and obtain the desired functionality on those machines. A solution or communications log 245 may optionally be mailed back to the network administrator via a feedback path 246.

Examples of scenarios where this functionality is useful include:

Target all machines whose security settings do not match a certain administrator defined standard. Reimpose the required settings on all such machines.

Target all machines with a copy of a certain file. On such machines, replace the file with an updated version.

Target all machines which have less than a certain amount of free space on local disk. On such machines, purge the tmp volume.

Other examples can be supplied, including examples outside the technical support application. For example, in a setting where office appliances are computational devices, network management involves tasks concerning the maintenance and monitoring of assets and their use.

In the currently understood best implementation of this variation, there are several changes to the invention:

The advice reader is implemented as a faceless application with no user interface component.

The advice reader typically receives advisories by messaging mechanisms alternative to the usual subscription model, for example by e-mail or other diffusion mechanism.

The message format omits the humanly interpretable content.

The message format includes a message component containing a software tool, such as a script or executable binary, or a reference to a software tool, such as a URL or a file system pathname, providing functionality to be invoked automatically in case a certain condition becomes relevant.

Certain features may be included in this variant:

Security Feature. The advice reader includes an authentication feature to verify the identity of the advice site attempting to exert coercive privilege.

Bi-directional Communication Feature. The advice reader includes the ability to communicate back to the advice Author when the advice Author requires this, as indicated by a Mandated-Action: message line.

Master-slave Configuration

In the description of the invention, it is assumed that advice is offered as a convenience to a human consumer, who acts in a managerial role to read and act appropriately at his option. In the description, it is assumed implicitly that the consumer is the manager of a personal computer and its environment.

Figure 25:
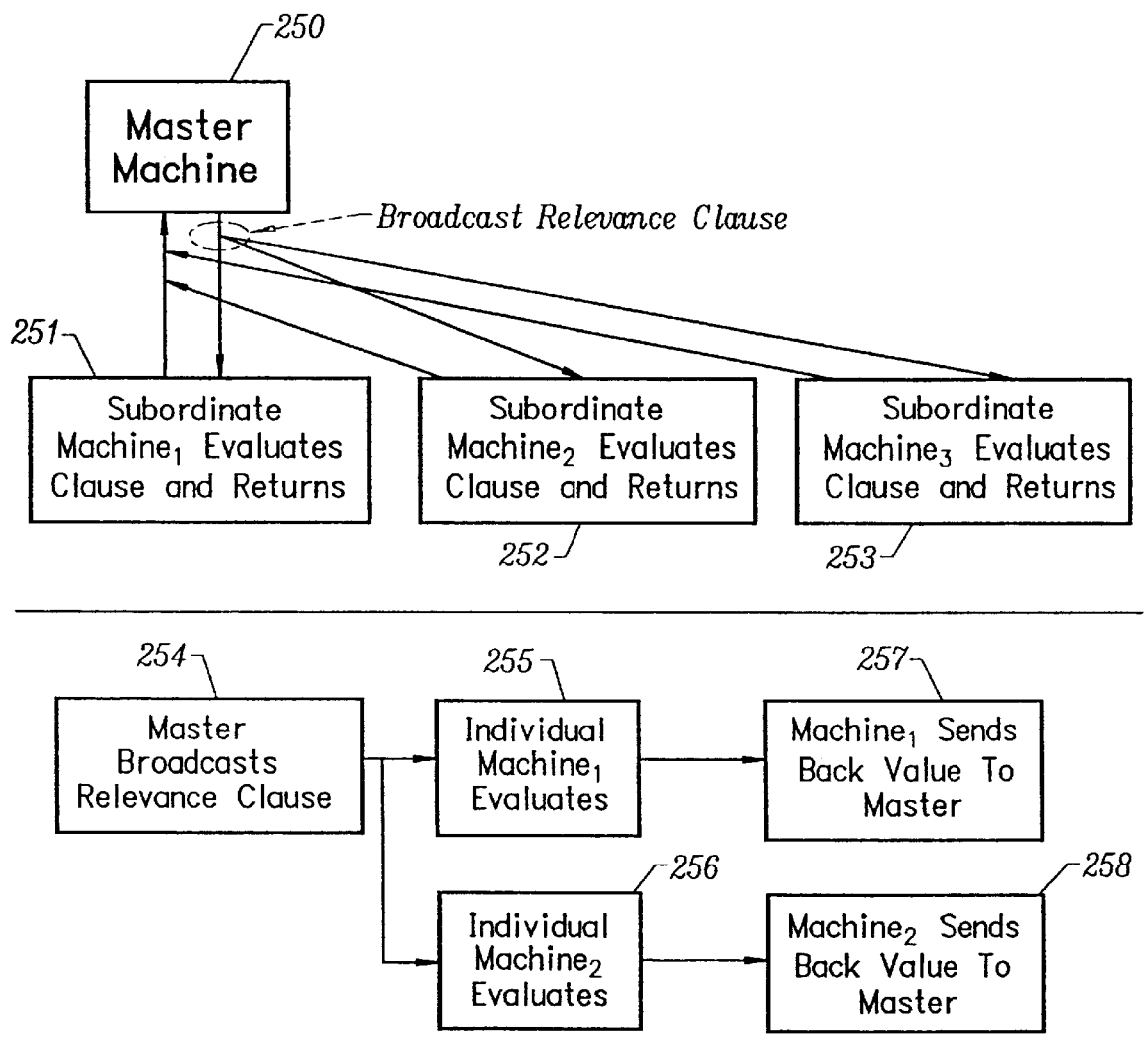
FIG. 25 is a block diagram showing remove relevance invocation according to the invention.
Figure 9:
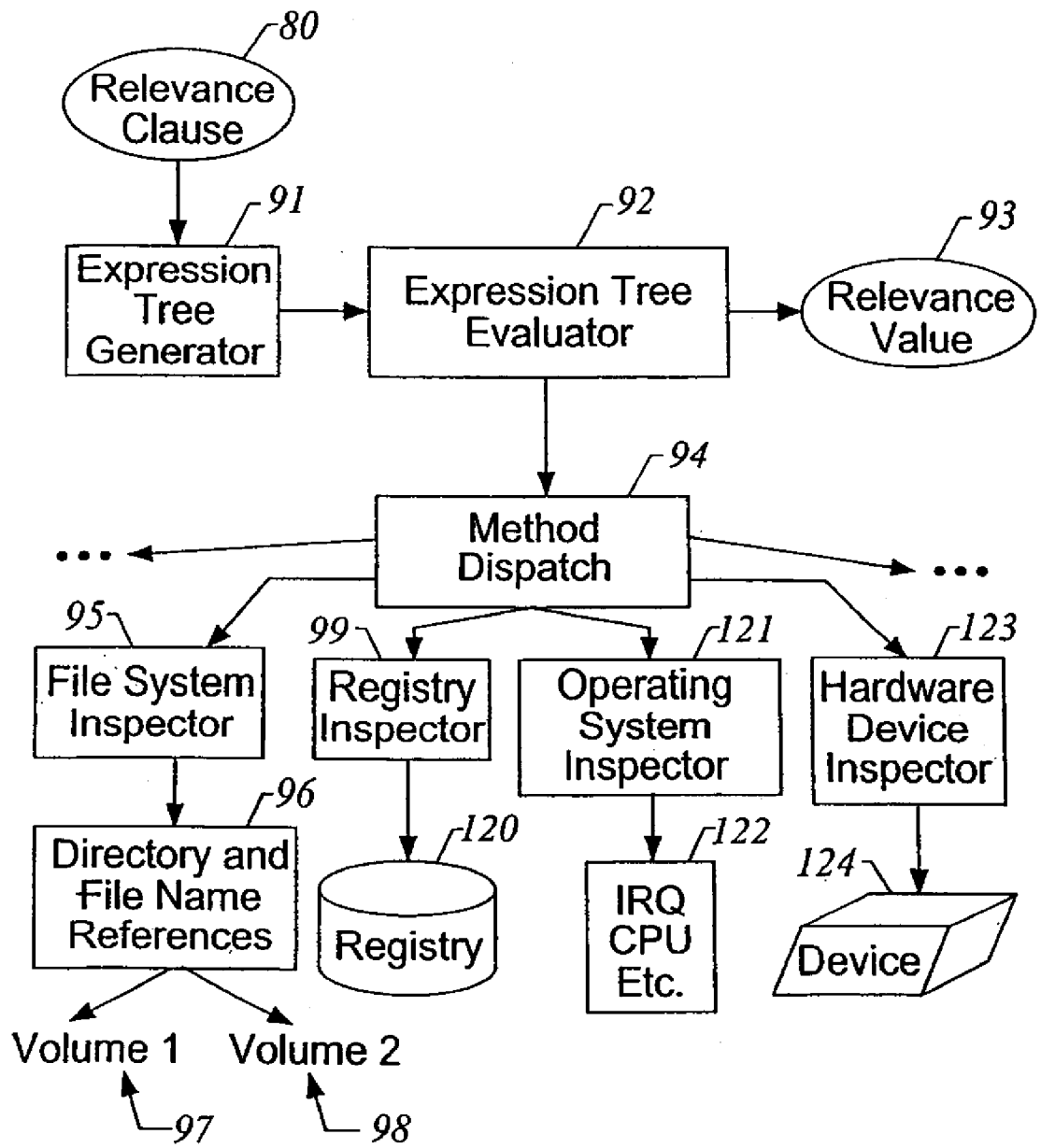

There are settings where the basic communications model described earlier can be usefully modified to reflect the needs of managers of large collections of computational devices. As an example of one such setting (see FIG. 25), a network administrator 250 supervises a large network of communicating computational devices 251–253, each one in a potentially different and dynamically changing state. The network administrator wants to have an advice reader which functions as a master reader 254, in which each entry he sees in the master user interface summarizes the relevance status of advice on many machines 255, 256 simultaneously. This allows the manager to overview 257, 258 and to make decisions about accepting or rejecting advice on many machines at once.

In this setting, the network administrator's workstation is a master machine and the computational devices he manages are slave machines. It is very desirable to have a master advice reader program running on the master machine and which obtains advisories, and which then communicates with the slave machines, each one running a slave relevance evaluator and slave action implementer, and which summarizes the results of the interaction. These slave relevance evaluators accept messages from the master advice reader. The messages consist of wrapper information and individual relevance clauses. The slaves evaluate the relevance clauses in the environment defined by their machines and transmit the resulting values to the master. The master reader then studies the results so obtained and, according to a special master user interface, presents to the network administrator a summary of master relevant messages. A message is deemed master relevant if the associated relevance clause is true on any slave machine. The network administrator studies the master relevant messages and may accept the proposed actions associated with some of them. When he does so, the master reader communicates with the slave action evaluator on slave machines on which a relevant result is obtained, relaying the recommended action part of the advisory, and indicating that the action should be taken. Each slave action evaluator contacted in this way then applies the indicated solution within the environment provided by that machine.

In this setting, a network administrator subscribes to advice and plays the role of managing the advice process in place of all the users of the slave machines. If a piece of advice, when relevant under the ordinary invention, suggests to a user that certain software should be updated on that user's machine, then the same advice is presented to the network administrator instead when some machine on the network should have an update, and it effectively proposes that the corresponding software on every such machine be updated.

In the currently understood best implementation of this variation, there are several changes to the usual invention model.:

The slave relevance evaluator and slave action implementor are implemented as faceless applications with no user interface component.

The slave relevance evaluator and slave action implementor typically receive advisories by messaging mechanisms alternative to the usual subscription model, for example by e-mail or other diffusion mechanism.

The message format for communications between master reader and slave relevance evaluator omit the humanly interpretable content.

The message format for communications between master reader and slave action implementor include a message component containing a software tool, such as a script or executable binary, or a reference to a software tool, such as a URL or a file system pathname, providing functionality to be invoked automatically.

In addition, certain variations may be exercised as well. The slave advice evaluator and slave action implementor include cryptographic authentication features to verify the identity of the master attempting to exert coercive privilege.

Owing to the difference in outlook that a network administrator has, the Master user interface has features not ordinarily available in the invention. These include:

Machine List Display. To display a list of all the machines on which a given advisory is relevant. To decorate this list by including other characteristics of the machines.

Machine List Filtering. To apply selection mechanisms to the list of relevant machines, allowing to apply the recommended action only to a selected subgroup of machines within the relevant group. Particularly useful is the ability to intersect a list of machines with a predefined list, e.g. a list of machines in a certain operational division, a list of machines in a certain location, or a list of machines arising as relevant in some other advisory. It is also important to allow the list of machines to be expanded beyond the relevant machines, allowing both editing by hand or concatenation with some other list of machines, for example a predefined list, or a list of machines relevant for some other advisory.

The logical structure described is that of a single body of advisories evaluated for relevance in a collection of different contexts, where the results in all those different contexts are gathered together in one single master user interface. This logical structure makes sense in other settings. For example, in the example of drug interactions discussed above, the pharmacist is an administrator, the body of advisories that he has received from pharmaceutical manufacturers are a body to be applied in many different contexts, and each of his customers database records provide a unique context for interpretation of the advisories. Here, the context is not of individual machines but individual records in a database. The master user interface is the basis for another variation of the invention, i.e. operating with a specialized database inspector, the master advice reader obtains a list of all the patients for each advisory for whom a given advisory is relevant. The user interface displays only master-relevant information to the pharmacist, i.e. advisories relevant for some patient in the database. The pharmacist then views the relevant advisories and inspects a list of associated patients.

Although the invention is described herein with reference to the preferred embodiment, one skilled in the art will readily appreciate that other applications may be substituted for those set forth herein without departing from the spirit and scope of the present invention. Accordingly, the invention should only be limited by the claims included below.

What is claimed is:

1. A communications system, comprising:

an advice provider which broadcasts information over a communications medium;

an advice consumer for gathering said broadcast information from said communication medium; and a reader associated with said advice consumer for determining relevance of said broadcast information;

wherein said advice consumer is advised of said information only if said information meets certain predetermined relevance criteria;

wherein said advice consumer maintains anonymity, privacy, and security by not revealing to said advice provider either that said advice consumer is interested in information from said advice provider, that said advice consumer has received any particular message, or that said information is relevant to said advice consumer.

2. The system of claim 1, wherein relevant information may be presented to said advice consumer for review and action, or it may be acted on automatically.

3. An apparatus for linking an advice provider to an advice consumer, comprising:

an advice provider for broadcasting advice in the form of an advisory describing in terms said advice consumer can easily understand the reason that said advisory is relevant and the purpose and effects of an action which is being recommended to said advice consumer;

a gatherer for gathering advisories for said advice consumer;

an advice reader associated with an advice consumer for performing a relevance determination for said advisories to determine the relevance of said advisories, said determination being made either continuously, at scheduled intervals, or under user manual control.

4. The apparatus of claim 3, further comprising:

A display for presenting said advice consumer with relevant advisories only.

5. A communications apparatus, comprising:

an advisory comprising a relevance clause and comprising an assertion about an advice consumer computer, its contents, or environment which can be automatically evaluated by comparing said assertion with said advice consumer computer's actual state;

a message associated with said relevance clause whose suitability for said advice consumer is determined at least partially by evaluation of said relevance clause;

a gatherer for gathering advisories said advice consumer;

a watcher for evaluating relevance clauses by checking if these point towards or away from relevance; and a notifier for displaying messages to said advice consumer under at least partial guidance of an evaluated relevance clause.

6. The apparatus of claim 5, said advisory further comprising any of:

a wrapper for packaging information in said advisory for transport and subsequent decoding;

a from line for identifying an advice author;

a subject line for identifying the concern of said advisory;

a relevance clause for specifying conditions under which the said is relevant;

a message body for providing explanatory material explaining to said advice consumer what condition is relevant, why said advice consumer is concerned, and what action is recommended; and an action button for providing said advice consumer with the ability to invoke an automatic execution of a recommended action.

* * * * *

UNITED STATES PATENT AND TRADEMARK OFFICE
CERTIFICATE OF CORRECTION

PATENT NO.   : 6,604,130 B2
DATED        : August 5, 2003
INVENTOR(S)  : Donoho et al.

It is certified that error appears in the above-identified patent and that said Letters Patent is hereby corrected as shown below:

Drawings,
Sheet 9 of 25, replace formal drawing sheet with the attached drawing.

Signed and Sealed this

Twenty-fifth Day of January, 2005

JON W. DUDAS
*Director of the United States Patent and Trademark Office*